(12) United States Patent
Matsuo et al.

(10) Patent No.: US 10,115,985 B2
(45) Date of Patent: Oct. 30, 2018

(54) SOLID OXIDE FUEL CELL SYSTEM

(71) Applicant: TOTO LTD., Kitakyushu-shi, Fukuoka (JP)

(72) Inventors: Takuya Matsuo, Yokohama (JP); Toshiharu Otsuka, Nakama (JP); Katsuhisa Tsuchiya, Chigasaki (JP); Yousuke Akagi, Chigasaki (JP); Megumi Shimazu, Chigasaki (JP); Chihiro Kobayashi, Chigasaki (JP); Mitsunobu Shiono, Yokohama (JP); Koji Omoshiki, Chigasaki (JP)

(73) Assignee: TOTO LTD., Kitakyushu-Shi, Fukuoka (JP)

( * ) Notice: Subject to any disclaimer, the term of this patent is extended or adjusted under 35 U.S.C. 154(b) by 474 days.

(21) Appl. No.: 14/385,626

(22) PCT Filed: Mar. 25, 2013

(86) PCT No.: PCT/JP2013/058613
§ 371 (c)(1),
(2) Date: Sep. 16, 2014

(87) PCT Pub. No.: WO2013/141402
PCT Pub. Date: Sep. 26, 2013

(65) Prior Publication Data
US 2015/0086887 A1 Mar. 26, 2015

(30) Foreign Application Priority Data

Mar. 23, 2012 (JP) .................. 2012-066764
Jan. 15, 2013 (JP) .................. 2013-004932

(51) Int. Cl.
*H01M 8/04228* (2016.01)
*H01M 8/2484* (2016.01)
(Continued)

(52) U.S. Cl.
CPC ....... *H01M 8/04228* (2016.02); *H01M 8/004* (2013.01); *H01M 8/0252* (2013.01);
(Continued)

(58) Field of Classification Search
CPC ......... H01M 8/04731; H01M 8/04223; H01M 8/04365; H01M 8/04753; H01M 8/0606;
(Continued)

(56) References Cited

U.S. PATENT DOCUMENTS 6,492,050 B1    12/2002  Sammes
2008/0145720 A1*  6/2008  Sinha ................ H01M 8/04089
                                                             429/432
(Continued)

FOREIGN PATENT DOCUMENTS

DE    10 2010 001260 A1    7/2011
EP       2 416 419 A1      2/2012
(Continued)

OTHER PUBLICATIONS

International Search Report, and English language translation thereof, in corresponding International Application No. PCT/JP2013/058613 dated May 28, 2013, 7 pages.
(Continued)

*Primary Examiner* — Jimmy Vo
(74) *Attorney, Agent, or Firm* — Brinks Gilson & Lione

(57) ABSTRACT

To provide a solid oxide fuel cell system capable of avoiding the reduction of air electrodes. The present invention is a solid oxide fuel cell system including: a fuel cell module, a fuel supply apparatus, a water supply apparatus, an oxidant gas supply apparatus, a reformer, and a control section for controlling the extraction of power, whereby the controller having a shutdown stop circuit for executing a shutdown stop when the fuel cell stack is above the predetermined temperature, and after a shutdown stop, during a period
(Continued)

when pressure on the fuel electrode side is sufficiently higher than pressure on the air electrode side, and no reverse flow of oxidant gas to the fuel electrode side is occurring, a temperature drop operation is executed whereby high temperature oxidant gas remaining on the oxidant gas electrode side is discharged.

13 Claims, 27 Drawing Sheets

(51) Int. Cl.

| | | |
|---|---|---|
| *H01M 8/2457* | (2016.01) | |
| *H01M 8/2428* | (2016.01) | |
| *H01M 8/0271* | (2016.01) | |
| *H01M 8/04223* | (2016.01) | |
| *H01M 8/04955* | (2016.01) | |
| *H01M 8/0612* | (2016.01) | |
| *H01M 8/0432* | (2016.01) | |
| *H01M 8/04701* | (2016.01) | |
| *H01M 8/04746* | (2016.01) | |
| *H01M 8/1246* | (2016.01) | |
| *H01M 8/00* | (2016.01) | |
| *H01M 8/0252* | (2016.01) | |
| *H01M 8/0265* | (2016.01) | |
| *H01M 8/124* | (2016.01) | |
| *H01M 8/243* | (2016.01) | |
| *H01M 8/04014* | (2016.01) | |

(52) U.S. Cl.
CPC ....... *H01M 8/0265* (2013.01); *H01M 8/0271* (2013.01); *H01M 8/0432* (2013.01); *H01M 8/04223* (2013.01); *H01M 8/04231* (2013.01); *H01M 8/04701* (2013.01); *H01M 8/04753* (2013.01); *H01M 8/04955* (2013.01); *H01M 8/0618* (2013.01); *H01M 8/1246* (2013.01); *H01M 8/2428* (2016.02); *H01M 8/2457* (2016.02); *H01M 8/2484* (2016.02); *H01M 8/04022* (2013.01); *H01M 8/0625* (2013.01); *H01M 8/243* (2013.01); *H01M 2008/1293* (2013.01)

(58) Field of Classification Search
CPC .............. H01M 8/0618; H01M 8/004; H01M 8/04022; H01M 8/04074; H01M 8/243
See application file for complete search history.

(56) References Cited

U.S. PATENT DOCUMENTS

| | | | |
|---|---|---|---|
| 2012/0015262 | A1 | 1/2012 | Watanabe et al. |
| 2013/0022885 | A1 | 1/2013 | Baumann et al. |

FOREIGN PATENT DOCUMENTS

| | | | |
|---|---|---|---|
| JP | 2005-346988 | A | 12/2005 |
| JP | 2006-155982 | A | 6/2006 |
| JP | 2010-027579 | A | 2/2010 |
| JP | 2010-055910 | A | 3/2010 |
| JP | 2010-080176 | A | 4/2010 |
| JP | 2010-080192 | A | 4/2010 |
| JP | 2010-114000 | A | 5/2010 |
| JP | 2011-008993 | A | 1/2011 |
| JP | 2011-9136 | A | 1/2011 |
| JP | 2011-076846 | A | 4/2011 |
| JP | 2011-100640 | A | 5/2011 |

OTHER PUBLICATIONS

Extended Search Report for corresponding European Application No. 13 76 3909 dated Oct. 23, 2015, 6 pages.

\* cited by examiner

FIG.29

TABLE OF EXECUTION CONDITIONS

| TEMPERATURE BAND | STOP MODE | PRE-SHUTDOWN OPERATION | TEMPERATURE DROP CONTROL |
|---|---|---|---|
| HIGH TEMPERATURE BAND ≥681°C | PROGRAM STOP: STOP MODE 4 | YES | YES |
| | MALFUNCTION WITH ELECTRICAL GENERATION OPERATION POSSIBLE: STOP MODE 4 | YES | YES |
| | MANUAL STOP: STOP MODE 3 | YES | YES |
| | MALFUNCTION WITH EXHAUSTING POSSIBLE: STOP MODE 2 | NO | YES |
| | MALFUNCTION UNABLE TO OPERATED AFTER STOP: STOP MODE 1 | NO | NO |
| APPROPRIATE TEMPERATURE BAND 620°C-680°C | PROGRAM STOP: STOP MODE 4 | NO | YES |
| | MALFUNCTION WITH ELECTRICAL GENERATION OPERATION POSSIBLE: STOP MODE 4 | NO | YES |
| | MANUAL STOP: STOP MODE 3 | NO | YES |
| | MALFUNCTION WITH EXHAUSTING POSSIBLE: STOP MODE 2 | NO | YES |
| | MALFUNCTION UNABLE TO OPERATE AFTER STOP: STOP MODE 1 | NO | NO |
| LOW TEMPERATURE BAND ≤619°C | PROGRAM STOP: STOP MODE 4 | NO | YES |
| | MALFUNCTION WITH ELECTRICAL GENERATION OPERATION POSSIBLE: STOP MODE 4 | NO | NO |
| | MANUAL STOP: STOP MODE 3 | NO | NO |
| | MALFUNCTION WITH EXHAUSTING POSSIBLE: STOP MODE 2 | NO | NO |
| | MALFUNCTION UNABLE TO OPERATE AFTER STOP: STOP MODE 1 | NO | NO |

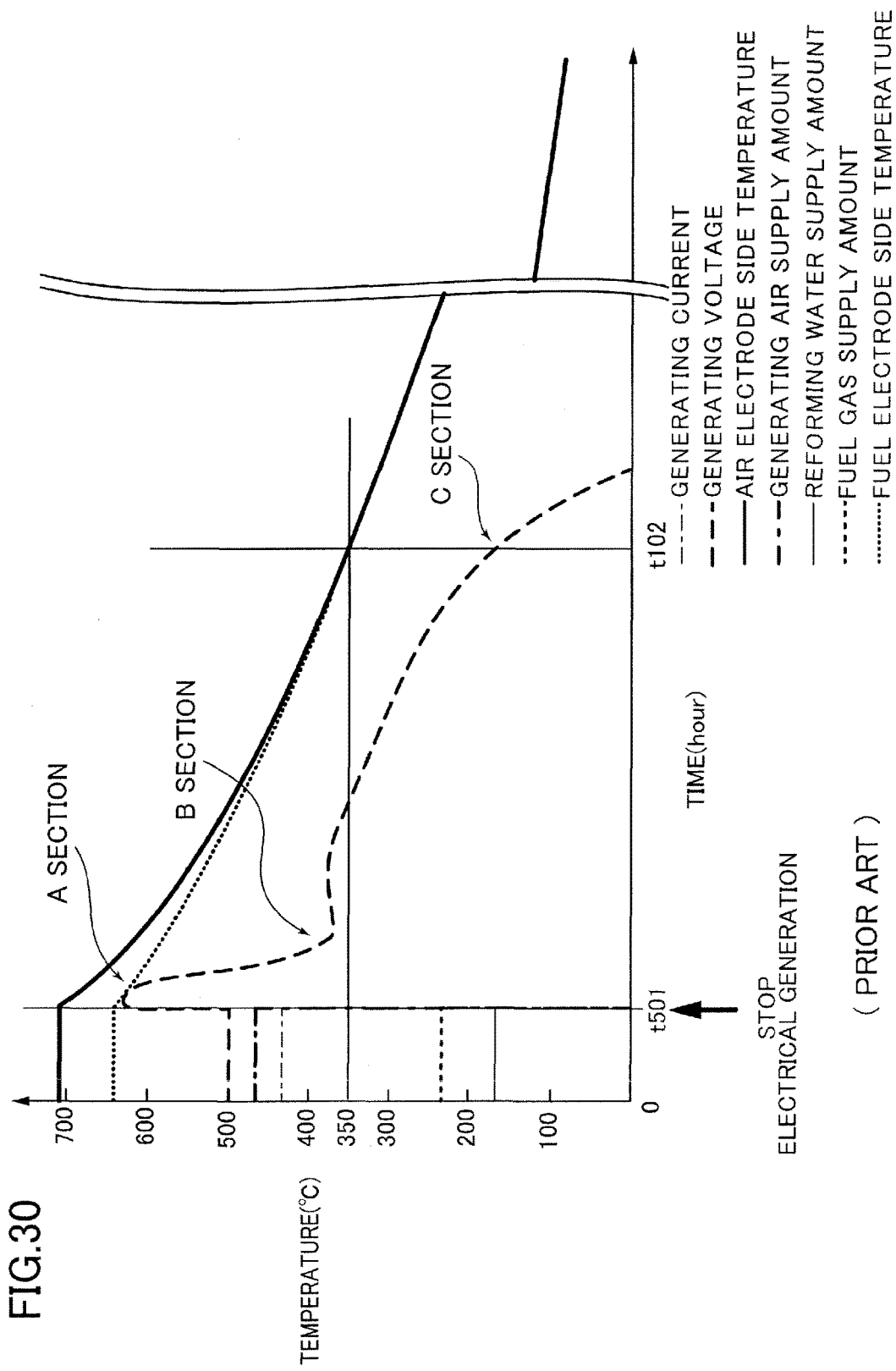

SOLID OXIDE FUEL CELL SYSTEM

This application is a 371 application of PCT/JP2013/058613 having an international filing date of Mar. 25, 2013, which claims priority to JP 2012-066764 filed Mar. 23, 2012 and JP 2013-004932 filed Jan. 15, 2013, the entire contents of which are incorporated herein by reference.

TECHNICAL FIELD

The present invention pertains to a solid oxide fuel cell system, and more particularly to a solid oxide fuel cell for generating electricity by steam reforming fuel and reacting the resulting hydrogen with oxidant gas.

BACKGROUND ART

Solid oxide fuel cells ("SOFCs" below) are fuel cells which operate at a relatively high temperature in which, using an oxide ion conducting solid electrolyte as electrolyte, with electrodes attached to both sides thereof, fuel gas is supplied to one side thereof and oxidizer (air, oxygen, or the like) is supplied to the other side thereof.

Japanese Published Unexamined Patent Application 2012-3850 (Patent Document 1) discloses a solid oxide fuel cell. In this solid oxide fuel cell, when a fuel cell operating at a high temperature is turned off, air is supplied to the air electrode side of the fuel cell stack while continuing to supply a small amount of fuel and fuel-reforming water, and the temperature inside the fuel cell module is reduced by the cooling effect of this air. I.e., in this fuel cell, during the stopping step fuel continues to be supplied even after the extraction of power from the fuel cell module is stopped, while at the same time the fuel cell stack is cooled by delivering a large volume of cooling air. Next, when the cell stack temperature has been reduced to less than the fuel cell oxidation temperature, the supply of fuel is stopped, after which only the supply of cooling air is continued until the temperature drops sufficiently, and the fuel cell is safely turned off.

A fuel cell which performs a "shutdown stop" is also known, whereby in the stopping step, power is extracted and the supply of fuel, fuel reforming water, and generating air (air fed to the air electrode side) is completely stopped.

Japanese Published Unexamined Patent Application 2010-27579 (Patent Document 2) discloses a fuel cell system. In this fuel cell system, during an emergency stop the feed pump for supplying fuel to the reformer, the reform water pump for supplying water for steam reforming, and the air blower for feeding air to the air electrode side of the cell stack are stopped. Thereafter, when the feed pump and the reforming water pump are restarted under emergency stop operation control, fuel gas which had been adsorbed by the adsorber is fed to the reformer and steam reforming is carried out using water supplied from the reform water pump, even if the supply of fuel gas from the fuel supply source is cut off. By this means, reforming fuel is supplied to the cell stack electrode over a predetermined period even after the supply of fuel gas is cut off, and oxidation of fuel electrodes by reverse flow of air is prevented.

Furthermore, Japanese Published Unexamined Patent Application 2012-138186 (Patent Document 3) discloses a high temperature-triggered fuel cell system. In this high temperature-triggered fuel cell system, during an emergency stop the raw fuel pump for supplying fuel gas is stopped and the reforming pump for supplying water to the reformer is activated. When the reforming water pump is activated, the water supplied expands in volume due to vaporization inside the reformer. Therefore even if the supply of raw fuel gas from the fuel supply source is cut off, the fuel gas remaining in the fuel gas supply line downstream of the reformer is pushed toward the fuel cell (cell stack) side by the pressure of the volumetrically expanded steam. Oxidation of the fuel electrode by a reverse flow of air is thus prevented.

PRIOR ART REFERENCES

Patent Documents

Patent Document 1
JP2012-3850
Patent Document 2
JP2010-27579
Patent Document 3
JP2012-138186

SUMMARY OF THE INVENTION

Problems the Invention Seeks to Resolve

In the fuel cell set forth in Japanese Published Unexamined Patent Application 2012-3850 (Patent Document 1), fuel is supplied until the fuel cell stack drops to a predetermined temperature, even during the stopping step, resulting in the problem of wasted fuel which does not contribute to electrical generation. If the supply of fuel is stopped and cooling air is supplied before the cell stack temperature is sufficiently reduced, cooling air supplied to the air electrode side of the individual fuel cells flows in reverse to the fuel electrode, and reverse flowing air oxidizes fuel electrodes in the individual fuel cells, damaging the cells. It is therefore necessary to continue supplying fuel until the temperature of the individual fuel cells drops to below the oxidation temperature, and to prevent the reverse flow of cooling air supplied to the air electrodes of individual fuel cells. Note that the time until the temperature of a fuel cell stack which had been operating drops to below the oxidation temperature depends on the insulating performance of the fuel cell module, etc., but in general runs from one hour to several hours, during which time fuel which does not contribute to electrical generation must be continually supplied.

On the other hand, in a shutdown stop the supply of fuel and fuel reforming water is completely stopped in a short time, so wastage of fuel can be constrained. Also, in a shutdown stop the supply of fuel is stopped with the fuel cell stack in a high temperature state, so the supply of cooling air fed to the air electrode of the fuel cell stack is also stopped together with the stopping of the fuel supply, thereby avoiding reverse flow of air to the fuel electrode side and oxidation of the fuel electrode.

However, the present inventor has discovered the new technical problem that when a shutdown stop is performed, oxidation of fuel electrodes in the individual fuel cells occurs and cells are degraded even if the air fed to the air electrode side of the fuel cell stack is stopped when the fuel supply is stopped, leading to cell damage.

At the same time, in the fuel cell system set forth in Japanese Published Unexamined Patent Application 2010-27579 (Patent Document 2), fuel gas which had been adsorbed onto an adsorber can be fed for a fixed period of time to the cell stack by activating a feed pump even after the supply from the fuel supply source is cut off, thereby preventing oxidation of fuel electrodes. However, in this fuel cell system fuel is pre-stored, requiring the special provision of an adsorber. Also, in this fuel cell system fuel gas which was being adsorbed by the feed pump is fed out even after the supply from the fuel supply source is cut off, but the supplied fuel gas is sequentially pushed out from the cell stack fuel electrode side to the air electrode side. However, because air which was being supplied to the air electrode side has been stopped, fuel pushed out to the air electrode side partially reduces causes a reduction reaction of the air electrodes, raising the risk of damage to the air electrodes.

Additionally, in the high temperature-triggered fuel cell system set forth in Japanese Published Unexamined Patent Application 2012-138186 (Patent Document 3), a reforming water pump is activated immediately after the raw fuel pump is stopped, and volumetric expansion of water vaporized inside the reformer causes residual fuel to be pushed out to the cell stack side. Therefore even in this high temperature-triggered fuel cell system, as in the Patent Document 2 fuel cell system, fuel pushed out to the air electrode side partially reduces the air electrode, raising the risk of damage to air electrodes.

Therefore the present invention has the object of providing a solid oxide fuel cell system capable of sufficiently constraining oxidation of fuel electrodes in individual fuel cells, and of avoiding the reduction of oxidant gas electrodes (air electrodes), while executing a shutdown stop.

Means for Resolving Problems

In order to resolve the above-described problems, the present invention is a solid oxide fuel cell system for generating electricity by steam reforming fuel and reacting the resulting hydrogen with oxidant gas, comprising: a fuel cell module that includes a fuel cell stack; a fuel supply apparatus that supplies fuel to the fuel cell module; a water supply apparatus that supplies water for steam reforming to the fuel cell module; an oxidant gas supply apparatus that supplies oxidant gas to an oxidant gas electrode side of the fuel cell stack; a reformer disposed inside the fuel cell module that performs steam reforming of fuel supplied from the fuel supply apparatus using water supplied from the water supply apparatus and supplying the reformed fuel to a fuel electrode side of the fuel cell stack; and a controller programmed to control the fuel supply apparatus, water supply apparatus, and oxidant gas supply apparatus, as well as the extraction of power from the fuel cell module; wherein the controller includes a shutdown stop circuit that executes a shutdown stop in which the fuel supply and the electrical generation are stopped in a state whereby the fuel cell stack is at or above an oxidation suppression temperature; and wherein the shutdown stop circuit, by activating an oxidant gas supply apparatus, executes a temperature drop operation for discharging high temperature oxidant gas remaining on the oxidant gas electrode side within the fuel cell module after execution of a shutdown stop during a period in which the pressure on the fuel electrode side of the fuel cell stack is sufficiently higher than the pressure on the oxidant gas electrode side, and no reverse flow of oxidant gas to the fuel electrode side occurs.

In the invention thus constituted, fuel and water are respectively supplied to a reformer disposed within the fuel cell module by a fuel supply apparatus and a water supply apparatus, and the reformer steam-reforms the fuel. Reformed fuel is supplied to the fuel electrode side of the individual fuel cell units which make up the fuel cell stack. At the same time, oxidant gas is supplied by an oxidant gas supply apparatus to the oxidant gas electrode side of the fuel cell stack. The controller comprises a shutdown stop circuit, and controls the extraction of power from the fuel supply apparatus, water supply apparatus, oxidant gas supply apparatus, and fuel cell module. The shutdown stop circuit, by activating an oxidant gas supply apparatus during a period after execution of a shutdown stop during which the pressure on the fuel cell stack fuel electrode side is sufficiently higher than the pressure on the oxidant gas electrode side, and no reverse flow of oxidant gas to the fuel electrode side occurs, executes a temperature drop operation for discharging high temperature oxidant gas remaining on the oxidant gas electrode side within the fuel cell module.

In a conventional solid oxide fuel cell system, when performing a shutdown stop the supply of fuel, supply of water for fuel reforming, extraction of power from the fuel cell module, and supply of oxidant gas are all simultaneously stopped. In the conventional art, the reason for stopping the supply of oxidant gas at the same time as the supply of fuel and the extraction of power are stopped is due to the risk of a reverse flow of oxidant gas to the fuel cell unit fuel electrode side and resulting damage to fuel electrodes when fuel is stopped and only oxidant gas is supplied when the fuel cell stack temperature is higher than the oxidation temperature immediately after extraction of power is stopped.

However, the inventor has discovered the new problem that there are cases in which oxidant gas oxidizes the fuel electrodes even when the supply of oxidant gas is thus simultaneously stopped. This problem is the cause of temperature differentials between the fuel electrode side and the oxidant gas electrode side of individual fuel cell units after the extraction of power is stopped. First, because the supply of oxidant gas for electrical generation is stopped on the oxidant gas electrode side of the individual fuel cell units, there is no cooling effect from oxidant gas, and the temperature tends to rise. At the same time, heat from electrical generation ceases in the fuel electrode side of the individual fuel cell units, since extraction of power is stopped. On the fuel electrode side of each of the fuel cell units, fuel remaining in the reformer, etc. flows in even after the supply of fuel by the fuel supply means is stopped. This fuel flowing into the fuel electrode side is produced by the endothermic steam reforming reaction in the reformer, and is generally at a lower temperature than that on the oxidant gas electrode side in the individual fuel cell units. Thus in comparison to the tendency for temperature to rise after the supply of fuel and extraction of fuel are stopped on the oxidant gas electrode side of the individual fuel cell units, the temperature tends to drop on the fuel electrode side due to dissipation of electrical generation heat and inflow of low temperature residual fuel. In parts where the temperature has dropped, surrounding gases contract and pressure drops; in parts where the temperature has risen, surrounding gases expand and pressure rises. As a result of these phenomena, the pressure on the oxidant gas electrode side of individual fuel cell units rises and pressure on the fuel electrode side falls, and this pressure differential can result in a reverse flow of oxidant gas from the oxidant gas electrode side to the fuel electrode side.

The present inventor has solved this new technical problem by executing a temperature drop operation to discharge high temperature oxidant gas remaining on the oxidant gas electrode side in the fuel cell module after execution of a shutdown stop. In the past, the oxidant gas supply apparatus was stopped so that reverse flows of oxidant gas would not occur as the result of rising pressure on the oxidant gas electrode side of the fuel cell stack after the supply of fuel was stopped in a shutdown stop. In this situation, where a shutdown stop is well known technology, the inventor has discovered that even after stopping the supply of fuel, a reverse flow does not occur for a predetermined time period after stopping even if pressure on the fuel electrode side of the fuel cell stack is sufficiently high and oxidant gas is supplied. Moreover, high temperature oxidant gas remaining in the fuel cell module can be discharged by supplying oxidant gas to the oxidant gas electrode side after a shutdown stop. Because the temperature on the fuel electrode side of the fuel cell stack in this way approaches that on the oxidant gas electrode side, the phenomenon whereby fuel which had been accumulated on the fuel electrode side shrinks due to a temperature drops and oxidant gas is pulled from the oxidant gas electrode side into the fuel electrode side can be prevented. In addition, because the pressure on the oxidant gas electrode side rises and approaches the pressure on the fuel electrode side as a result of supplying oxidant gas after a shutdown stop, the amount of fuel flowing out from the fuel electrode side to the oxidant gas electrode side after a shutdown stop declines. Thus the period during which fuel remains in the reformer and on the fuel electrode side after a shutdown stop is extended, and oxidation of the fuel electrode can be constrained. In addition, during the period when the pressure on the fuel electrode side and the pressure on the oxidant gas electrode side are sufficiently high after a shutdown stop, a large amount of fuel flows out from the fuel electrode side to the oxidant gas electrode side. In this invention, because oxidant gas is supplied during this period, fuel which flowed out to the oxidant gas fuel electrode side is discharged together with supplied oxidant gas to outside the fuel cell module. Outflowing fuel can thus be prevented from contacting the air electrodes and partially reducing and damaging the air electrodes.

In the present invention the shutdown stop circuit preferably stops the supply of water by the water supply apparatus during the temperature drop operation.

In the invention thus constituted, the supply of water is stopped during temperature drop operation, therefore vaporization and expansion of water supplied during temperature drop operation, causing fuel which had been retained on the fuel electrode side to be pressed out to the oxidant gas fuel electrode side, can be prevented. Fuel accumulated on the fuel electrode side can thus be maintained on the fuel electrode side for a long time period, and oxidation of the fuel electrode can be more reliably suppressed.

In the present invention the shutdown stop circuit preferably executes the temperature drop operation immediately after the shutdown stop.

In the invention thus constituted, a temperature drop operation is executed immediately after a shutdown stop, therefore oxidant gas can be supplied in a state in which pressure on the fuel electrode side is highest and the risk of a reverse flow of oxidant gas is lowest, and the temperature inside the fuel cell module can be reduced.

In the present invention a fuel electrode and an oxidant gas electrode are preferably respectively disposed on the inside and outside of an individual fuel cell units which constitute the fuel cell stack, and an acceleration section for raising the flow rate of fuel jetted from the fuel electrode side to the oxidant gas electrode side is disposed on the end portion of the fuel cell units.

In the invention thus constituted, an acceleration section is disposed at the end portion of the individual fuel cell units, therefore fuel jetted from the end portion of the fuel electrodes on the inside of the individual fuel cell units is accelerated so as to recede from the oxidant gas electrodes. Contact with an oxidant gas electrode by fuel jetted from a fuel electrode resulting in partial reduction of and damage to an oxidant gas electrode can thus be reliably prevented.

In the present invention the acceleration section preferably comprises a constricted flow path having a narrowed flow path cross section through which fuel flows.

In the invention thus constituted, the acceleration section is constituted by a constricted flow path disposed at the end portion of the individual fuel cell units, so that damage to the oxidant gas electrodes by reduction can be prevented using a simple construction. In addition, by providing a constricted flow path, fuel flowing out from the fuel electrode side after a shutdown stop can be decreased, allowing the fuel accumulated on the fuel electrode side to be kept on the fuel electrode for a long time period. The risk of a reverse flow of oxidant gas from the oxidant gas electrode side to the fuel electrode side leading to oxidation of the fuel electrode can thus be further decreased.

In the present invention the constricted flow path is preferably constituted so that the pressure on the fuel electrode side of the fuel cell stack is maintained in a higher state than the pressure on the oxidant gas electrode side over a predetermined period following the shutdown stop.

In the invention thus constituted, the constricted flow path is constituted so that a high pressure state on the fuel electrode side is maintained for a predetermined time period after a shutdown stop, therefore even after a temperature drop operation, reverse flow of oxidant gas to the fuel electrode side is prevented, and the risk of fuel electrode oxidation can be well reduced.

In the invention the constricted flow path is preferably constituted so that even when the pressure on the oxidant gas electrode side of the fuel cell stack has been risen by the temperature drop operation, the pressure on the fuel electrode side is still higher than the pressure on the oxidant gas electrode side.

In the invention thus constituted, the constricted flow path is constituted so that the pressure on the fuel electrode side is high even when oxidant gas is supplied due to temperature drop operation, so there is no risk of a reverse flow of oxidant gas, and temperature drop operation can be executed.

In the present invention the constricted flow path is preferably configured so that the pressure drop on the fuel electrode side after a shutdown stop is more gradual than the pressure drop on the oxidant gas electrode side.

In the invention thus constituted, the constricted flow path is constituted so that the pressure drop on the fuel electrode side after a shutdown stop is more gradual than on the oxidant gas electrode side, therefore after a shutdown stop, a high pressure state on the fuel electrode side can be maintained over a long time period, and a reverse flow of oxidant gas can be prevented, even if the fuel cell module has been left alone.

The present invention furthermore preferably comprises a voltage detection sensor that detects the output voltage of the fuel cell module, and the controller comprises a temperature drop operation halt circuit, wherein the temperature drop operation halt circuit halts the temperature drop operation in cases where the voltage detected by the voltage detection sensor satisfies predetermined stopping conditions during the temperature drop operation in which power is not being extracted from the fuel cell module after the shutdown stop.

The invention thus constituted comprises a temperature drop operation halt circuit for halting temperature drop operation when a voltage detected by a voltage detection sensor satisfies predetermined stopping conditions, therefore a reverse flow of oxidant gas can be appropriate sensed, and the supply of oxidant gas can be immediately stopped.

In cases where the temperature drop operation halt circuit immediately stops the supply of oxidant gas even after the occurrence of a reverse flow of oxidant gas is sensed, the stopping of supply causes pressure on the oxidant gas electrode side to drop and pressure on the fuel electrode side to become relatively high. Fuel which had been retained on the fuel electrode side is therefore again filled into the part of the fuel electrode side where oxidant gas had penetrated. Thus even if part of the fuel electrode had been oxidized due to penetration of oxidant gas, the filling in of fuel on the fuel electrode side with the fuel electrode at a high temperature results in re-reduction by fuel of the oxidized parts of the fuel electrode, so that degradation and damage can be well suppressed.

In the invention the shutdown stopping circuit is preferably constituted so that the temperature drop operation is executed over a predetermined temperature drop operation execution period after the shutdown stop, and the temperature drop operation halt circuit stops the temperature drop operation when a detected voltage satisfies stopping conditions during the temperature drop operation execution period.

In the invention thus constituted, the temperature drop operation is stopped when the detected voltage satisfies stopping conditions, therefore the temperature drop operation can be immediately stopped when a reverse flow of oxidant gas to the fuel electrode side has started. By this means the risk of fuel electrode oxidation can be reliably avoided even when the temperature drop operation execution period has been set to a significantly long time.

In the present invention the shutdown stop circuit preferably does not execute the temperature drop operation when the fuel cell stack temperature at the time of the shutdown stop is below a predetermined temperature.

In the invention thus constituted, a temperature drop operation is not executed when the fuel cell stack temperature is below a predetermined temperature, therefore no temperature drop operation is performed when the temperature is low and the amount of fuel jetted from the fuel cell stack is small. For this reason oxidant gas is supplied in a state in which there is little need for a temperature drop operation, and the risk of oxidizing a fuel electrode can be avoided.

The present invention preferably further has a temperature detection sensor that detects the temperature of the fuel cell stack, wherein after the shutdown stop, the shutdown stop circuit executes a temperature drop operation in response to the temperature detected by the temperature detection sensor.

In the invention thus constituted, a temperature drop operation supplying oxidant gas after a shutdown stop is executed in response to the temperature detected by a temperature detection sensor, therefore gases in the fuel cell module can be appropriately discharged in response to the running state prior to shutdown stop, and oxidation of the fuel electrode and reduction of the oxidant gas electrode can be fully constrained.

In the present invention after a shutdown stop, the shutdown stop circuit preferably reduces the total amount of oxidant gas supplied during the temperature drop operation more when the temperature detected by the temperature detection sensor is low than when it is high, or the shutdown stop circuit does not execute the temperature drop operation when the temperature detected by the temperature detection sensor is below a predetermined temperature.

In general, it was assumed that during the period before a shutdown stop, the solid oxide fuel cell system was being operated at a low output when the temperature of a fuel cell stack was low. In such cases, it was believed that because the amount of fuel supplied during an electrical generation operation was small, the fuel remaining on the fuel electrode side of the fuel cell stack at the time of a shutdown stop would also be small. In such a state there is a high possibility that when an excessive temperature drop operation is executed, the pressure on the oxidant gas electrode side relative to the pressure on the fuel electrode side will become too high, causing a reverse flow. In the invention thus constituted, when the detected temperature is low, the total amount of oxidant gas supplied during a temperature drop operation is reduced more than when the detected temperature is high, therefore a large quantity of oxidant gas is fed in when there is little fuel remaining on the fuel electrode side, and the risk of a reverse flow of oxidant gas can be reliably avoided. Also, in the invention thus constituted no temperature drop operation is executed when the detected temperature is below a predetermined temperature, therefore the risk of a reverse flow of oxidant gas can be reliably avoided.

In the present invention the controller preferably has a pre-shutdown operation circuit, and in cases where the fuel cell stack temperature is higher than a predetermined shutdown stop temperature, the pre-shutdown operation circuit executes a pre-shutdown operation to increase the amount of oxidant gas supplied by the oxidant gas supply apparatus before the shutdown stop so that the temperature of the fuel cell stack is reduced, and then a temperature drop operation is executed after a shutdown stop.

In the invention thus constituted, pre-shutdown operation to reduce the temperature is executed when the temperature is higher than the shutdown stop temperature, so performing a shutdown stop can be avoided when the fuel cell stack temperature is excessively high, or excessive fuel remains on the fuel electrode side at the time of a shutdown stop, and the risk of oxidation of a fuel electrode or reduction of an oxidant gas electrode after a temperature drop operation can be reduced.

In the present invention the pre-shutdown operation circuit preferably continues the pre-shutdown operation until temperature of the fuel cell stack drops to the shutdown stop temperature, after which the shutdown stop is executed.

In the invention thus constituted, pre-shutdown operation is continued until the temperature falls to the shutdown stop temperature, so an upper limit to the temperature can be defined when performing a shutdown stop, and oxidation of the fuel electrode and reduction of the oxidant gas electrode can be fully constrained by a temperature drop operation thereafter.

Effect of the Invention

Using the solid oxide fuel cell of the present invention, oxidation of fuel electrodes in individual fuel cells can be fully suppressed, and reduction of oxidant gas electrodes (air electrodes) avoided, while executing a shutdown stop.

BRIEF DESCRIPTION OF THE DRAWINGS

FIG. 29 is an execution condition table for pre-shutdown operation and temperature drop operation in each stop mode and temperature band.

FIG. 30 is a timing chart schematically showing in a time line an example of stopping behavior in a conventional solid oxide fuel cell system.

DETAILED DESCRIPTION OF THE PREFERRED EMBODIMENTS

Next, referring to the attached drawings, we discuss a solid oxide fuel cell system (SOFC) according to an embodiment of the present invention.

Figure 1:
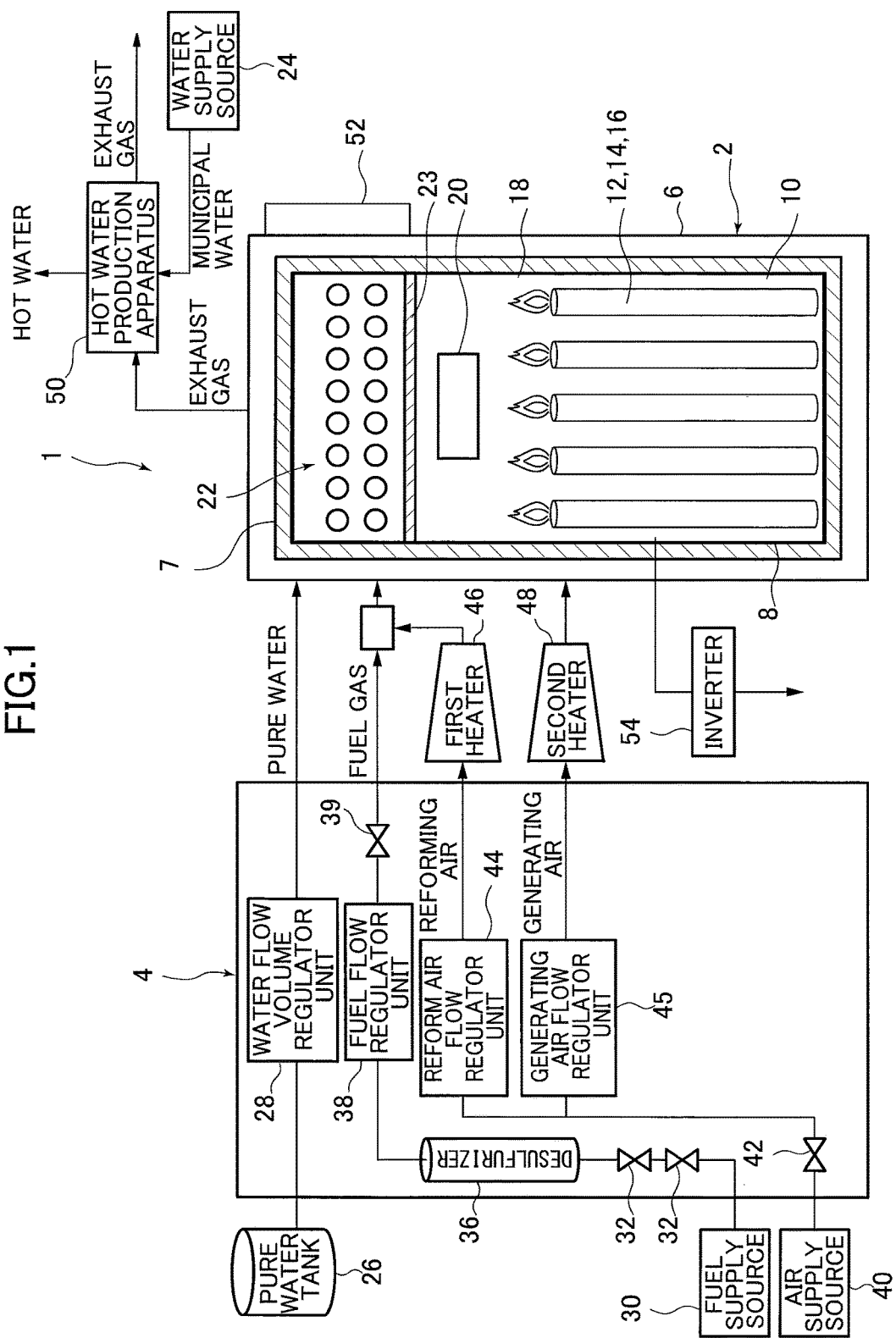
FIG. 1 is an overview schematic showing a fuel cell apparatus according to a first embodiment of the present invention.

FIG. 1 is an overview schematic of a solid oxide fuel cell system (SOFC) according to a first embodiment of the present invention. As shown in FIG. 1, the solid oxide fuel cell system (SOFC) of the first embodiment of the present invention is furnished with a fuel cell module 2 and an auxiliary unit 4.

Fuel cell module 2 comprises a housing 6; a metal case 8 is built into the interior of housing 6, mediated by insulation 7. Fuel cell assembly 12, which performs an electricity generating reaction using fuel gas and oxidant gas (air), is disposed on generating chamber 10, under case 8, which is a sealed space. This fuel cell assembly 12 comprises 10 fuel cell stacks 14 (see FIG. 5); fuel cell stacks 14 comprise 16 fuel cell units 16 (see FIG. 4). Thus fuel cell assembly 12 has 160 fuel cell units 16, and all of these fuel cell units 16 are connected in series.

A combustion chamber 18, being a combustion section, is formed at the top of the above-described generating chamber 10 in case 8 of fuel cell module 2; residual fuel and residual oxidant (air) not used in the electrical generation reaction is combusted in this combustion chamber 18 to produce an exhaust gas. Furthermore, case 8 is covered by insulation 7, and diffusion to the outside atmosphere of heat inside fuel cell module 2 is suppressed.

Reformer 20 for reforming fuel is disposed at the top of combustion chamber 18; combustion heat from residual gas heats reformer 20 to a temperature at which the reforming reaction can occur. Disposed above this reformer 20 is an air-heat exchanger 22, being a heat exchanger for heating generating air using combustion gas from residual gas to pre-heat the generating air.

Next auxiliary unit 4 comprises a pure water tank 26 which stores water obtained by condensing moisture contained in exhaust from fuel cell module 2 and purifies it using a filter, and a water flow volume regulator unit 28 (a "water pump" or the like driven by a motor) for adjusting the flow volume of water supplied from this water storage tank. Auxiliary unit 4 comprises a gas shutoff valve 32 for shutting off gas supplied from a municipal gas or other fuel supply source 30, a desulfurizer 36 for removing sulfur from fuel gas, a fuel flow regulator unit 38 (a motor-driven "fuel pump" or the like) for regulating the flow volume of fuel gas, and a valve 39 for shutting off fuel gas flowing out from fuel flow regulator unit 38 during a loss of power. Furthermore, auxiliary unit 4 comprises: an electromagnetic valve 42 for shutting off air, which is the oxidant gas supplied from air supply source 40, reforming air flow regulator unit 44 and generating air flow regulator unit 45 (a motor-driven "air blower" or the like), which regulate the flow volume air, first heater 46 for heating reforming air supplied to reformer 20, and second heater 48 for heating air supplied to the electrical generating chamber. This first heater 46 and second heater 48 are provided in order to efficiently raise the temperature at startup, but may also be omitted.

Next, connected to fuel cell module 2 is a hot-water production device 50, supplied with exhaust gas. Tap water is supplied from water supply source 24 to this hot water production device 50; this tap water becomes hot water using the heat of the exhaust gas, and is supplied to an external hot water holding tank, not shown.

A control box 52 for controlling the amount of fuel gas supplied, etc. is connected to fuel cell module 2.

In addition, an inverter 54 serving as an electrical power extraction unit (electrical power conversion unit) for supplying electrical power generated by the fuel cell module to the outside is connected to fuel cell module 2.

Figure 2:
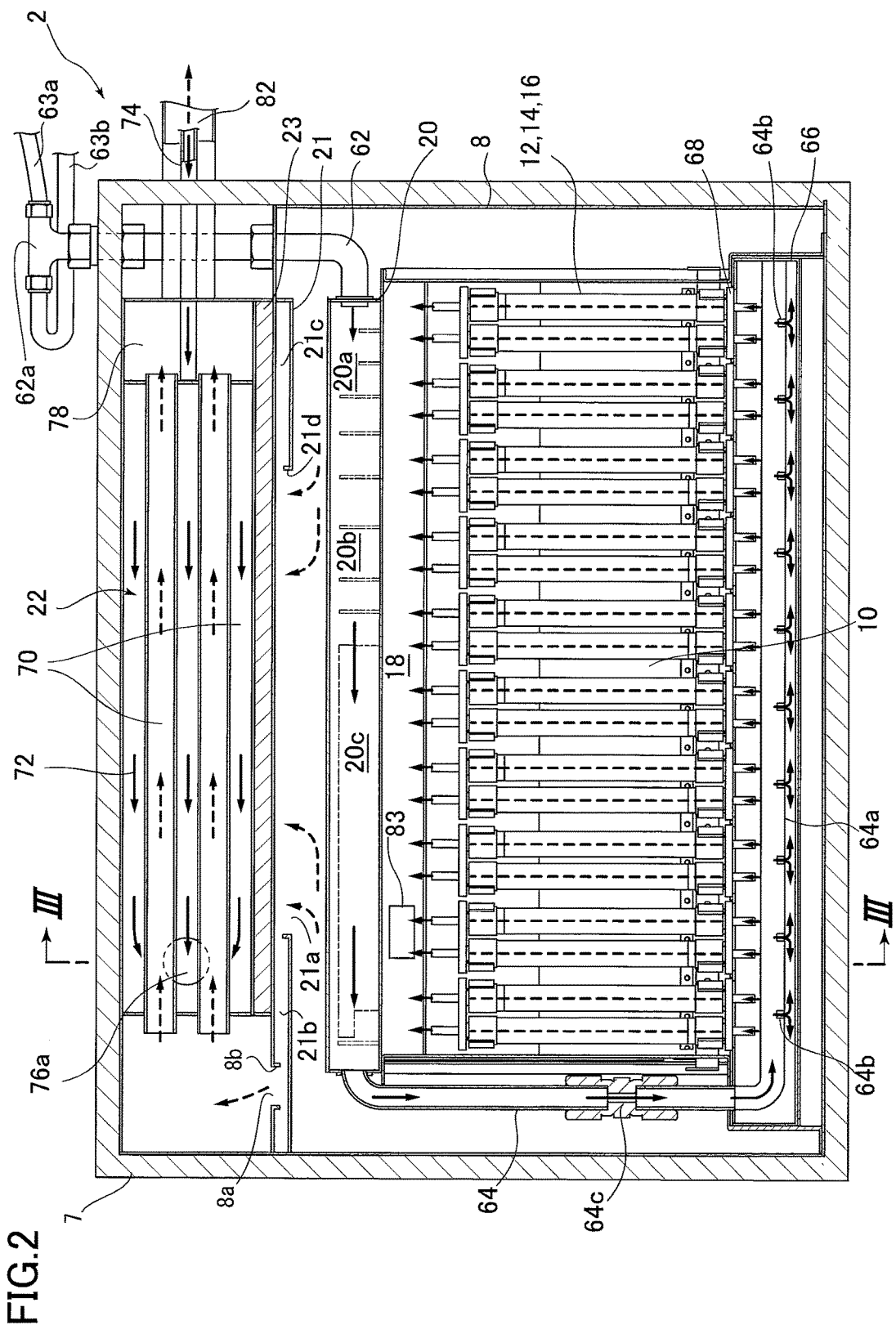
FIG. 2 is a front elevation cross section showing a fuel cell module in a fuel cell apparatus according to a first embodiment of the present invention.
Figure 3:
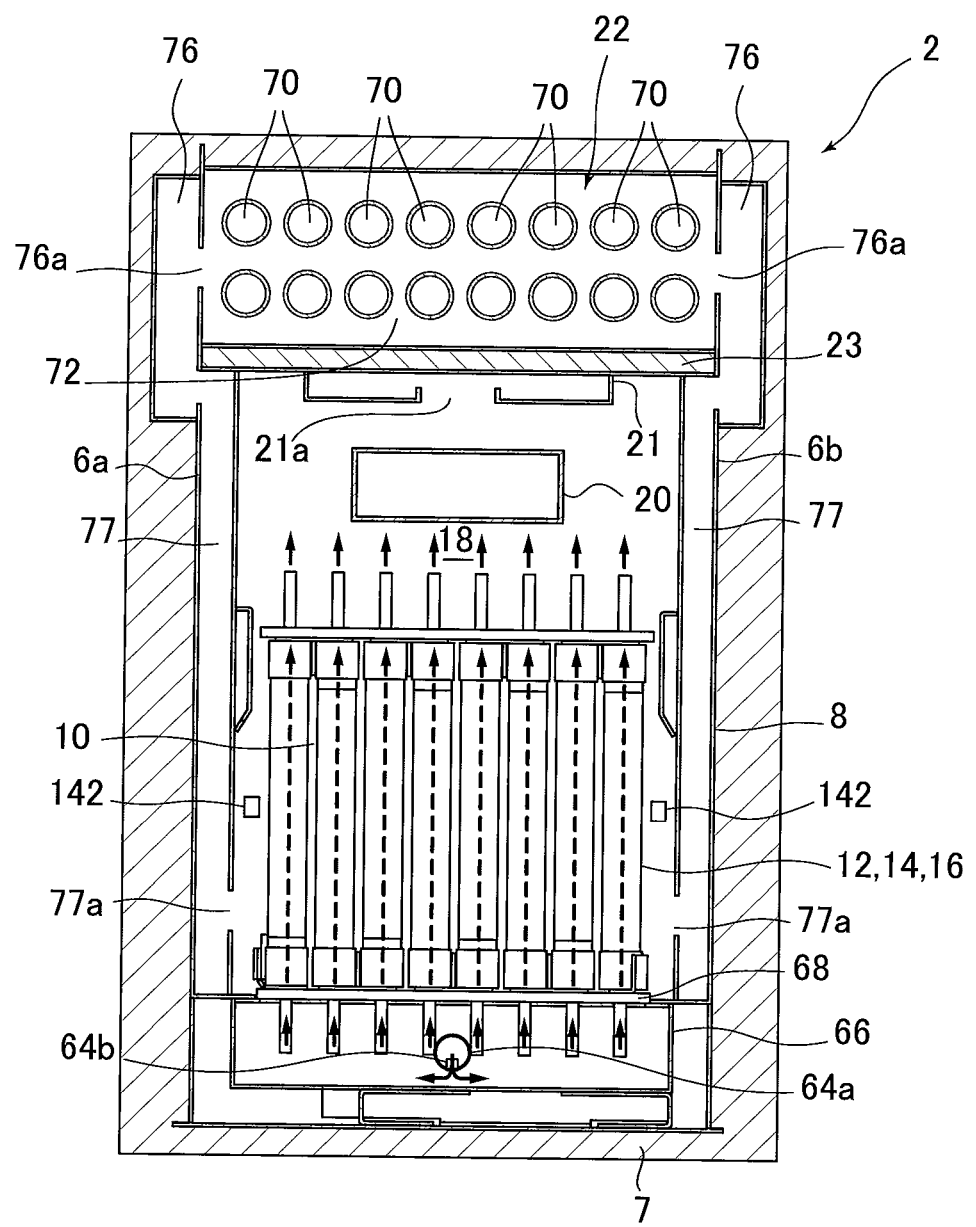
FIG. 3 is a cross section along line in FIG. 2.

Next, referring to FIGS. 2 and 3, we explain the internal structure of the fuel cell module in a solid oxide fuel cell system (SOFC) according to a first embodiment of the present invention. FIG. 2 is a side elevation cross section showing a fuel cell module in a solid oxide fuel cell system (SOFC) according to a first embodiment of the present invention; FIG. 3 is a cross section along line III-III in FIG. 2.

As shown in FIGS. 2 and 3, fuel cell assembly 12, reformer 20, and air heat exchanger 22 are disposed in order starting from the bottom, as described above, in case 8 within housing 6 of fuel cell module 2.

A reformer introducing pipe 62 for introducing pure water, reformed fuel gas, and reforming air is attached to the end portion side surface on the upstream side of reformer 20.

Reformer introducing pipe 62 is a round pipe extending from the side wall surface at one end of reformer 20; it bends 90° and extends essentially in a plumb direction, penetrating the top end surface of case 8. Note that reformer-introducing pipe 62 functions as a water-introducing pipe for introducing water into reformer 20. T-pipe 62a is connected to the top end of reformer-introducing pipe 62, and piping for supplying fuel gas and pure water is respectively connected to both end portions of a pipe extending in approximately the horizontal direction of this T-pipe 62a. Water supply piping 63a extends diagonally upward from one end of T-pipe 62a. Fuel gas supply piping 63b extends horizontally from the other end of T-pipe 62a, then is bent in a U shape and extends approximately horizontally in the same direction as water supply piping 63a.

At the same time, in order starting upstream, vaporizing section 20a, blending section 20b, and reforming section 20c are formed in the interior of reformer 20, and reforming section 20c is filled with reforming catalyst. Fuel gas and air, blended with steam (pure water) introduced into reformer 20, is reformed using the reforming catalyst with which reformer 20 is filled. Reforming catalysts in which nickel is applied to the surface of aluminum spheres, or ruthenium is applied to the surface of aluminum spheres, are used as appropriate.

A fuel gas supply line 64 is connected to the downstream end of reformer 20; this fuel gas supply line 64 extends downward, then further extends horizontally within a manifold formed under fuel cell assembly 12. Multiple fuel supply holes 64b are formed on the bottom surface of the horizontal portion 64a of fuel gas supply line 64; reformed fuel gas is supplied into manifold 66 from these fuel supply holes 64b. A pressure fluctuation-suppressing flow resistance section 64c in which the flow path is narrowed is provided in the middle of the vertical portion of fuel gas supply pipe 64, and flow path resistance in the fuel gas supply flow path is thereby adjusted. Adjustment of flow path resistance is discussed below.

A lower support plate 68 provided with through holes supporting the above-described fuel cell stack 14 is attached at the top of manifold 66, and fuel gas in manifold 66 is supplied into fuel cell units 16.

At the same time, an air heat exchanger 22 is provided over reformer 20.

Also, as shown in FIG. 2, an ignition apparatus 83 for starting the combustion of fuel gas and air is disposed on combustion chamber 18.

Figure 4:
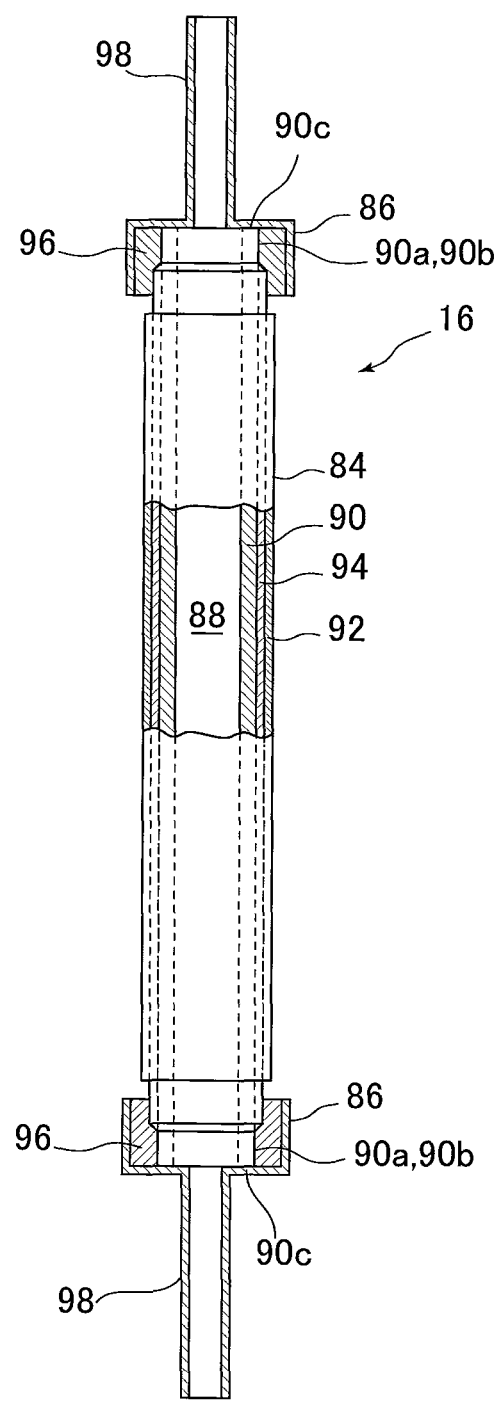
FIG. 4 is a partial cross section showing fuel cell unit in a fuel cell apparatus according to a first embodiment of the present invention.

Next, referring to FIG. 4, we explain fuel cell units 16. FIG. 4 is a partial cross section showing fuel cell units of a solid oxide fuel cell system (SOFC) according to a first embodiment of the present invention.

As shown in FIG. 4, individual fuel cells 16 comprise individual fuel cells 84 and inside electrode terminals 86, which are caps respectively connected to both side portions of individual fuel cells 84.

Fuel cell 84 is a tubular structure extending vertically, equipped with a cylindrical internal electrode layer 90, on the inside of which is formed a fuel gas flow path 88, a cylindrical external electrode layer 92, and an electrolyte layer 94 between internal electrode layer 90 and external electrode layer 92. This internal electrode layer 90 is a fuel electrode through which fuel gas passes, and has a (−) polarity, while the external electrode layer 92 is an air-contacting electrode with a (+) polarity.

The internal electrode terminals 86 attached at the top and bottom ends of individual fuel cells 84 have the same structure, therefore here we specifically discuss internal electrode terminal 86 attached at the top end. The top portion 90a of inside electrode layer 90 comprises an outside perimeter surface 90b and top end surface 90c, exposed to electrolyte layer 94 and outside electrode layer 92. Inside electrode terminal 86 is connected to the outer perimeter surface of inside electrode layer 90 through conductive seal material 96, and is electrically connected to inside electrode layer 19 by direct contact with the top end surface 90c of inside electrode layer 90. Fuel gas flow path fine tubing 98 communicating with inside electrode layer 90 fuel gas flow path 88 is formed at the center portion of inside electrode terminal 86.

This fuel gas flow path fine tubing 98 is elongated fine tubing disposed to extend in the axial direction of individual fuel cells 84 from the center of inside electrode terminals 86. Therefore a predetermined pressure loss occurs in the flow of fuel gas flowing from manifold 66 (FIG. 2) through the fuel gas flow path fine tubing 98 in the lower inside electrode terminals 86 into fuel gas flow path 88. Fuel gas flow path fine tubing 98 on the lower inside electrode terminals 86 therefore acts as an inflow-side flow resistance section, and the flow path resistance thereof is set at a predetermined value. A predetermined pressure loss also occurs in the flow of fuel gas flowing out from fuel gas flow path 88 through fuel gas flow path fine tubing 98 in upper inside electrode terminals 86 into combustion chamber 18 (FIG. 2). Therefore fuel gas flow path fine tubing 98 on the upper inside electrode terminals 86 acts as an outflow-side flow resistance section, and the flow path resistance thereof is set at a predetermined value.

Inside electrode layer 90 is formed, for example, from at least one of a mixture of Ni and zirconia doped with at least one type of rare earth element selected from among Ni, Ca, Y, Sc, or the like; or a mixture of Ni and ceria doped with at least one type of rare earth element; or any mixture of Ni with lanthanum gallate doped with at least one element selected from among Sr, Mg, Co, Fe, or Cu.

The electrolyte layer 94 is formed, for example, from at least one of the following: zirconia doped with at least one type of rare earth element selected from among Y, Sc, or the like; ceria doped with at least one type of selected rare earth element; or lanthanum gallate doped with at least one element selected from among Sr or Mg.

Outside electrode layer 92 is formed, for example, from at least one of the following: lanthanum manganite doped with at least one element selected from among: Sr or Ca; lanthanum ferrite doped with at least one element selected from among Sr, Co, Ni, or Cu; lanthanum cobaltite doped with at least one element selected from among Sr, Fe, Ni, or Cu; silver, or the like.

Figure 5:
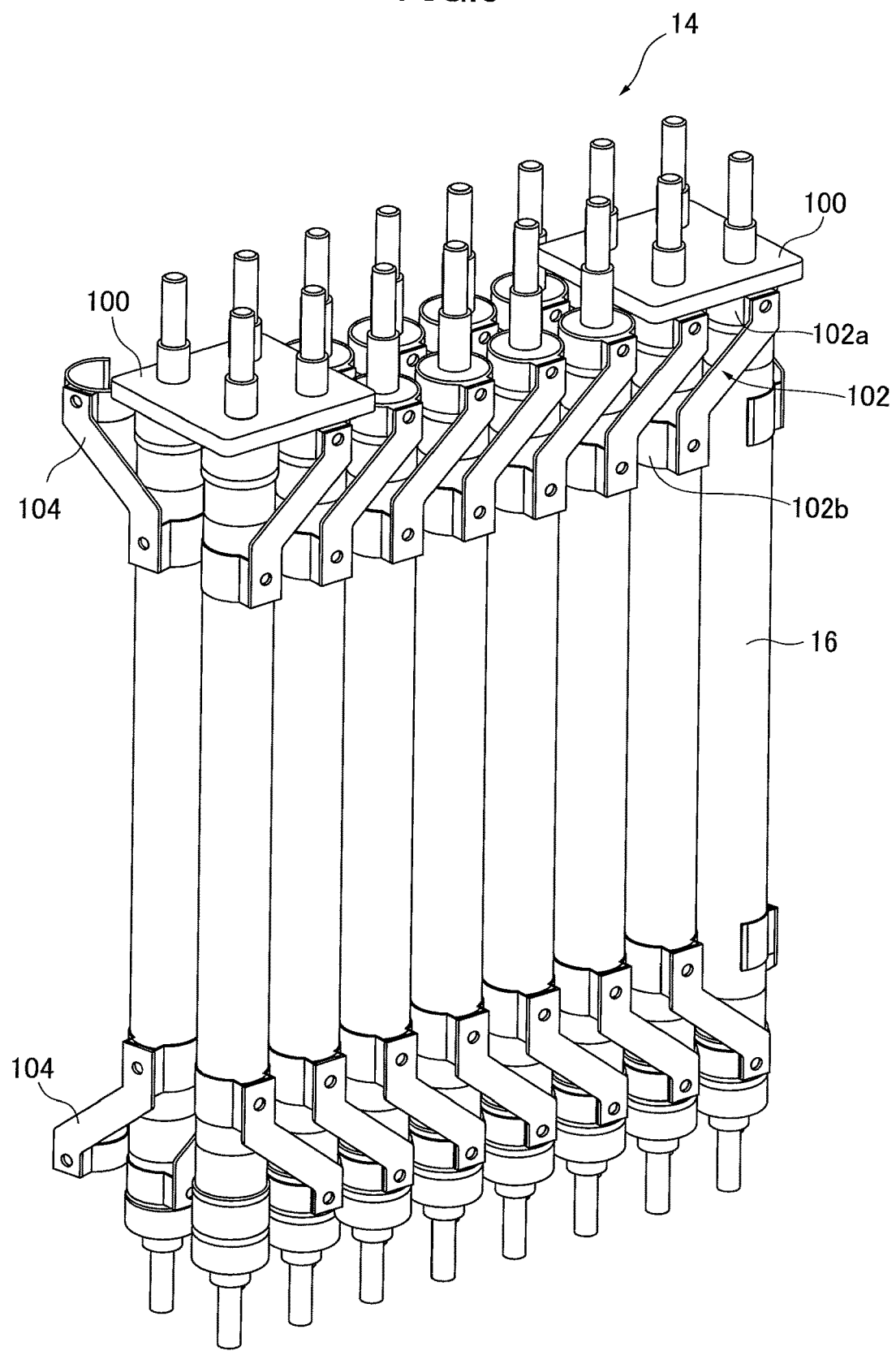
FIG. 5 is a perspective view showing a fuel cell stack in a fuel cell apparatus according to a first embodiment of the present invention.

Next, referring to FIG. 5, we explain fuel cell stack 14. FIG. 5 is a perspective view showing a fuel cell stack in a solid oxide fuel cell system (SOFC) according to a first embodiment of the present invention.

As shown in FIG. 5, fuel cell stack 14 comprises 16 fuel cell units 16; these fuel cell units 16 are disposed in 2 rows of 8. the fuel cell units 16 is supported on the bottom side by a ceramic elongated lower support plate 68 (FIG. 2); on the top side it is supported by 2 approximately square upper support plates 100, on both sides of which are 4 of the fuel cell units 16 at both ends. Through holes through which inside electrode terminals 86 can penetrate are provided on this lower support plate 68 and outer support plates 100.

In addition, a collector 102 and an external terminal 104 are attached to fuel cell units 16. This collector 102 is integrally formed to connect a fuel electrode connecting portion 102a, electrically connected to inside electrode terminal 86 attached to inside electrode layer 90 serving as fuel electrode, and an air electrode connecting portion 102b, electrically connected to the external perimeter of outside electrode layer 92 serving as air electrode. A silver thin film is formed as an air electrode-side electrode over the entirety of the outside surface of outside electrode layer 92 (air electrode) on each of the individual fuel cells units 16. The contact by air electrode connecting portion 102b with this thin film surface results in an electrical connection between current collector 102 and the entire air electrode.

Furthermore, positioned at the ends of fuel cell stack 14, two external terminals 104 are respectively connected to the inside electrode terminals 86 on fuel cell units 16. These external terminals 104 are connected to the inside electrode terminals 86 on fuel cell units 16 at the edges of adjacent fuel cell stacks 14, and as described above, all 160 of the fuel cell units 16 are connected in series.

Figure 6:
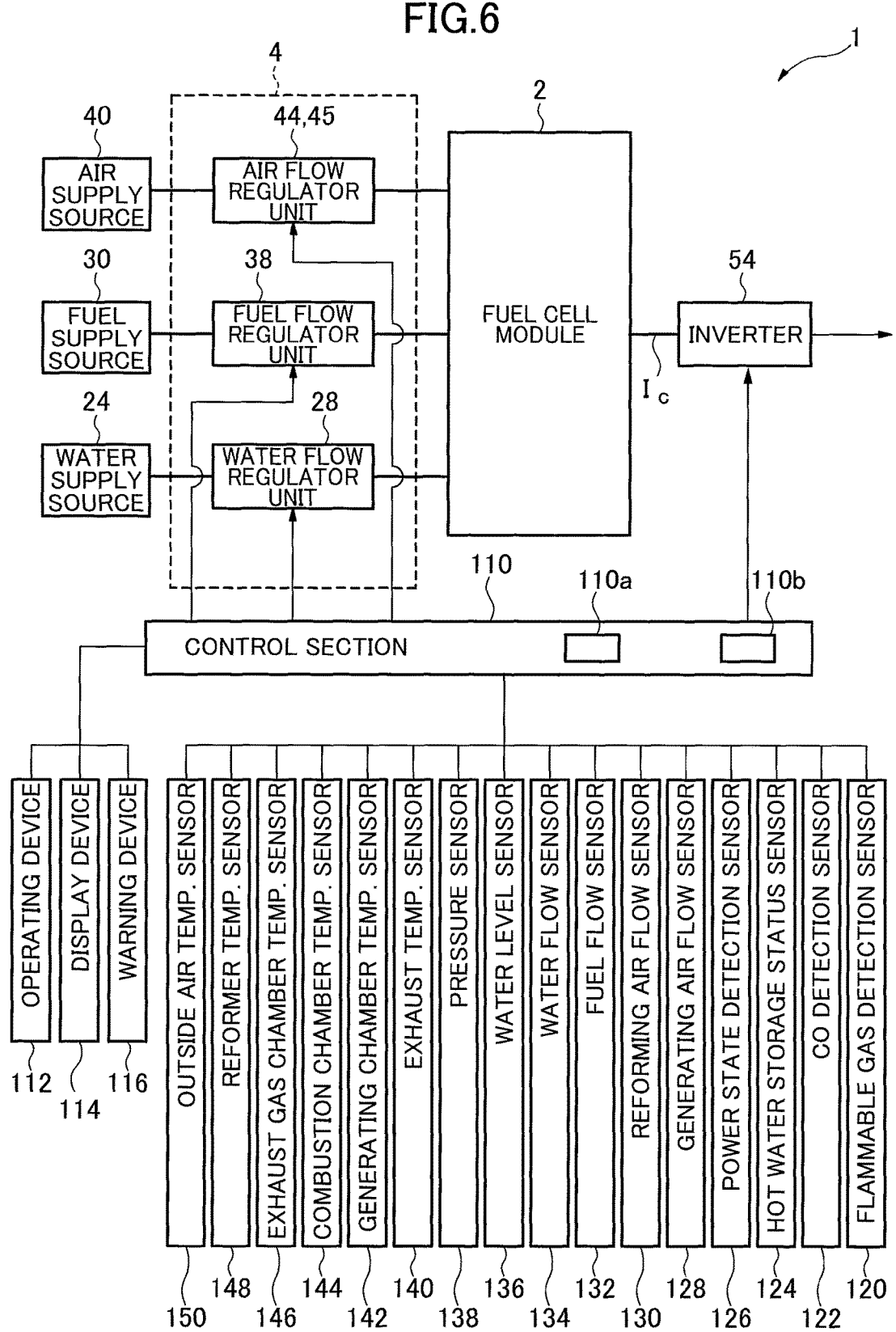
FIG. 6 is a block diagram showing a fuel cell apparatus according to a first embodiment of the present invention.

Next, referring to FIG. 6, we explain the types of sensors attached to a solid oxide fuel cell system (SOFC) according to the present embodiment. FIG. 6 is a block diagram of a solid oxide fuel cell system (SOFC) according to a first embodiment of the present invention.

As shown in FIG. 6, a solid oxide fuel cell system 1 is furnished with a control section 110; connected to this control section 110 are an operating device 112 provided with operating buttons such as "ON" or "OFF" for user operation, a display device 114 for displaying various data such as a generator output value (Watts), and a notification device 116 for issuing warnings during abnormal states and the like. A microprocessor, memory, and program to operate these (the above are not shown) are built into control section 110; auxiliary unit 4, inverter 54, and the like are controlled by these, based on input signals from each of the sensors. Note that this notification device 116 may also be connected to a management center in a remote location to inform the management center of abnormal states.

Next, signals from the various sensors described below are input to control section 110.

First, flammable gas detection sensor 120 has the purpose of detecting gas leaks, and is attached to fuel cell module 2 and auxiliary unit 4.

The purpose of flammable gas detection sensor 120 is to detect whether CO in the exhaust gas, which is supposed to be discharged to the outside via exhaust gas conduit 80, has leaked into the external housing (not shown) which covers fuel cell module 2 and auxiliary unit 4.

A water reservoir state detection sensor 124 detects the temperature and amount of hot water in a water heater (not shown).

An electrical power state detection sensor 126 detects current, voltage, and the like in inverter 54 and in a distribution panel (not shown).

A generator air flow detection sensor 128 detects the flow volume of generating air supplied to generating chamber 10.

A reforming air flow volume sensor 130 detects the flow volume of reforming air supplied to reformer 20.

A fuel flow volume sensor 132 detects the flow volume of fuel gas supplied to reformer 20.

A water flow volume sensor 134 detects the flow volume of pure water supplied to reformer 20.

A water level sensor 136 detects the water level in pure water tank 26.

Pressure sensor 138 detects pressure on the upstream side outside reformer 20.

An exhaust temperature sensor 140 detects the temperature of exhaust gas flowing into hot water producing device 50.

As shown in FIG. 3, generating chamber temperature sensor 142 is disposed on the front surface side and rear surface side around fuel cell assembly 12, and has the purpose of detecting the temperature near fuel cell stack 14 and estimating the temperature of fuel cell stack 14 (i.e., of the fuel cells 84 themselves).

A combustion chamber temperature sensor 144 detects the temperature in combustion chamber 18.

Exhaust gas chamber temperature sensor 146 detects the temperature of exhaust gases in exhaust gas chamber 78.

Reformer temperature sensor 148 detects the temperature of reformer 20; it calculates the reformer 20 temperature from the intake and exit temperatures on reformer 20.

An outside temperature sensor 150 detects the outside temperature when a solid oxide fuel cell system (SOFC) is placed out of doors. Sensors to detect outside atmospheric humidity and the like may also be provided.

Signals from these various sensors are sent to control section 110; control section 110 sends control signals to water flow regulator unit 28, fuel flow regulator unit 38, reforming air flow regulator unit 44, and generating air flow regulator unit 45 based on data from the sensors, and controls the flow volumes in each of these units.

Figure 7:
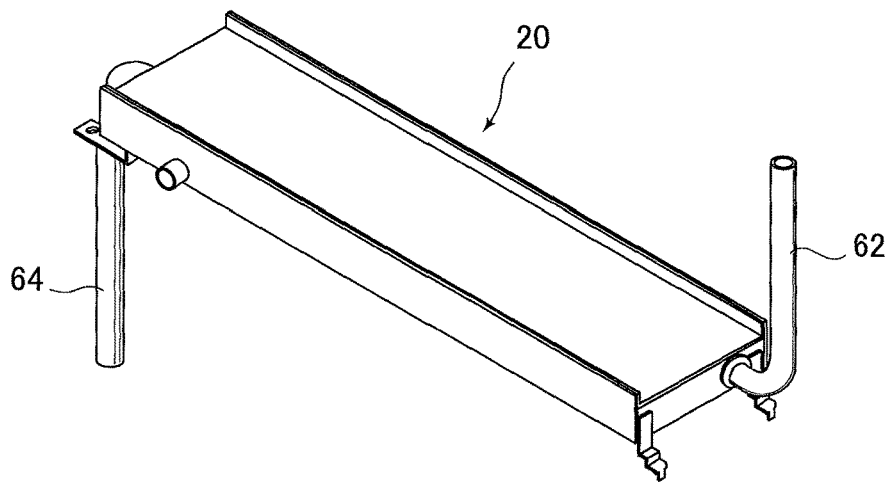
FIG. 7 is a perspective view of a reformer in a fuel cell apparatus according to a first embodiment of the present invention.
Figure 8:
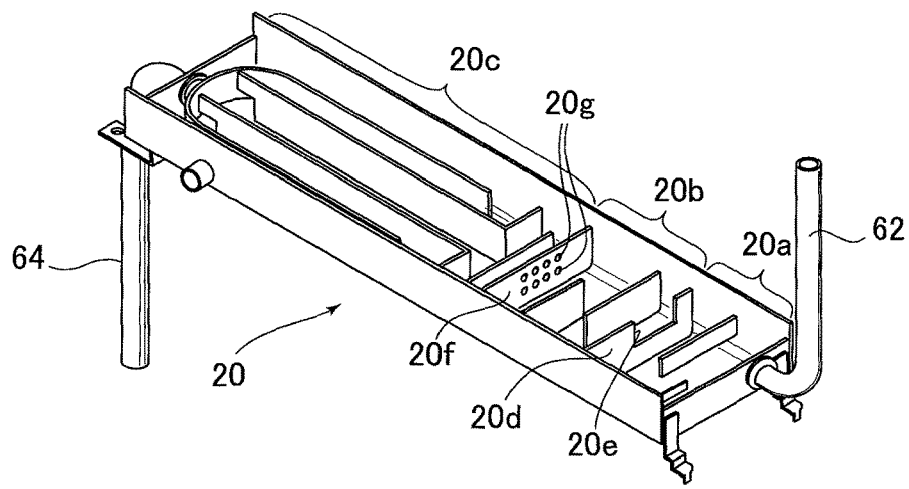
FIG. 8 is a perspective view showing the interior of a reformer with the top plate removed of the reformer removed, in a fuel cell apparatus according to a first embodiment of the present invention.
Figure 9:
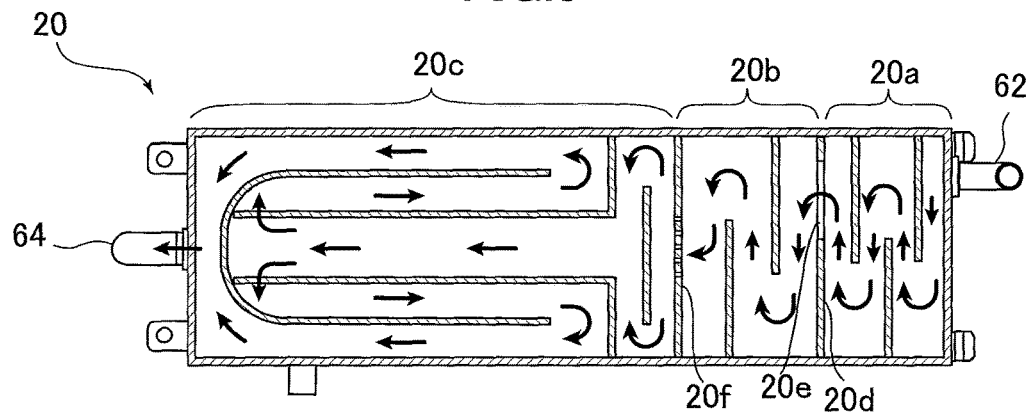
FIG. 9 is a plan view showing a cross section of the flow of fuel inside a reformer in a fuel cell apparatus according to a first embodiment of the present invention.

Next, referring to FIGS. 7 through 9, we explain the detailed constitution of reformer 20.

FIG. 7 is a perspective view of reformer 20; FIG. 8 is a perspective view showing the interior of reformer 20 with the top panel removed. FIG. 9 is a plan view cross section showing the flow of fuel inside reformer 20.

As shown in FIG. 7, reformer 20 is a cuboid metal box, filled internally with a reforming catalyst for reforming fuel. A reformer introducing pipe 62 is connected on the upstream side of reformer 20 for introducing water, fuel, and reforming air. In addition, a fuel gas supply pipe 64 is connected on the downstream side of reformer 20 for discharging fuel reformed in the interior of reformer 20.

As shown in FIG. 8, a vaporizing section 20a, being a vaporization chamber, is installed on the upstream side inside reformer 20; a blending section 20b is installed on the downstream side thereof, adjacent to vaporizing section 20a. Furthermore, a reforming section 20c is installed on the downstream side, adjacent to blending section 20b. A winding, serpentine passageway is formed within steam generating section 20a by the disposition of multiple partitioning plates. Water introduced into reformer 20 is vaporized at an elevated temperature inside vaporizing section 20a and becomes steam. Moreover, blending section 20b is constituted by a chamber having a predetermined volume; a winding, serpentine passageway is also formed on the interior thereof by the placement of multiple partitioning plates. Fuel gas and reforming air introduced into reformer 20 are mixed with steam produced in vaporizing section 20a as they pass through the winding passageway of blending section 20b.

At the same time, a winding passageway is also formed inside reforming section 20c by the disposition of multiple partitioning plates, and this passageway is filled with catalyst. When a mixture of fuel gas, steam, and reforming air which has passed through vaporizing section 20a is introduced, a partial oxidation reforming reaction and a steam reforming reaction occur in reforming section 20c. In addition, when a mixture of residual gas and steam is introduced, only the steam reforming reaction occurs in reforming section 20c.

Note that in the present embodiment the vaporizing section, blending section, and reforming section are constituted as a single piece, but as a variant example a reformer comprising only a reforming section can be provided, with a blending section and vaporization chamber placed adjacent thereto on the upstream side.

As shown in FIGS. 8 and 9, fuel gas, water, and reforming air introduced into vaporizing section 20a of reformer 20 flows in a serpentine manner in a direction traversing reformer 20; the introduced water vaporizes and become steam. A steam/blending section partition 20d is provided between vaporizing section 20a and blending section 20b; a partition opening 20e is installed on this steam/blending section partition 20d. This partition opening 20e is a rectangular opening placed in an approximately half the upper region in approximately one half of one side of steam/blending section partition 20d.

A blending/reforming section partition 20f is installed between blending section 20b and reforming section 20c; in this case a narrow flow path is formed by the placement of multiple communicating holes 20g in this blending/reforming section partition 20f. Fuel gas and the like blended inside blending section 20b flows into reforming section 20c through these communicating holes 20g.

After flowing in the longitudinal direction at the center of reforming section 20c, fuel and the like which has flowed into reforming section 20c is split into two parts and reversed; the two passageways then reverse again and are merged, facing the downstream end, and flow into fuel gas supply pipe 64. As it passes through the passageway, winding in the serpentine manner described, fuel is reformed by the catalyst with which the passageway is filled. Note that in some cases, boiling occurs inside vaporizing section 20a, by which a certain quantity of water is suddenly vaporized in a short time period, causing internal pressure to rise. However, a chamber of predetermined volume is constituted in blending section 20b, and narrow passageways are formed in blending/reforming section partition 20f, making it difficult for sudden fluctuations inside vaporizing section 20a to affect reforming section 20c. Therefore the narrow passageways between blending section 20b and blending/reforming section partition 20f function as a pressure fluctuation absorption means.

Figure 10:
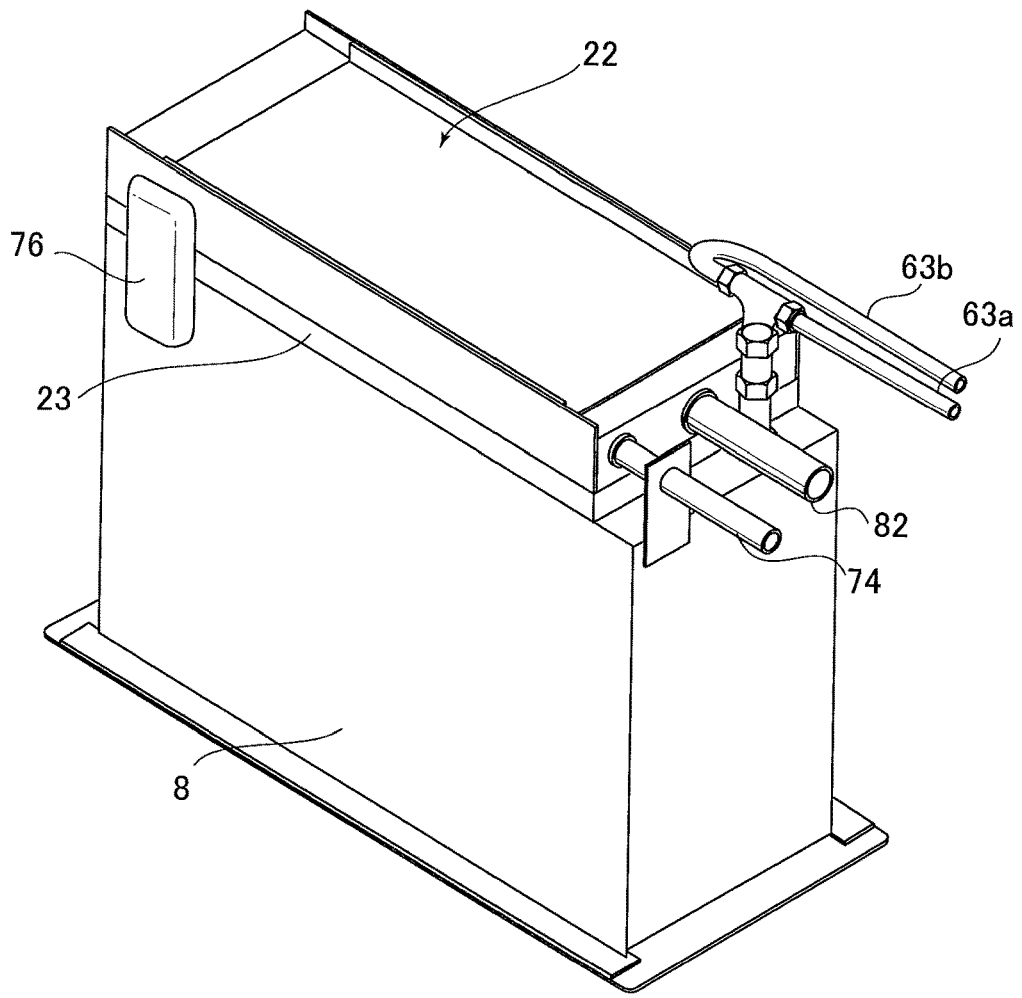
FIG. 10 is a perspective view showing a metal case and air heat exchanger housed within a housing in a fuel cell apparatus according to a first embodiment of the present invention.
Figure 11:
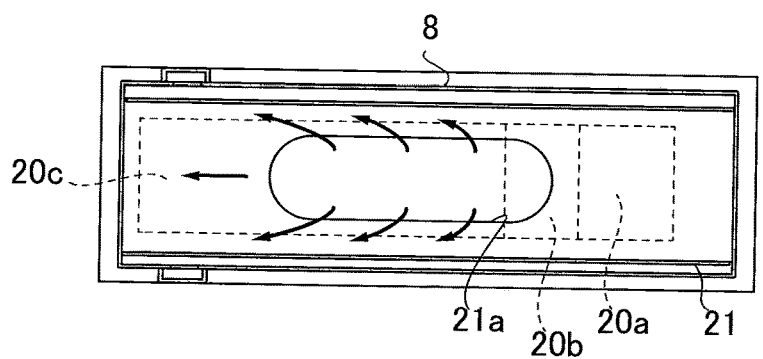
FIG. 11 is a cross section showing the positional relationship between insulation used in a heat exchanger and a vaporizing section in a fuel cell apparatus according to a first embodiment of the present invention.

Next, referring newly to FIGS. 10 and 11, and again to FIGS. 2 and 3, we explain details of the structure of air heat exchanger 22, which is a heat exchanger for oxidant gas used for electrical generation. FIG. 10 is a perspective view showing metal case 8 and air heat exchanger 22 housed inside housing 6. FIG. 11 is a cross section showing the positional relationship between the vaporization chamber insulation and the vaporizing section.

As shown in FIG. 10, air heat exchanger 22 is a heat exchanger disposed at the top of case 8 in the fuel cell module 2. As shown in FIGS. 2 and 3, a combustion chamber 18 is formed inside case 8, and multiple fuel cell units 16 and reformer 20, etc. are housed therein, therefore air heat exchanger 22 is positioned above these. Air heat exchanger 22 recovers heat from combustion gas combusted in combustion chamber 18 and discharged as exhaust and uses this heat to pre-heat air for electrical generation introduced into fuel cell module 2. As shown in FIG. 10, vaporization chamber insulation 23, being internal insulation, is sandwiched between the top surface of case 8 and the bottom surface of air heat exchanger 22. I.e., vaporization chamber insulation 23 is disposed between reformer 20 and air heat exchanger 22. In addition, insulation 7 (FIG. 2), being outside insulation, covers the outside of the air heat exchanger 22 and case 8 shown in FIG. 10.

As shown in FIGS. 2 and 3, air heat exchanger 22 has multiple combustion gas pipes 70 and generating air flow paths 72. As shown in FIG. 2, an exhaust gas collection chamber 78 is installed at one end portion on the multiple combustion gas pipes 70; this exhaust gas collection chamber 78 communicates with each of the combustion gas pipes 70. An exhaust gas discharge pipe 82 is connected to exhaust gas collection chamber 78. The other end portion of each of the combustion gas pipes 70 is left open; these open end portions communicate with the inside case 8 of combustion chamber 18 through communication openings 18a.

Combustion gas pipes 70 are multiple metal round tubes directed in the horizontal direction; each round tube is respectively horizontally disposed. On the other hand generating air flow paths 72 are constituted by spaces outside each of the combustion gas pipes 70. An oxidant gas introducing pipe 74 (FIG. 10) is connected at the end portion on the exhaust gas discharge pipe 82 side of generating air flow paths 72; air outside fuel cell module 2 is introduced into generating air flow paths 72 through oxidant gas introducing pipe 74. Note that, as shown in FIG. 10, oxidant gas introducing pipe 74 projects outward in the horizontal direction from air heat exchanger 22, parallel to exhaust gas discharge pipe 82. Furthermore, a pair of connecting flow paths 76 (FIG. 3, FIG. 10) are connected to both sides of the other end portion of generating air flow paths 72, and generating air flow paths 72 and each of the connecting flow paths 76 are respectively joined through outlet ports 76a.

As shown in FIG. 3, generating air supply paths 77 are respectively placed on both side surfaces of case 8. Each of the connecting flow paths 76 erected on both sides of air heat exchanger 22 respectively communicates with the top portion of generating air supply paths 77 installed on both sides of case 8. A large number of jet outlets 77a are arrayed in the horizontal direction at the bottom portion of each of the generating air supply paths 77. Air for electrical generation which has been supplied through each of the generating air supply paths 77 is jetted from the many jet outlets 77a toward the bottom side of fuel cell stack 14 in fuel cell module 2.

A flow straightening plate 21, being a partition, is attached to the ceiling surface inside case 8, and an opening portion 21a is provided in flow straightening plate 21.

Flow straightening plate 21 is a plate material horizontally disposed between the ceiling surface of case 8 and reformer 20. This flow straightening plate 21 is constituted to align the flow of gas flowing upward from combustion chamber 18, guiding it to the entrance of air heat exchanger 22 (communication opening 8a in FIG. 2). Generating air and fuel gas flowing upward from combustion chamber 18 flows into the top side of flow straightening plate 21 through opening portion 21a formed at the center of flow straightening plate 21, then flows leftward in FIG. 2 through exhaust passageway 21b between the top surface of flow straightening plate 21 and the ceiling surface of case 8, and is guided to the entrance of air heat exchanger 22. As shown in FIG. 11, opening portion 21a is placed above reforming section 20c on reformer 20; gas rising through opening portion 21a flows to exhaust passageway 21b on the left side of FIG. 2 and FIG. 11, on the opposite side of vaporizing section 20a. Therefore in the space above vaporizing section 20a (the right side in FIGS. 2 and 11), the flow of exhaust is slower than in the space above reforming section 20c, and acts as a gas retaining space 21c in which the flow of exhaust is detained.

A vertical wall 21d is installed at the edge of opening portion 21a in flow straightening plate 21 over the entire perimeter thereof; this vertical wall 21d causes the flow path to be narrowed from the space at the bottom side of flow straightening plate 21 flowing into exhaust passageway 21b on the top side of flow straightening plate 21. Furthermore, a suspended wall 8b (FIG. 2) is also installed over the entire perimeter of the edge of communication opening 8a to allow exhaust passageway 21b and air heat exchanger 22 to communicate; the flow path flowing into air heat exchanger 22 from exhaust passageway 21b is narrowed by this suspended wall 8b. The flow path resistance in the passageway by which exhaust reaches the outside of fuel cell module 2 through air heat exchanger 22 from combustion chamber 18 is adjusted by the provision of this vertical wall 21d and suspended wall 8b. Adjustment of flow path resistance is discussed below.

Vaporization chamber insulation 23 is attached to the bottom surface of air heat exchanger 22 so as to cover essentially the entirety thereof. Therefore vaporization chamber insulation 23 is disposed over the top of the entire vaporizing section 20a. This vaporization chamber insulation 23 is disposed to constrain the direct heating of the bottom surface of air heat exchanger 22 by high temperature gases inside exhaust passageway 21b and gas holding space 21c formed between the top surface of flow straightening plate 21 and the ceiling surface of case 8. Therefore during operation of fuel cell module 2, the amount of heat directly transferred from exhaust accumulated in the exhaust passageway at the top of vaporizing section 20a is low, and the temperature around vaporizing section 20a can easily rise. After fuel cell module 2 has been stopped, the disposition of vaporization chamber insulation 23 means that heat dissipation from reformer 20 is constrained, making it difficult for heat around vaporizing section 20a to be robbed by air heat exchanger 22, so the decline in the temperature of vaporizing section 20a is made gradual.

Note that in order to suppress dissipation of heat to the outside, vaporization chamber insulation 23 is outside insulation covering the entirety of case 8 and air heat exchanger 22 in fuel cell module 2, disposed inside insulation 7, separate from insulation 7. Insulation 7 has higher thermal insulation characteristics than vaporization chamber insulation 23. I.e., the heat resistance between inside and outside surfaces of insulation 7 is greater than the heat resistance between the inside and outside surface of vaporization chamber insulation 23. In other words, if insulation 7 and vaporization chamber insulation 23 are constituted of the same material, insulation 7 will be thicker than vaporization chamber insulation 23.

Next we explain the flow of fuel, generating air, and fuel gas during an electrical generation operation by solid oxide fuel cell system 1.

First, fuel is introduced into reformer 20 vaporizing section 20a through fuel gas supply piping 63b, T-pipe 62a, and reformer introducing pipe 62, and pure water is introduced into vaporizing section 20a through water supply piping 63a, T-pipe 62a, and reformer introducing pipe 62. Therefore supplied fuel and water is merged in T-pipe 62a, and is introduced into vaporizing section 20a through reformer introducing pipe 62. During an electrical generating operation, vaporizing section 20a is heated to a high temperature, therefore pure water introduced into vaporizing section 20a is vaporized relatively quickly to become steam. Vaporized steam and fuel are blended inside blending section 20b and flow into the reforming section 20c in reformer 20. Fuel introduced into reforming section 20c together with steam is here steam reformed into a fuel gas rich in hydrogen. Fuel reformed in reforming section 20c descends through fuel gas supply pipe 64 and flows into manifold 66, which is a dispersion chamber.

Manifold 66 is a cuboid space of a relatively large volume disposed on the bottom side of fuel cell stack 14; a large number of holes disposed on the top surface thereof communicate with the inside of the fuel cell units 16 constituting fuel cell stack 14. Fuel introduced into manifold 66 flows out through the large number of holes on the top surface thereof, through the fuel electrode side of fuel cell units 16, i.e. the interior of fuel cell units 16, from the top end thereof. When hydrogen gas, which is fuel, passes through the interior of fuel cell units 16, it reacts with oxygen in the air passing outside fuel cell units 16, which are air electrodes (oxidant gas electrodes), producing a charge. Residual fuel remaining unused for electrical generation flows out from the top ends of the fuel cell units 16 and is combusted inside the combustion chamber 18 disposed at the top of fuel cell stack 14.

At the same time, oxidant gas, which is the air used for electrical generation, is fed through oxidant gas introducing pipe 74 by generating air flow regulator unit 45, which is a generating oxidant gas supply apparatus, into fuel cell module 2. Air fed into fuel cell module 2 is introduced into generating air flow paths 72 in air heat exchanger 22 through oxidant gas introducing pipe 74, and is preheated. Preheated air flows out to each of the connecting flow paths 76 through each of the exit ports 76a (FIG. 3). Generating air flowing into each of the connecting flow paths 76 flows through the generating air supply paths 77 formed on both sides of fuel cell module 2, and is jetted from a large number of jet outlets 77a into generating chamber 10 toward fuel cell stack 14.

Air jetted into generating chamber 10 contacts the outside surface of fuel cell units 16, which is the air electrode side (oxidant gas electrode side) of fuel cell stack 14, and a portion of the oxygen in the air is used for electrical generation. Air into the bottom portion of generating chamber 10 through jet outlets 77a rises inside generating chamber 10 as it is used for electrical generation. Air which has risen inside generating chamber 10 causes fuel flowing out from the top end of fuel cell units 16 to combust. The combustion heat from this combustion heats the vaporizing section 20a, blending section 20b, and reforming section 20c of the reformer 20 disposed on top of fuel cell stack 14. After heating the upper reformer 20, combustion gas produced by the combustion of fuel passes through the upper opening portion 21a on reformer 20 and flows into the top side of flow straightening plate 21. Combustion gas flowing into the top side of flow straightening plate 21 is directed through the exhaust passageway 21b constituted by flow straightening plate 21 into communication opening 8a, which is the entrance to air heat exchanger 22. Combustion gas flowing into air heat exchanger 22 from communication opening 8a flows into the end portion of each of the opened combustion gas pipes 70, is subjected to heat exchange with generating air flowing in generating air flow paths 72 on the outside of each of the combustion gas pipes 70, and is collected in exhaust gas collection chamber 78. Exhaust gas collected in exhaust gas collection chamber 78 is discharged through exhaust gas discharge pipe 82 to outside fuel cell module 2. Vaporization of water in vaporizing section 20a and the endothermic steam reforming reaction in reforming section 20c are promoted, and generating air inside air heat exchanger 22 is preheated.

Figure 12:
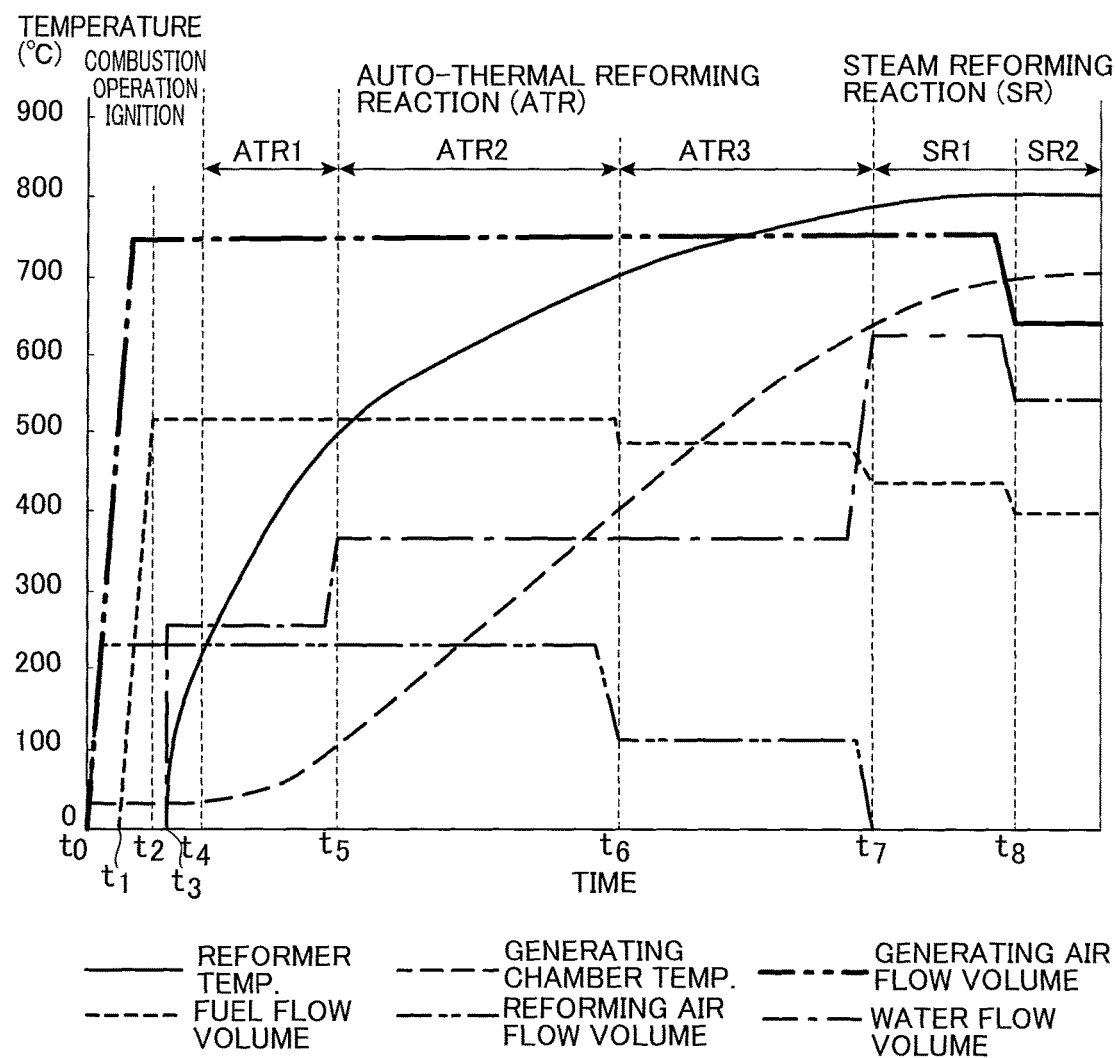
FIG. 12 is a timing chart showing an example of the supply amounts of fuel, etc. and temperatures of various parts, in the startup step of a fuel cell apparatus according to a first embodiment of the present invention.

Next, referring newly to FIG. 12, we explain control in the startup step of solid oxide fuel cell system 1.

FIG. 12 is a timing chart showing an example of the various supply amounts and temperatures of different parts in the startup step. Note that the scale markings on the vertical axis in FIG. 12 indicate temperature, and the supply amounts of fuel indicate the increases and decreases thereof in a summary manner.

In the startup step shown in FIG. 12, the temperature of the fuel cell stack 14 at room temperature is raised to a temperature at which electricity can be generated.

First, at time t0 in FIG. 12, the supply of generating air and reforming air is started. Specifically, control section 110, which is a controller, sends a signal to generating air flow regulator unit 45, which is an apparatus for supplying oxidant gas for generation, activating same. As described above, generating air is introduced into fuel cell module 2 via generating air introducing pipe 74, and flows into generating chamber 10 through air heat exchanger 22 and generating air supply paths 77. Control section 110 sends a signal to reforming air flow regulator unit 44, which is an apparatus for supplying oxidant gas for reforming, activating same. Reforming air introduced into fuel cell module 2 passes through reformer 20 and manifold 66 into fuel cell units 16, and flows out of the top end thereof. Note that at time t0, because fuel is still not being supplied, no reforming reaction takes place inside reformer 20. In the present embodiment, the supply amount of generating air started at time t0 in FIG. 12 is approximately 100 L/min, and the supply amount of reforming air is approximately 10.0 L/min.

Next, supply of fuel is begun at time t1, a predetermined time after time t0 in FIG. 12. Specifically, control section 110 sends a signal to fuel flow regulator unit 38, which is a fuel supply apparatus, activating same. In the present embodiment, the supply amount of fuel started at time t1 is approximately 5.0 L/min. Fuel introduced into fuel cell module 2 passes through reformer 20 and manifold 66 into fuel cell units 16 and flows out of the top end thereof. Note that at time t1, because the reformer temperature is still low, no reforming reaction takes place inside reformer 20.

Next, a step for igniting supplied fuel is started at time t2 after the elapse of a predetermined time from time t1. Specifically, the ignition step control section 110 sends a signal to ignition apparatus 83 (FIG. 2), which is an ignition means, igniting the fuel flowing out of the top end of the fuel cell units 16. Ignition apparatus 83 generates repeated sparks in the vicinity of the top end of fuel cell stack 14, igniting fuel flowing out from the top end of the fuel cell units 16.

When ignition is completed at time t3 in FIG. 12, the supply of reforming water is started. Specifically, control section 110 sends a signal to water flow volume regulator unit 28 (FIG. 6), which is a water supply apparatus, activating same. In the present embodiment, the amount of water supplied starting at time t3 is 2.0 cc/min. At time t3, the fuel supply apparatus is maintained at the previous level of approximately 5.0 L/min. The amount of generating air and reforming air supplied is also maintained at the previous values. Note that at time t3, the ratio $O_2$ of oxygen $O_2$ in reforming air to carbon C in fuel is approximately 0.32.

After ignition has occurred at time t3 in FIG. 12, supplied fuel flows out from the top end of each individual fuel cell unit 16 as off-gas, and is here combusted. This combustion heat heats reformer 20 disposed above the fuel cell stack 14. Here vaporization chamber insulation 23 is disposed above reformer 20 (at the top of case 8), and by this means the temperature of the reformer 20 rises suddenly from room temperature immediately following the start of fuel combustion. Because outside air is introduced into air heat exchanger 22 disposed over vaporization chamber insulation 23, the temperature of air heat exchanger 22 is low, particularly immediately after start of combustion, and so can easily become a cooling source. In the present embodiment, because vaporization chamber insulation 23 is disposed between the top surface of case 8 and the bottom surface of air heat exchanger 22, movement of heat from reformer 20 disposed at the top inside case 8 to air heat exchanger 22 is constrained, and heat tends to retreat to the vicinity of reformer 20 inside case 8. In addition, the space on the top side of flow straightening plate 21 at the top of reformer 20 is constituted as a gas holding space 21c (FIG. 2) in which fuel gas flow is slowed, therefore a double insulation around vaporizing section 20a is achieved, and the temperature rises even more rapidly.

Thus by the rapid rise in the temperature of vaporizing section 20a it is possible to produce steam in a short time after off-gas begins to combust. Also, because reforming water is supplied to vaporizing section 20a in small amounts at a time, water can be heated to boiling with a very small heat compared to when a large amount of water is stored in vaporizing section 20a, and the supply of steam can be rapidly started. Furthermore, since water flows in from water flow regulator unit 28, excessive temperature rises in the vaporizing section 20a caused by delays in the supply of water, as well as delays in the supply of steam, can be avoided.

Note that when a certain amount of time has elapsed after the start of off-gas combustion, the temperature of air heat exchanger 22 rises due to exhaust gas flowing into air heat exchanger 22 from combustion chamber 18. Vaporization chamber insulation 23, which insulates between reformer 20 and air heat exchanger 22, is placed on the inside of heat insulation 7. Therefore vaporization chamber insulation 23 does not suppress the dissipation of heat from fuel cell module 2; rather it is disposed in order to cause the temperature of reformer 20, and particularly vaporizing section 20a thereof, to rise rapidly immediately following combustion of off-gas.

Thus at time t4, when the temperature of reformer 20 has risen rapidly, the fuel and reforming air flowing into reformer section 20b via vaporizing section 20a causes the partial oxidation reforming reaction shown in Expression (1).

$$C_mH_n + xO_2 \rightarrow aCO_2 + bCO + cH_2 \qquad (1)$$

Because this partial oxidation reforming reaction is an exothermic reaction, there are local sudden rises in the surrounding temperature when the partial oxidation reforming reaction takes place inside reformer section 20b.

On the other hand, in the present embodiment the supply of reforming water starts from time t3 immediately following confirmation of ignition, and the temperature of vaporizing section 20a rises suddenly, therefore at time t4, steam is produced in vaporizing section 20a and supplied to reformer section 20b. I.e., after the off-gas has been ignited, water is supplied starting at a predetermined duration prior to when reformer section 20b reaches the temperature at which the partial oxidation reforming reaction occurs, and at the point when the partial oxidation reforming reaction temperature is reached, a predetermined amount of water is held in vaporizing section 20a, and steam is produced. Therefore when the temperature rises suddenly due to the occurrence of the partial oxidation reforming reaction, a steam reforming reaction takes place in which reforming steam and fuel being supplied to reformer section 20b react. This steam reforming reaction is the endothermic reaction shown in Expression (2); it occurs at a higher temperature than the partial oxidation reforming reaction.

$$C_mH_n + xH_2O \rightarrow aCO_2 + bCO + cH_2 \qquad (2)$$

Thus when time t4 in FIG. 12 is reached, a partial oxidation reforming reaction takes place inside reformer section 20b, and the temperature rise caused by the occurrence of the partial oxidation reforming reaction causes the steam reforming reaction to simultaneously occur. Therefore the reforming reaction which takes place in reformer section 20b starting at time t4 is an auto-thermal reforming reaction (ATR) indicated by Expression (3), in which the partial oxidation reforming reaction and the steam reforming reaction are both present. I.e., the ATR step is started at time t4.

$$C_mH_n + xO_2 + yH_2O \rightarrow aCO_2 + bCO + cH_2 \qquad (3)$$

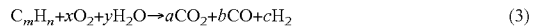

Thus in solid oxide fuel cell system 1 according to a first embodiment of the present invention, water is supplied during the entire period of the startup step, and no partial oxidation reforming reactions (PDX) occurs independently. Note that in the timing chart shown in FIG. 12, the reformer temperature at time t4 is approximately 200° C. This reformer temperature is lower than the temperature at which the partial oxidation reforming reaction occurs, but the temperature detected by reformer temperature sensor 148 (FIG. 6) is the average temperature in reformer section 20b. In actuality, even at time t4 reformer section 20b has partially reached the temperature at which partial oxidation reforming reactions occur, and a steam reforming reaction is also induced by the reaction heat of the partial oxidation reforming reaction that does arise. Thus in the present embodiment, after ignition the supply of water begins before the time when reformer section 20b reaches the partial oxidation reforming reaction temperature, and no partial oxidation reforming reaction occurs independently.

Next, when the temperature detected by reformer temperature sensor 148 reaches approximately 500° C. or greater, the system transitions from the ATR1 step to the ATR2 step at time t5 in FIG. 12. At time t5, the water supply amount is changed from 2.0 cc/min to 3.0 cc/min. The previous values are maintained for the fuel supply amount, reforming air supply amount, and generating air supply amount. The ratio S/C for steam and carbon in the ATR2 step is thereby increased to 0.64, whereas the ratio between reforming air and carbon $O_2/C$ is maintained at 0.32. Thus by increasing the steam to carbon ratio S/C while holding fixed the reforming air to carbon ratio $O_2/C$, the amount of steam-reformable carbon is increased without reducing the amount of partial oxidation reformable carbon. By so doing, the temperature of reformer section 20b can be raised and the amount of steam-reformed carbon increased, while reliably avoiding the risk of carbon deposition in reformer section 20b.

Furthermore, the system transitions from the ATR2 step to the ATR3 step when the temperature detected by generating chamber temperature sensors 142 reaches approximately 400° C. or greater at time t6 in FIG. 12 of the embodiment. In conjunction with this, the fuel supply amount is changed to 5.0 (L/min) to 4.0 L/min, and the reforming air supply amount is changed to from 9.0 (L/min) to 6.5 L/min. The previous values are maintained for the water supply amount and generating air supply amount. The ratio S/C for steam and carbon in the ATR3 step is thereby increased to 0.80, whereas the ratio between reforming air and carbon $O_2/C$ is reduced to 0.29.

Furthermore at time t7 in FIG. 12, when the temperature detected by generating chamber temperature sensors 142 reaches approximately 550° C. or greater, the system transitions to the SR1 step. In conjunction with this, the fuel supply amount is changed from 4.0 (L/min) to 3.0 L/min, and the water supply amount is changed from 3.0 (cc/min). Supply of reforming air is stopped, and the generating air supply amount is maintained at the previous value. Thus in the SR1 step, the steam reforming reaction is already occurring within reformer section 20b, and the steam to carbon ratio S/C is set to 2.49, appropriate for steam reforming the entire amount of supplied fuel. At time t7 in FIG. 12, the temperatures of both reformer 20 and fuel cell stack 14 have risen sufficiently, therefore the steam reforming reaction can be stably brought about even if no partial oxidation reforming reaction is occurring in reformer section 20*b*.

Next, at time t8 in FIG. 12, when the temperature detected by generating chamber temperature sensors 142 reaches approximately 600° C. or greater, the system transitions to the SR2 step. In conjunction with this, the fuel supply amount is changed from 3.0 (L/min) to 2.5 L/min, and the water supply amount is changed from 7.0 (cc/min) to 6.0 cc/min. The generating air supply amount is maintained at the previous value. In the SR2 step the water to carbon ratio S/C is thus set to 2.56.

Moreover, after the SR2 has been executed for a predetermined time, the system transitions to the electrical generation step. In the electrical generating step, power is extracted from fuel cell stack 14 to inverter 54 (FIG. 6), and electrical generation is begun. Note that in the electrical generation step, fuel is already reformed by steam reforming in reformer section 20*b*. Also, in the electrical generation step, the fuel supply amount, generating air supply amount, and water supply amount are changed in response to the output power demanded of fuel cell module 2.

Next, referring to FIGS. 13 through 25 and FIG. 30, we explain the stopping of a solid oxide fuel cell system 1 according to a first embodiment of the present invention.

First, referring to FIG. 30, we explain the behavior at the time of shutdown stop in a conventional solid oxide fuel cell system. FIG. 30 is a timing chart schematically showing in a time line an example of stopping behavior in a conventional solid oxide fuel cell system.

First, at time t501 in FIG. 30, a shutdown stop operation is performed on a fuel cell which had been generating electricity. Thus the fuel supply amount, reforming water supply amount, and generating air supply amount are brought to zero without waiting for the temperature inside the fuel cell module to decline, and the current (generating current) extracted from the fuel cell module is also brought to zero. I.e., the fuel, water, and generating air supply to the fuel cell module are stopped in a short time period, and the extraction of power from the fuel cell module is stopped. Even when there is a loss in supply of fuel and electricity to the solid oxide fuel cell system due to natural disaster, etc., the stopping behavior is the same as in FIG. 30. Note that the graph of supply amounts, currents, and voltages in FIG. 30 merely shows change trends, and does not indicate specific values.

As a result of the stopping of power extraction at time t501, the voltage value produced in the fuel cell stack rises (however, current is zero). Because the supply of generating air is brought to zero at time t501, the fuel cell stack is naturally cooled over a long period after time t501 without forcibly feeding air into the fuel cell module.

If, hypothetically, air continues to be supplied into the fuel cell module after time t501, the pressure inside the fuel cell module will rise due to the fed-in air. On the other hand, the supply of fuel has already been stopped, so pressure inside the fuel cell units starts to drop. Air fed into the generating chamber of the fuel cell module may therefore conceivably flow in reverse on the fuel electrode side within the fuel cell units. Since the fuel cell stack is in a high temperature state at time t501, a reverse flow of air on the fuel electrode side leads to oxidation of the fuel electrode and damage to the fuel cell units. As shown in FIG. 30, in conventional fuel cells to avoid this generating air was also promptly stopped immediately after the fuel supply was stopped upon a shutdown stop, even if there was no loss of power supply.

Moreover, after the elapse of 6 to 7 hours following a shutdown stop, when the temperature inside the fuel cell module has dropped to under a lower limit temperature for fuel electrode oxidation, air is again supplied into the fuel cell module (not shown). Such supplying of air is executed with the object of discharging remaining fuel gas, but when the fuel cell stack temperature has dropped to under a lower limit temperature for fuel electrode oxidation, there will be no fuel electrode oxidation even if a reverse flow of oxygen to the fuel electrode has occurred.

However the present inventor realized that even if a shutdown stop is performed in this type of conventional fuel cell, there still a risk of a reverse flow of air to the fuel electrode side, causing oxidation of the fuel electrode.

A reverse flow of air from the air electrode side to the fuel electrode side occurs based on a pressure differential between the inside (fuel electrode side) and the outside (air electrode side) of the fuel cell unit. In the state prior to a shutdown stop, when fuel gas and generating air are being supplied, reformed fuel is being fed under pressure to the fuel electrode side of the fuel cell unit. On the other hand, generating air is also being fed into the air electrode side of the fuel cell unit. In this state, the pressure on the fuel electrode side of the fuel cell unit is higher than the pressure on the air electrode side, and fuel is jetted from the fuel electrode side to the air electrode side of the fuel cell unit.

Next, when the supply of fuel gas and generating air is stopped by a shutdown stop, fuel is jetted from the fuel electrode side, which was in a high pressure state, to the low pressure air electrode side. Since the pressure on the air electrode side inside the fuel cell module is also higher than the outside air pressure (atmospheric pressure), after a shutdown stop air on the air electrode side inside the fuel cell module (and fuel gas jetted from the fuel electrode side) is exhausted through the exhaust passageway to outside the fuel cell module. Therefore after a shutdown stop, the pressures at both the fuel electrode side and the air electrode side of the fuel cell unit decline, ultimately converging to atmospheric pressure. Therefore the behavior of the declining pressure on the fuel electrode side and air electrode side are affected by the flow path resistance between the fuel electrode side and air electrode side of the fuel cell unit, the flow path resistance between the air electrode side inside the fuel cell module and the outside air, and so forth. Note that in a state whereby pressures on the fuel electrode and air electrode side are equal, air on the air electrode penetrates the fuel electrode side through diffusion.

In actuality, however, because the interior of the fuel cell module is at a high temperature, the pressure behavior after a shutdown stop is also affected by temperature changes on the fuel electrode side and the air electrode side. For example, if the temperature on the fuel electrode side of the fuel cell unit drops more suddenly than on the air electrode side, the volume of fuel gas inside the fuel cell unit shrinks, causing a drop in pressure on the fuel electrode side and a reverse flow of air. Thus the pressure on the fuel electrode side and air electrode side after a shutdown stop is affected by the flow path resistance in each part of the fuel cell module, the temperature distribution and stored heat amounts within the fuel cell module, and so forth, and changes in an extremely complex manner.

The gas component present on the fuel electrode side and air electrode side of the fuel cell unit can be estimated based on the fuel cell stack output pressure when no current is being extracted (output current=0). As shown by the thick dotted line in FIG. 30, the cell stack output voltage rises suddenly immediately after a shutdown stop at time t501. This is because immediately after a shutdown stop, a large amount of hydrogen is present on the fuel electrode side, and air is present on the air electrode side, while the current extracted from the cross section is set at 0. Next, the output voltage from the cell stack falls (part B in FIG. 30), but this is assumed to occur because immediately after a shutdown stop, hydrogen which had been present on the fuel electrode side of each fuel cell unit flows out, causing the concentration of hydrogen on the fuel electrode side to fall, while the concentration of air on the air electrode side falls due to the outflowing hydrogen.

Next, the output voltage from the cell stack drops with the passage of time, and when the temperature inside the fuel cell module has dropped to below the oxidation lower limit temperature (part C in FIG. 30), the output voltage has dropped greatly. In this state it is estimated that there is almost no hydrogen remaining on the fuel electrode side of each of the fuel cell units, and in a conventional fuel cell the fuel electrode would be exposed to the risk of oxidation. In reality it is believed that in most cases in a conventional fuel cell a phenomenon arises whereby the pressure on the fuel electrode side falls more than the pressure on the air electrode side before the temperature inside the fuel cell module drops to below the oxidation lower limit temperature, producing an adverse effect on the fuel cell units.

Also, depending on the fuel cell module structure and the operating conditions prior to the shutdown stop, a phenomenon (not shown) arises whereby the temperature at the top of the fuel cell module rises after a shutdown stop, notwithstanding that the supply of fuel has been stopped. I.e., for about an hour after a shutdown stop, the temperature inside the fuel cell module in some cases rises more than during the electrical generation operation. This type of temperature rise is believed to be caused by the fact that the endothermic steam reforming reaction which had been occurring inside the reformer during an electrical generation operation ceases to occur when the supply of fuel stops, while at the same time the fuel remaining inside the fuel cell units and in the manifold which distributes fuel to those units continues to be combusted in the combustion chamber even after the supply of fuel stops.

Thus while on the one hand the temperature near the reformer inside the fuel cell module is rising, the heat of electrical generation ceases to be produced in the fuel cell stack due to the cessation of current extraction from the fuel cell stack. Therefore in contrast to the rise in pressure accompanying the rise in temperature at the top of the fuel cell stack, the pressure inside the fuel cell units drops due to the fall in temperature. As a result of this temperature gradient inside the fuel cell module, the pressure on the fuel electrode side in each of the fuel cell units in some cases becomes lower than the pressure on the air electrode side. In such cases, there is a high potential that air on the air electrode side outside the fuel cell unit will reverse flow to the interior fuel electrode side, damaging the fuel cell unit.

In the solid oxide fuel cell system 1 of the first embodiment of the present invention, an appropriate value is set for the flow path resistance in each part within the fuel cell module, and the risk of oxidation of the fuel electrode is greatly suppressed by the control provided by the shutdown stop circuit 110a (FIG. 6) built into control section 110.

Next, referring to FIGS. 13 through 25 and FIG. 30, we explain the stopping of a solid oxide fuel cell system 1 according to a first embodiment of the present invention.

Figure 13:
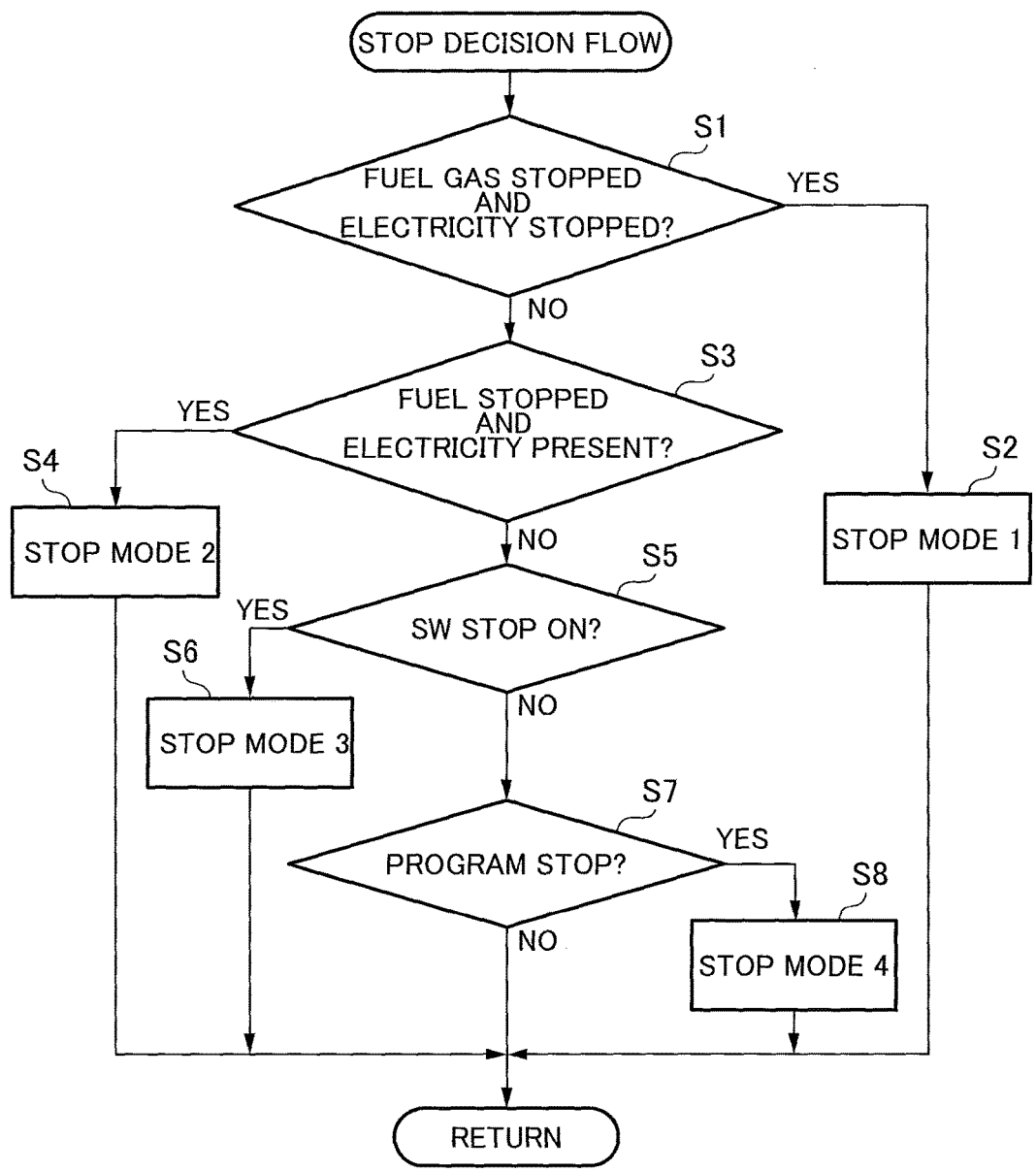
FIG. 13 is a flow chart of the stop decision which selects a stop mode in a fuel cell apparatus according to a first embodiment of the present invention.

FIG. 13 is a flow chart of the stopping decision which selects a stop mode in a solid oxide fuel cell system 1 according to a first embodiment of the present invention. The purpose of the FIG. 13 flow chart is to determine which of the stop modes to select based on predetermined conditions; during operation of the solid oxide fuel cell system 1, this flow chart sequence is repeated at a predetermined time interval.

In step S1 of FIG. 13, a determination is made as to whether the supply of fuel gas from fuel supply source 30 (FIG. 1) and the supply of power from a commercial power source have been stopped. If the supplies of both fuel gas and power have been stopped, the system advances to step S2; at step S2, stop mode 1, which is the emergency stop mode, is selected, and one iteration of the processing in the FIG. 13 flow chart is completed. When stop mode 1 is selected, it is assumed that the supply of fuel gas and power has been stopped by a natural disaster or the like; the frequency with which this type of stoppage occurs is expected to be extremely rare.

On the other hand, when at least either fuel gas or power is being supplied, the system advances to step S3, and in step S3 a decision is made as to whether the supply of fuel gas has been stopped and power is being supplied. When the supply of fuel gas has been stopped and power is being supplied, the system advances to step S4; in cases other than this the system advances to step S5. In step S4, stop mode 2, which is one of the normal stop modes, is selected, and one iteration of the FIG. 13 flow chart processing is completed. When stop mode 2 is selected, a temporary stoppage of the supply of fuel gas due to construction or the like is assumed to have occurred in the fuel gas supply path; the frequency with which this type of stopping occurs is expected to be low.

Furthermore, in step S5 a determination is made as to whether a stop switch has been operated by a user. If a user has operated a stop switch, the system advances to step S6; if the switch has not been operated, the system advances to step S7. In step S6, stop mode 3, which is one of the switch stop modes among the normal stop modes, is selected, and one iteration of the FIG. 13 flow chart processing is completed. The presumed situation for a selection of stop mode 3 is that a user of the solid oxide fuel cell system 1 has been absent for a long period, such that operation of solid oxide fuel cell system 1 was intentionally stopped over a relatively long time period; the frequency of this type of stoppage is not believed to be very great.

In step S7, on the other hand, a determination is made of whether the stop is a regular stop, executed at a pre-planned regular timing. If the stop is a regular stop, the system advances to step S8; if it is not a regular stop, one iteration of the FIG. 13 flow chart is completed. In step S8, stop mode 4, which is one of the programmed stop modes among the normal stop modes, is selected, and one iteration of the FIG. 13 flow chart processing is completed. Responding to an intelligent meter installed on fuel supply source 30 is assumed as a circumstance for executing stop mode 4. I.e., in general if an intelligent meter (not shown) is installed on fuel supply source 30, and there is no period longer than approximately 1 hour during which the supply of gas is completely turned off over approximately a 1 month interval, the intelligent meter judges that a gas leak is occurring and cuts off the supply of fuel gas. In general, therefore, solid oxide fuel system 1 should be stopped for roughly 1 hour or more approximately once per month. As a result, it is anticipated that a stoppage by stop mode 4 will be performed at a frequency of approximately once per month, which is the most frequently performed stoppage.

Note that if the supply of power is stopped and the supply of fuel gas is continued, neither of the stop modes will be selected according to the FIG. 13 flow chart. In such cases, in a solid oxide fuel cell system 1 according to the embodiment, electrical generation can be continued by activating auxiliary unit 4 using power produced by fuel cell stack 14. Note that the invention can also be constituted to stop electrical generation if the supply of power stays stopped continuously over a predetermined long time period.

Next, referring to FIGS. 15 through 25, we explain the stop processing in each stop mode.

Figure 14:
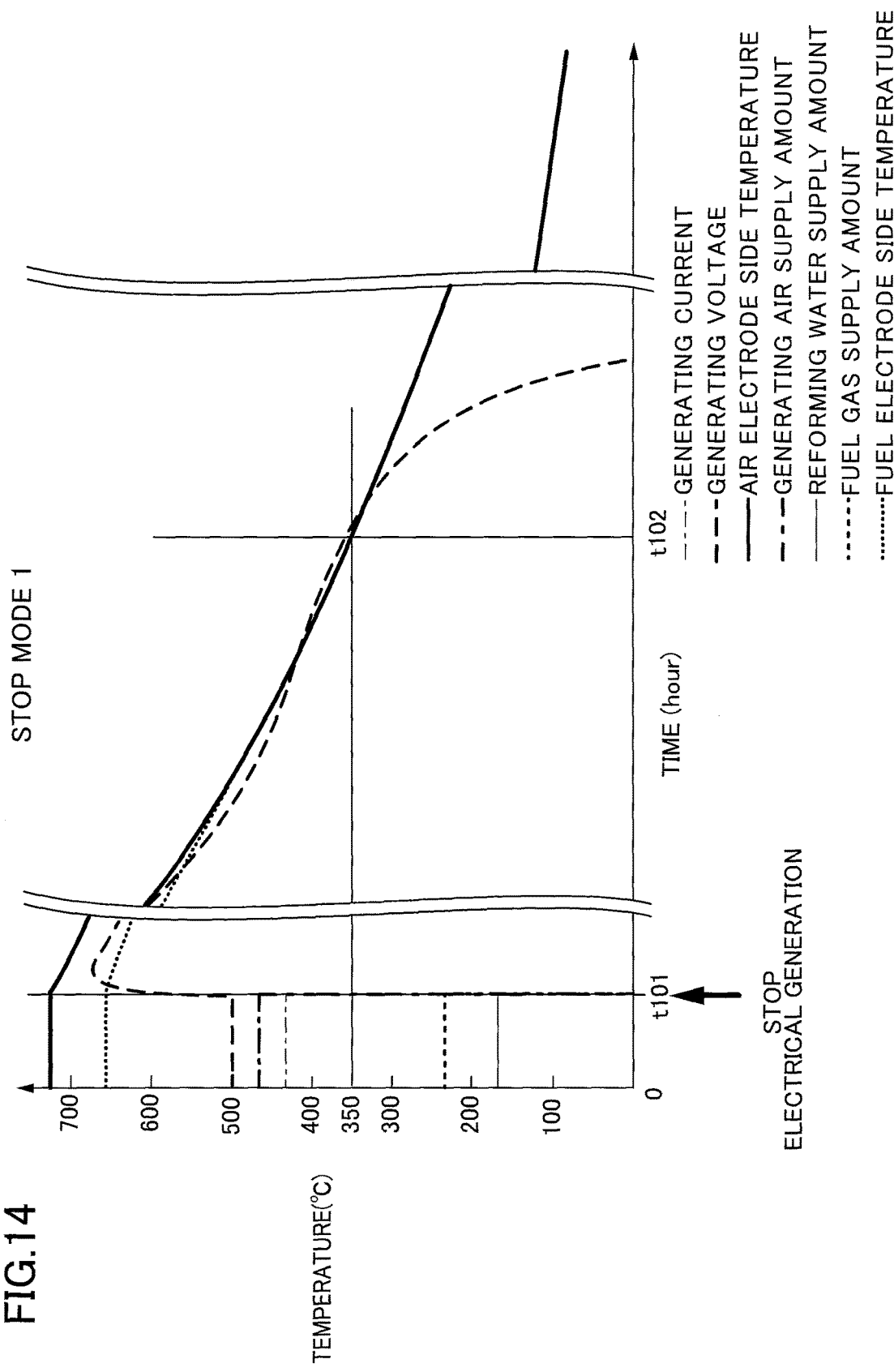
FIG. 14 is a timing chart schematically showing stopping behavior on a timeline when stop mode 1 is executed in a fuel cell apparatus according to a first embodiment of the present invention.
Figure 15:
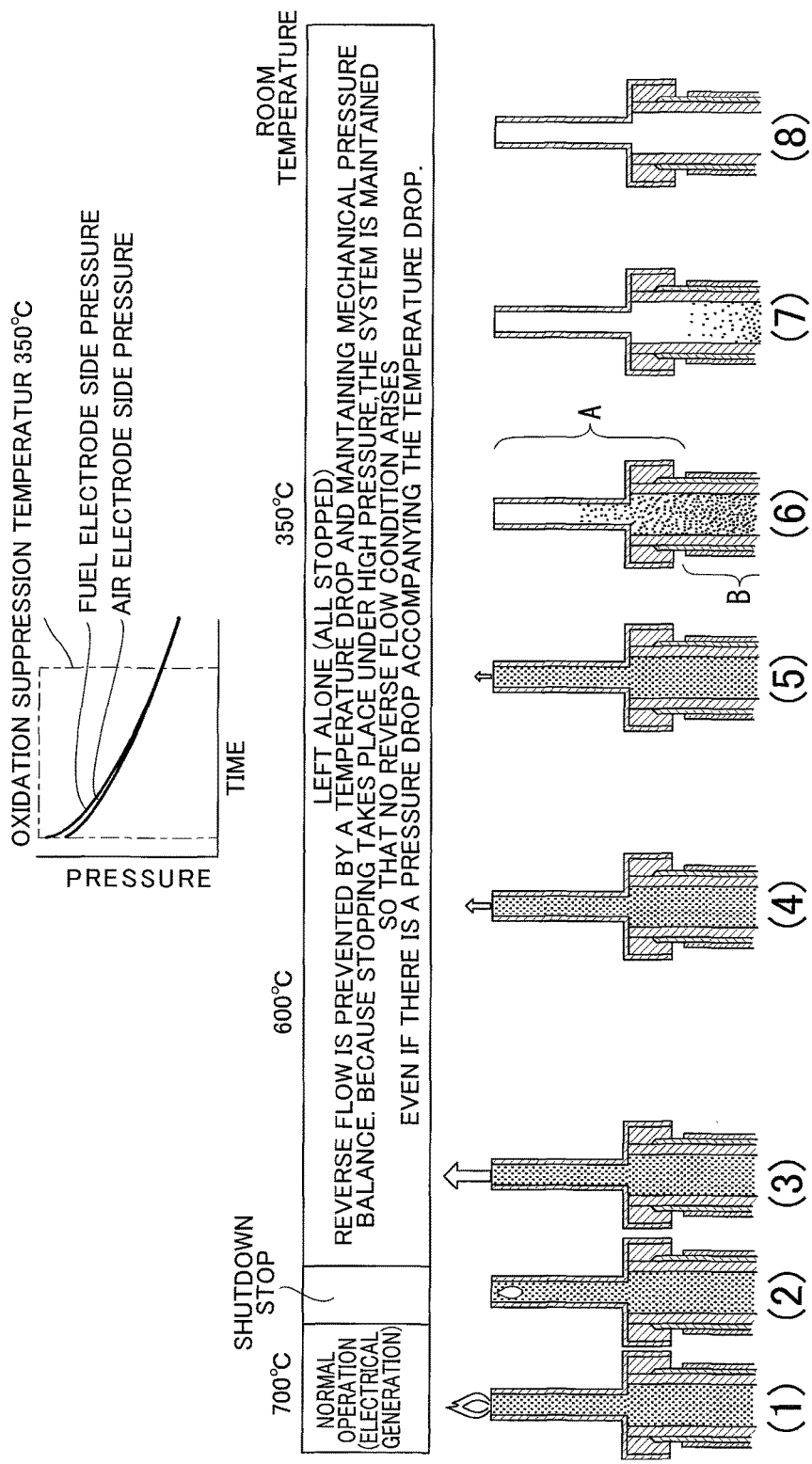
FIG. 15 is a diagram explaining on a time line the control, temperature and pressure inside the fuel cell module, and the state of the tip portion of fuel cell units when stop mode 1 is executed in a fuel cell apparatus according to a first embodiment of the present invention.

FIG. 14 is a timing chart schematically showing on a time line an example of the stopping behavior when stop mode 1 (step S2 in FIG. 13) is executed in a solid oxide fuel cell system 1 according to a first embodiment of the present invention. FIG. 15 is a diagram explaining on a time line the control, the temperature and pressure inside the fuel cell module, and the state of the tip portion of fuel cell units when stop mode 1 is executed in a fuel cell apparatus according to a first embodiment of the present invention.

First, at time t101 in FIG. 14, when a shutdown stop is performed the supply of fuel by fuel flow regulator unit 38, the supply of water by water flow volume regulator unit 28, and the supply of generating air by generating air flow regulator unit 45 are stopped in a short time period. The extraction of power from fuel cell module 2 by inverter 54 is also stopped (output current=0). When stop mode 1 is executed, fuel cell module 2 is left alone in this state after a shutdown stop. For this reason, fuel which had been present on the fuel electrode side of the fuel cell units 16 is jetted to the air electrode side through gas flow path fine tubing 98 (FIG. 4) based on the pressure differential relative to the external air electrode side. Also, air present on the air electrode side of the fuel cell units 16 (and fuel jetted from the fuel electrode side) is discharged through air-heat exchanger 22, etc. to the outside of fuel cell module 2 based on the pressure differential between pressure on the air electrode side (the pressure inside generating chamber 10 (FIG. 1)) and atmospheric pressure. Therefore after a shutdown stop, pressure on the fuel electrode and the air electrode side of each of the fuel cell units 16 drops naturally.

However, gas flow path fine tubing 98, which is an outflow-side flow resistance section, is installed on the top end portion of the fuel cell units 16, and a vertical wall 21*d* and suspended wall 8*b* (FIG. 2) are erected in exhaust passageway 21*b*. The flow path resistance of this gas flow path fine tubing 98 is set so that after the fuel supply and power are stopped, the pressure drop on the fuel electrode side is more gradual than the pressure drop on the air electrode side. In solid oxide fuel cell system 1, by tuning the flow path resistance appropriately in each part of these fuel and exhaust passageways, fuel is made to remain over long time periods even after a shutdown stop on the fuel electrode side of fuel cell units 16. For example, if the flow path resistance in the exhaust path leading from generating chamber 10 to the outside air is too small relative to the flow path resistance in gas flow path fine tubing 98, the pressure on the air electrode side after a shutdown stop will drop suddenly, causing the pressure differential between the fuel electrode side and the air electrode side to increase so that the outflow of fuel from the fuel electrode side is actually increased. Conversely, if the exhaust path flow path resistance is too great relative to the flow path resistance of gas flow path fine tubing 98, the pressure drop on the air electrode side will be gradual compared to the pressure drop on the fuel electrode side, and the pressures on the fuel electrode side and the air electrode side will approach one another, increasing the risk of a reverse air flow to the fuel electrode side.

Thus in the present embodiment the fuel and/or exhaust gas passageways guiding fuel and/or gas to outside fuel cell module 2 from fuel flow regulator unit 38 through reformer 20, and the fuel electrodes in each of fuel cell units 16, are tuned as described above. Therefore even when left alone after a shutdown stop, pressure on the fuel electrode side drops while maintaining a higher pressure than the air electrode side, and even when the fuel electrode temperature has dropped below the oxidation suppression temperature, maintains a higher pressure than atmospheric pressure, so the risk of fuel electrode oxidation can be well suppressed. As shown in FIG. 14, in the solid oxide fuel system 1 of the embodiment, after a shutdown stop is performed at time t101 the output voltage from fuel cell stack 14 shown by the heavy dotted line temporarily rises significantly and then drops, but that drop is less than in a conventional solid oxide fuel cell system (FIG. 30), and a relatively high voltage continues for a long time period. In the example shown in FIG. 14, a relatively high voltage is maintained after a shutdown stop until the fuel electrode side and air electrode side temperatures drop to the oxidation suppression temperature at time t102. This indicates that fuel remains on the fuel electrode side of the fuel cell units 16 until time t102, when the temperature falls to the oxidation suppression temperature.

Note that in this Specification, "oxidation suppression temperature" refers to the temperature at which the risk of oxidation of the fuel electrodes is sufficiently reduced. The risk of fuel electrode oxidation declines gradually as the temperature falls, ultimately reaching zero. Therefore the risk of fuel electrode oxidation can be sufficiently reduced even with an oxidation suppression temperature slightly higher than the oxidation lower limit temperature, which is the minimum temperature at which oxidation of the fuel electrode can occur. In a standard fuel cell unit, this oxidation suppression temperature is thought to be about 350° C. to 400° C., and the oxidation lower limit temperature about 250° C. to 300° C.

I.e., in the solid oxide fuel cell system 1 of the embodiment, the fuel/exhaust gas passageway is constituted so that after a shutdown stop and until the fuel electrode temperature drops to the oxidation suppression temperature, the pressure on the air electrode side within fuel cell module 2 is maintained at higher than atmospheric pressure, and the pressure on the fuel electrode side is maintained at a pressure higher than the pressure on the air electrode side. Therefore the fuel/exhaust gas passageway functions as a mechanical pressure retention means (mechanical means for retaining pressure) for extending the time until the pressure on the fuel electrode side approaches the pressure on the air electrode side.

FIG. 15 is a diagram explaining the operation of stop mode 1; the top portion shows a graph schematically depicting pressure changes on the fuel electrode side and air electrode side; the middle portion shows the control operations by control section 110 and the temperature inside fuel cell module 2 on a time line, and the bottom portion shows the state at the top end portion of the fuel cell units 16 at each point in time.

First, a normal electrical generation operation is being performed prior to the shut down in the middle portion of FIG. 15. In this state, the temperature inside fuel cell module 2 is approximately 700° C. As shown in the bottom portion (1) of FIG. 15, fuel gas remaining without being used for electrical generation is jetted out from gas flow path fine tubing 98 at the top end of fuel cell units 16, and this jetted out fuel gas is combusted at the top end of gas flow path fine tubing 98. Next, when the supply of fuel gas, reforming water, and generating air is stopped by the shutdown stop, the flow volume of jetted out fuel gas declines and, as shown in the bottom portion (2) of FIG. 15, the flame is extinguished at the tip of gas flow path fine tubing 98. Because gas flow path fine tubing 98 is formed to be long and narrow, flame is quickly extinguished when the flame is pulled into gas flow path fine tubing 98 as the result of a decrease in the flow volume of fuel gas. Quick extinction of the flame means the consumption of fuel gas remaining inside the fuel cell units 16, etc. is suppressed, and the time during which remaining fuel can be maintained on the fuel electrode side is extended.

As shown in the lower portion (3) of FIG. 15, even after the flame is extinguished following a shutdown stop, the pressure inside fuel cell units 16 (on the fuel electrode side) is higher than outside (the air electrode side), therefore jetting of fuel gas from gas flow path fine tubing 98 is continued. Also, as shown in the upper portion of FIG. 15, immediately after a shutdown stop the pressure on the fuel electrode side is higher than the pressure on the air electrode side, and each pressure declines with this relationship maintained intact. The pressure differential between the fuel electrode side and the air electrode side declines together with the decline in jetting of fuel gas after a shutdown stop.

The amount of fuel gas jetted from gas flow path fine tubing 98 declines as the pressure differential between the fuel electrode side and the air electrode side diminishes (bottom portions (4), (5) of FIG. 15). At the time of a shutdown stop, on the other hand, reformed fuel gas, unreformed fuel gas, steam, and water remain inside reformer 20 as well, and fuel gas not reformed by residual heat is reformed by steam even after a shutdown stop. Remaining water is also vaporized by residual heat into steam, since the reformer 20 integrally comprises a vaporizing section 20a. Because there is volumetric expansion due to the reforming of fuel gas and vaporization of water in reformer 20, fuel gas which had been remaining inside the reformer 20, fuel gas supply pipe 64, and manifold 66 (FIG. 2) is pushed out in sequence into the fuel cell units 16 (on the fuel electrode side). A pressure drop on the fuel electrode side accompanying the jetting of fuel gas from gas flow path fine tubing 98 is in this way suppressed.

Furthermore, since reforming section 20c inside reformer 20 is filled with catalyst, its flow path resistance is relatively large. Hence when remaining water is vaporized in vaporizing section 20a, steam flows into reforming section 20c, and also reverse flows toward reformer-introducing pipe 62 (FIG. 2). After this reformer-introducing pipe 62 extends approximately horizontally from the side surface of vaporizing section 20a, it is bent to extend approximately vertically upward. Therefore reverse-flowing steam rises vertically upward inside reformer-introducing pipe 62 and reaches the T-pipe 62a connected to the top end of reformer-introducing pipe 62. Here reformer-introducing pipe 62 extending from vaporizing section 20a is disposed on the interior of the covering case 8 on thermal insulation 7, so the temperature is high. Also, the top end portions of reformer-introducing pipe 62, and T-pipe 62a, are positioned outside thermal insulation 7, so their temperature is low. Hence steam which has risen up in reformer-introducing pipe 62 contacts the top end portion of reformer-introducing pipe 62 and T-pipe 62a, which are at a low temperature, and is cooled and condenses, producing water.

Water produced by condensation falls from T-pipe 62a and the top end portion of reformer-introducing pipe 62 onto the inside wall surface at the bottom of reformer-introducing pipe 62 where it is again heated so that it rises and flows once more into vaporizing section 20a. Since reformer-introducing pipe 62 is bent, water droplets dropping down after condensing do not directly flow into vaporizing section 20a, but rather fall onto the inner wall surface at the bottom portion of reformer-introducing pipe 62. Therefore the part of reformer-introducing pipe 62 disposed inside thermal insulation 7 functions as a preheating portion for preheating supplied or condensed water, and the top end portions of reformer-introducing pipe 62 and T-pipe 62a, which are lower in temperature than this preheating section, function as condensing sections.

There are cases in which steam that has risen up inside reformer-introducing pipe 62 reverse flows from T-pipe 62a to water supply pipes 63a. However, water supply pipe 63a is disposed at an incline to face upward from T-pipe 62a, therefore even when steam condenses inside water supply pipes 63a, the condensate flows from water supply pipes 63a toward T-pipe 62a and falls into reformer-introducing pipe 62. Also, as shown in FIG. 2, the bottom portion of reformer-introducing pipe 62 is placed in proximity at the inside of thermal insulation 7 to intersect exhaust gas discharge pipe 82. Therefore a heat exchange is performed between reformer-introducing pipe 62, being the preheating section, and exhaust gas discharge pipe 82; heating is also accomplished by exhaust heat.

Thus a portion of the steam vaporized in vaporizing section 20a reverse flows to reformer-introducing pipe 62; this produces a condensate, which is again vaporized in vaporizing section 20a. Therefore even after the supply of water is stopped during a shutdown stop, remaining water is vaporized a little at a time inside vaporizing section 20a, and water is vaporized over a relatively long period after a shutdown stop. Moreover, after extending from the side surface of vaporizing section 20a, reformer-introducing pipe 62 is bent to extend approximately vertically upward, penetrating thermal insulation 7. Therefore the location where reformer-introducing pipe 62 penetrates thermal insulation 7 is separated from the region vertically above reformer 20, making it difficult for the heat of reformer 20 to escape through the site of penetration of thermal insulation 7 by reformer-introducing pipe 62, so there is no extraordinary loss of thermal insulation characteristics caused by reformer-introducing pipe 62.

On the other hand, the water vaporization occurring inside reformer 20 can occur suddenly depending on the distribution of temperatures inside vaporizing section 20a, etc. In such cases, the pressure inside vaporizing section 20a rises suddenly, so a high pressure is transferred to the downstream side, and there is a risk that fuel gas inside the fuel cell units 16 will suddenly be jetted to the air electrode side. However, because a pressure fluctuation-suppressing flow resistance section 64c (FIG. 2) is provided on fuel gas supply pipe 64, sudden eruptions of fuel gas within the fuel cell units 16 based on sudden rises in pressure inside reformer 20 are suppressed. Also, because gas flow path fine tubing 98 (FIG. 4) is also installed at the bottom end of the fuel cell units 16, sudden pressure rises inside the fuel cell units 16 are suppressed by the flow path resistance of gas flow path fine tubing 98. Therefore the gas flow path fine tubing 98 and pressure fluctuation-suppressing flow resistance section 64c at the bottom end of the fuel cell units 16 function as a mechanical pressure retaining means for maintaining a high pressure on the fuel electrode side.

By thus using a mechanical pressure retaining means, the drop in pressure on the fuel electrode side of the fuel cell units 16 is suppressed over a long time period following a shutdown stop. When 5 to 6 hours have elapsed following a shutdown stop and the temperature inside fuel cell module 2 has dropped to 400° C., both the fuel electrode side and the air electrode side of the fuel cell units 16 fall to essentially atmospheric pressure, and air on the air electrode begins to diffuse to the fuel electrode side (bottom portions (6), (7) in FIG. 16). However, gas flow path fine tubing 98 and the top end portion of fuel cell 84 where no outside electrode layer 92 is formed (the A part of bottom portion (6) in FIG. 15) are not oxidized even if air penetrates, so this part functions as a buffer portion. In particular, because gas flow path fine tubing 98 is formed to be long and narrow, the buffer portion is elongated, and oxidation of the fuel electrode is unlikely to occur even if air penetrates from the top end of the fuel cell units 16. Close to the oxidation suppression temperature, the oxidation which occurs even when the fuel electrode temperature is low and air is contacting the fuel electrode is minute, and since the frequency with which stop mode 1 is executed is extremely low, the adverse effects resulting from oxidation can in substance be ignored. Moreover, as shown in the lower portion (8) of FIG. 15, after the fuel electrode temperature declines to below the oxidation lower limit temperature, there is no change to fuel electrodes even if the fuel electrode side of the fuel cell units 16 is filled with air.

Figure 16:
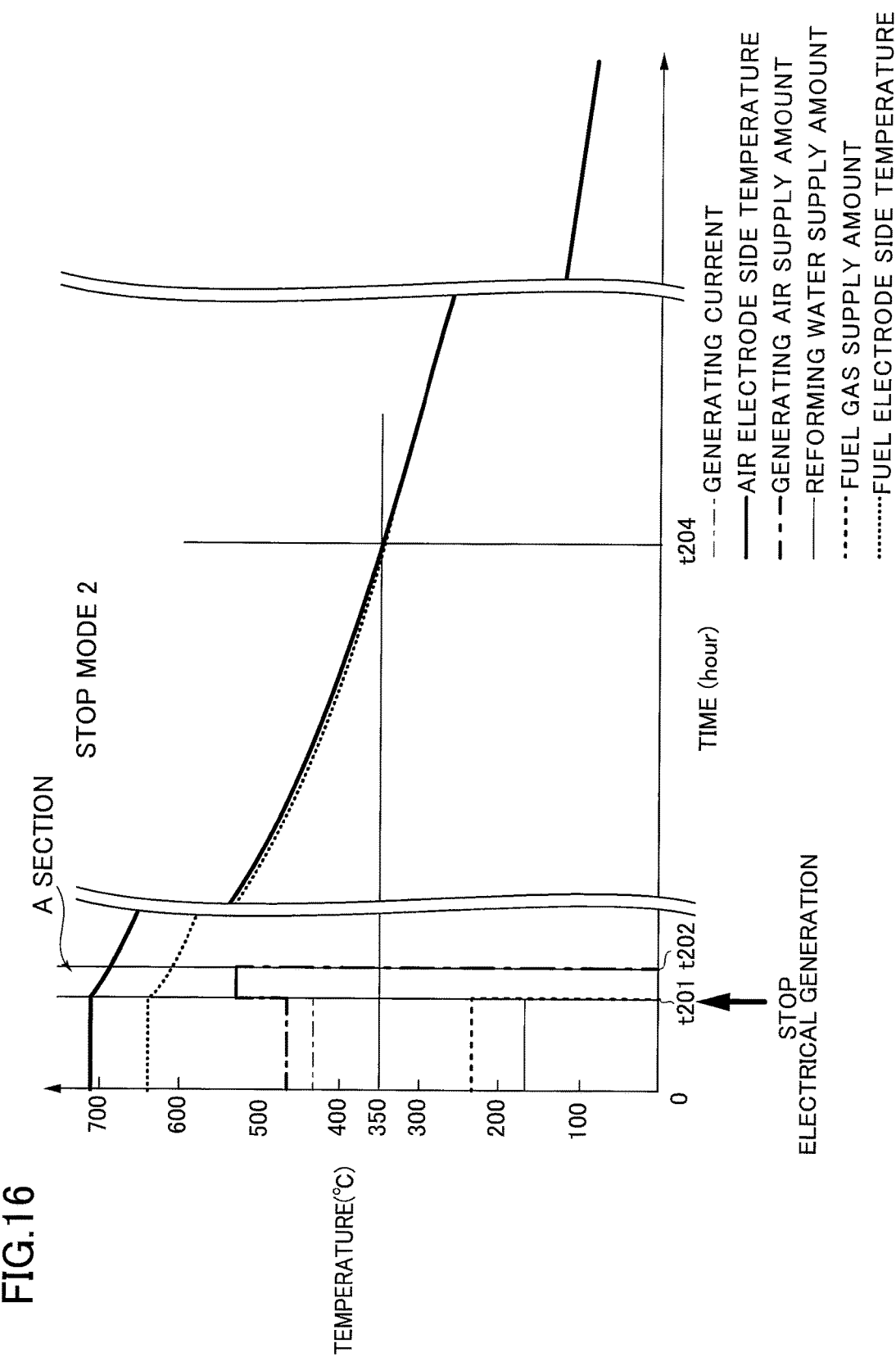
FIG. 16 is a timing chart schematically showing stopping behavior on a timeline when stop mode 2 is executed in a fuel cell apparatus according to a first embodiment of the present invention.
Figure 17:
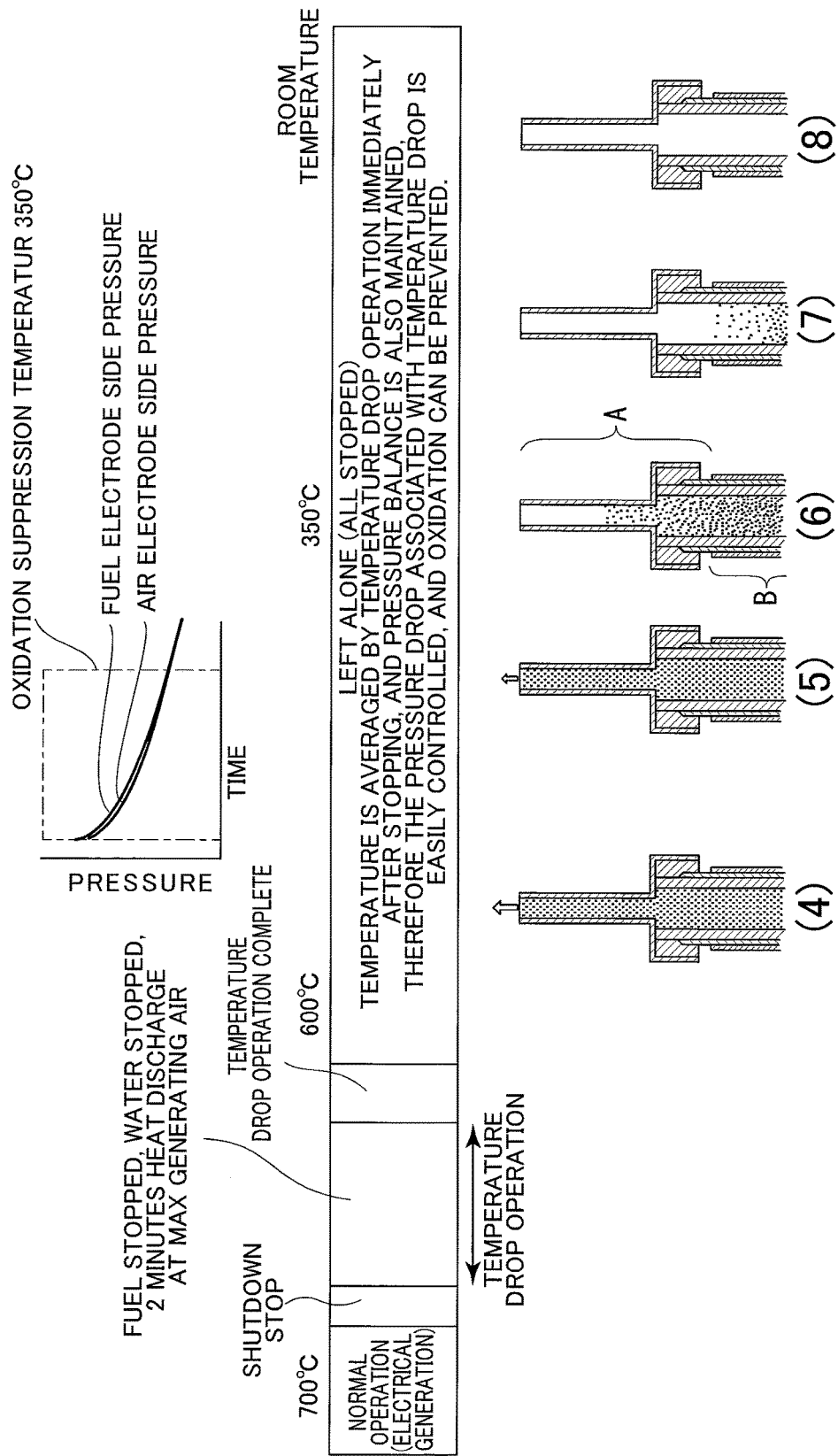
FIG. 17 is a diagram explaining in a time line the control, the temperature and pressure inside the fuel cell module, and the state of the tip portion of the fuel cell unit when stop mode 2 is executed in a fuel cell apparatus according to a first embodiment of the present invention.

Next, referring to FIGS. 16 and 17, we explain stop mode 2.

FIG. 16 is a timing chart schematically showing on a time line an example of the stopping behavior when stop mode 1 (step S4 in FIG. 13) is executed in a solid oxide fuel cell system 1 according to a first embodiment of the present invention. FIG. 17 is a diagram explaining on a time line the control, the temperature inside the fuel cell module, the pressure, and the state of the front end portion of the fuel cell units when stop mode 2 is executed.

First, stop mode 2 is a stop mode executed when only the supply of fuel gas has been stopped. At time t201 in FIG. 16, when a shutdown stop is performed, the supply of fuel by fuel flow regulator unit 38 and the supply of water by water flow volume regulator unit 28 stops in a short time period. The extraction of power from fuel cell module 2 by inverter 54 is also stopped (output current=0). When stop mode 2 has been executed, the shutdown stop circuit 110a built into control section 110 executes a temperature drop operation immediately after a shutdown stop at time t201, causing the generating air flow regulator unit 45 to operate at maximum output over a predetermined heat discharge time. Note that in the embodiment, the predetermined heat discharge time is approximately 2 minutes, during which water flow volume regulator unit 28 is stopped. Furthermore, at time t202 in FIG. 16, after generating air flow regulator unit 45 has been stopped, the system is left alone, as in stop mode 1.

In a stoppage by stop mode 2, air is fed after a shutdown stop to the air electrode side of fuel cell units 16 under temperature drop operation. Thus in part A of FIG. 16, the temperature on the air electrode side is more suddenly reduced than in the stop mode 1 case (FIG. 14). As described above, after the supply of fuel is completely stopped up until the temperature of fuel cell stack 14 drops to the oxidation suppression temperature, there is a danger that fuel electrodes will be oxidized and damaged, therefore the supply of air was always stopped. However, the inventor discovered that generating air can be supplied safely over a predetermined time period even immediately after the supply of fuel is stopped.

I.e., immediately after a shutdown stop, sufficient fuel gas remains on the fuel electrode side of the fuel cell units 16, and since this is being jetted out from the top end of the fuel cell units 16, there is no reverse flow of air to the fuel electrode side caused by feeding air to the air electrode side. In other words, feeding in air in this state under temperature drop operation does cause the pressure on the air electrode side to rise, but the pressure on the fuel electrode side is still higher than the pressure on the air electrode side. The gas flow path fine tubing 98 installed at the top end of the fuel cell units 16 is a constricted flow path with a narrowed flow path cross section, by which the flow velocity of fuel gas flowing out of the fuel cell units 16 is increased. Therefore gas flow path fine tubing 98, which is installed at the top end, functions as an accelerating portion for increasing the flow velocity of fuel gas. Moreover, after the supply of air has been stopped at time t202, the system is left alone as in stop mode 1, and the pressure on the fuel electrode side is maintained by a mechanical pressure retention means for a predetermined time at a higher level than the pressure on the air electrode side. In stop mode 2, however, because the high temperature air and fuel gas accumulating inside fuel cell module 2 is discharged under temperature drop operation, the natural leaving alone of the system is started from a temperature lower than in stop mode 1. The risk of a reverse flow of air before the fuel electrode temperature drops to the oxidation suppression temperature is therefore decreased. Thus after a shutdown stop, the pressure reduction on the fuel electrode side becomes more gradual than the drop in pressure on the air electrode. Since the temperature inside the fuel cell module 2 is averaged under temperature drop operation, the risk is diminished that fuel gas on the inside of fuel cell units 16 will suddenly shrink and air will be pulled in on the fuel electrode side.

Furthermore, after a shutdown stop air is fed to the air electrode side under temperature drop operation, therefore the flame at the top end of gas flow path fine tubing 98 is more quickly extinguished, and consumption of remaining fuel is suppressed. Immediately after a shutdown stop, a large amount of fuel gas jetted from fuel cell units 16 flows out on the air electrode side of fuel cell units 16 without being combusted. In stop mode 2, after a shutdown stop air is fed into the air electrode side and jetted fuel gas is discharged together with air, so the risk that fuel gas which has flowed away from the fuel electrodes will contact the air electrodes and cause a partial reduction of the air electrodes is avoided.

FIG. 17 is a diagram explaining the operation of stop mode 2; the top portion shows a graph schematically depicting pressure changes on the fuel electrode side and air electrode side; the middle portion shows the control operations by control section 110 and the temperature inside fuel cell module 2 on a time line, and the bottom portion shows the state at the top end portion of the fuel cell units 16 at each point in time.

First, in the middle portion of the FIG. 17, an electrical generation operation is being performed before a shutdown stop, and temperature drop operation is executed after the shutdown stop. After a temperature drop operation of approximately 2 minutes, generating air flow regulator unit 45 is stopped, following which the system is left alone as in stop mode 1. In stop mode 2, however, the temperature inside fuel cell module 2 at the starting point of leaving the system alone (time t202 in FIG. 16), and the pressure on the fuel electrode side and on the air electrode side, are reduced more than in stop mode 1. For this reason the risk of air penetrating to the fuel electrode side before the fuel electrode temperature drops to 350° C. is still further diminished.

Next, referring to FIGS. 18 through 22, we explain stop mode 3.

Figure 18:
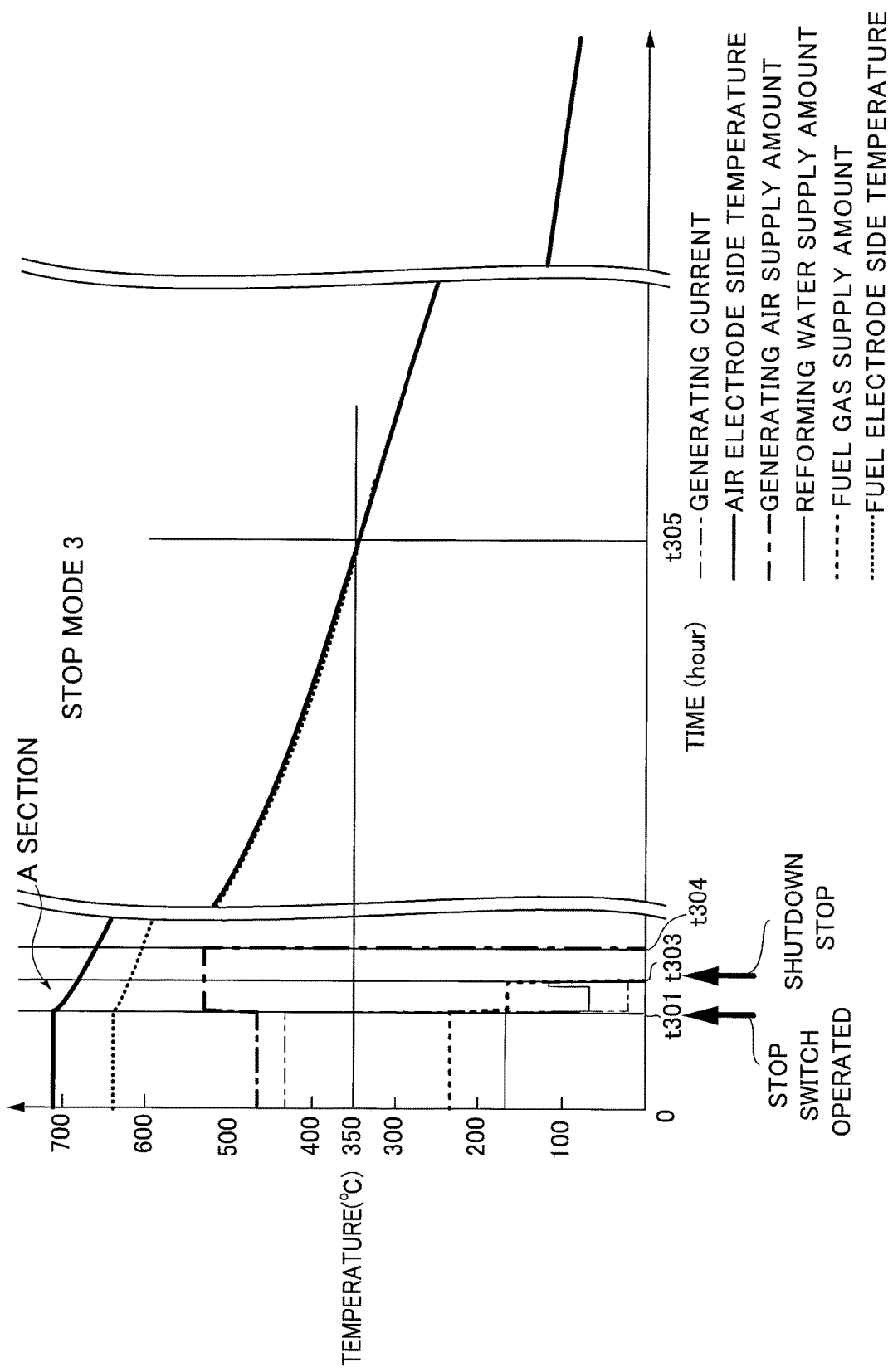
FIG. 18 is a timing chart schematically showing stopping behavior on a timeline when stop mode 3 is executed in a fuel cell apparatus according to a first embodiment of the present invention.
Figure 19:
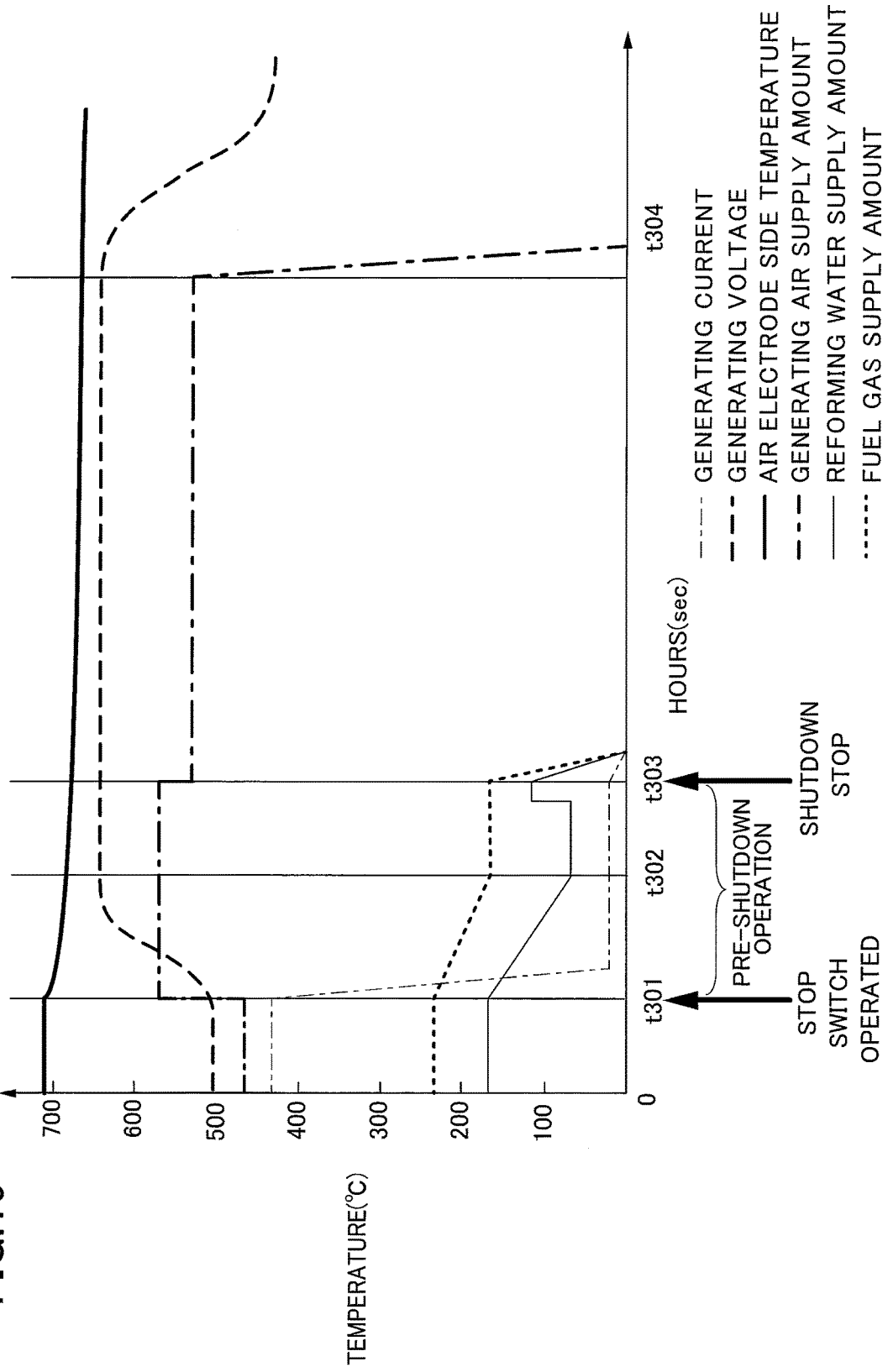
FIG. 19 is a timing chart showing an expanded view immediately after a shutdown stop in stop mode 3 of a fuel cell apparatus according to a first embodiment of the present invention.
Figure 20:
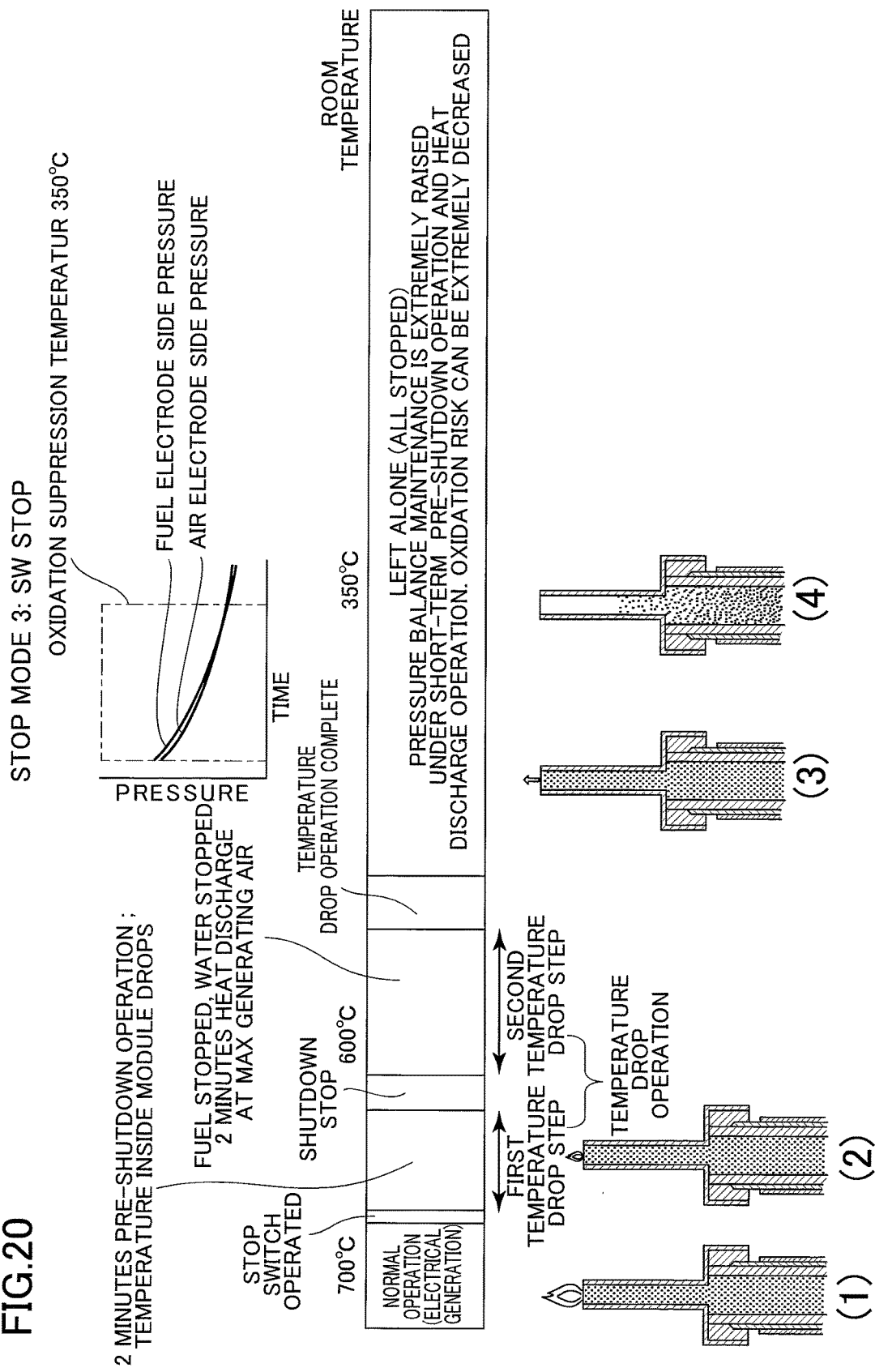
FIG. 20 is a diagram explaining the control, temperature and pressure inside the fuel cell module, and state of the tip portion of the fuel cell unit in a time line when stop mode 3 is executed in a fuel cell apparatus according to a first embodiment of the present invention.
Figure 22:
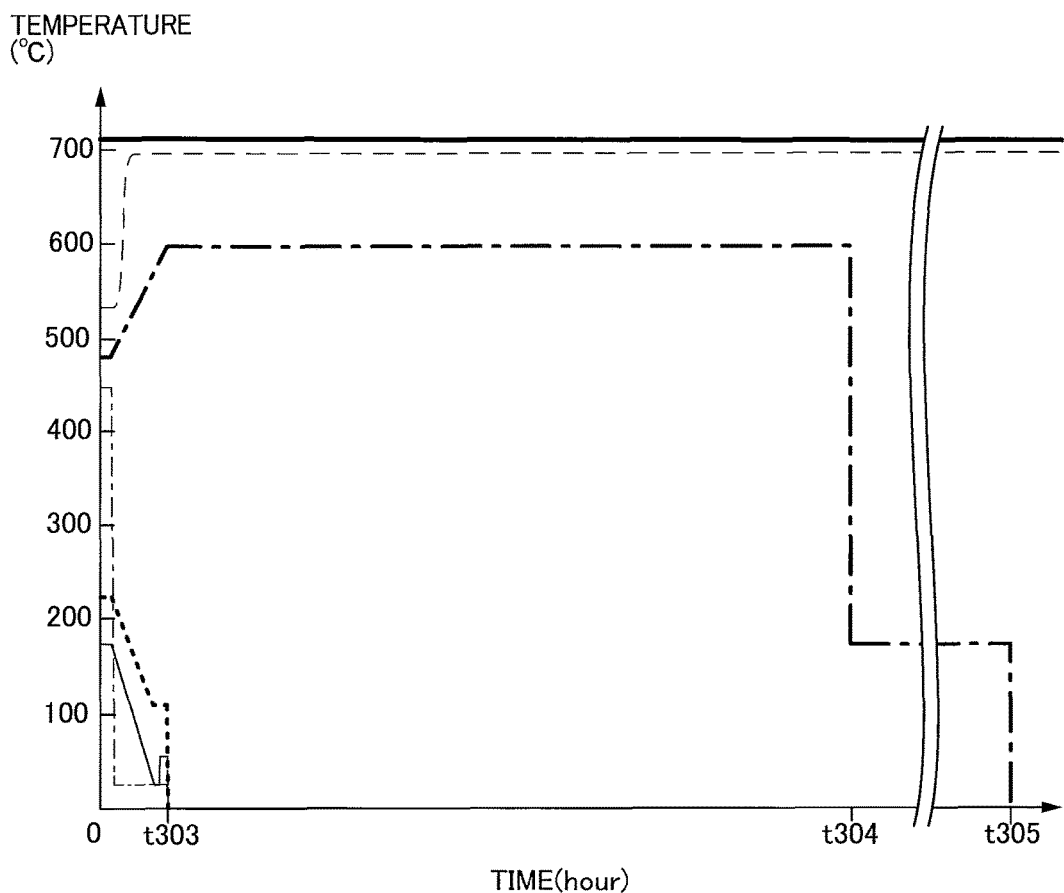
FIG. 22 is a timing chart showing a variant example of stop mode 3.

FIG. 18 is a timing chart schematically showing on a time line an example of the stopping behavior when stop mode 3 (step S6 in FIG. 13) is executed in a solid oxide fuel cell system 1 according to a first embodiment of the present invention. FIG. 19 is a timing chart showing an expanded view immediately after a shutdown stop. FIG. 20 is a diagram explaining on a time line the control, the temperature inside the fuel cell module, the pressure, and the state of the tip portion of the fuel cell units when stop mode 3 is executed. FIG. 22 is a timing chart showing a variant of stop mode 3.

First, stop mode 3 is a stop mode executed by user operation of a stop switch. As shown in FIGS. 18 and 19, temperature drop operation is also executed during stop mode 3, but the temperature drop operation in stop mode 3 comprises a first temperature drop step prior to the complete stopping of power extraction from fuel cell stack 14, and a temperature drop step after power extraction is stopped. The second temperature drop step is the same as the temperature drop operation in stop mode 2, and the first temperature drop step is executed as pre-shutdown operation before power extraction is stopped.

In the example shown in FIG. 19, a stop switch is operated by a user at time t301, and pre-shutdown operation, which is the first temperature drop step, is started. In pre-shutdown operation, the output to inverter 54 by fuel cell module 2 is first stopped. This results in a sudden drop in the current and power extracted from fuel cell module 2, as shown by the light dot and dash line in FIG. 19. Note that in pre-shutdown operation, the current output to inverter 54 from fuel cell module 2 is stopped, but extraction of a certain weak current (approximately 1 A) for operating the solid oxide fuel cell system 1 auxiliary unit 4 is continued for a predetermined time. Therefore even after the generated current has greatly decreased at time t301, a weak current is extracted from fuel cell module 2 during pre-shutdown operation. As shown by the dotted line in FIG. 19, the output voltage on fuel cell module 2 rises as extracted current drops. Thus in pre-shutdown operation, the amount of power extracted is restricted, and electrical generation at a predetermined power is continued while a weak current is extracted, therefore since a part of the supplied fuel is used for electrical generation, an extraordinary increase in surplus fuel not used for electrical generation is avoided, and the temperature inside fuel cell module 2 is decreased.

Moreover, in pre-shutdown operation, after time t301 the fuel supply amounts shown by the dotted line and the reforming water supply amounts shown by the light solid line in FIG. 19 are linearly decreased. On the other hand, in pre-shutdown operation the amount of generating air supplied, is set at the maximum air supply amount on generating air flow regulator unit 45. Therefore during pre-shutdown operation, more air is supplied than the amount corresponding to the power extracted from fuel cell module 2. By increasing the air supply amount in this way, robbing of heat from reformer 20 and a rise in temperature within fuel cell module 2 are suppressed. Continuing, in the example shown in FIG. 19, at time t302 approximately 20 seconds after time t301, the fuel supply amount and water supply amount are reduced to the supply amounts which correspond to the weak current extracted from fuel cell module 2; thereafter a reduced supply amount is maintained. By reducing the fuel supply amount and water supply amount in this way as pre-shutdown operation, air current turbulence within fuel cell module 2 caused by the sudden stopping of a large flow volume of fuel when the fuel supply is fully stopped is prevented, and large quantities of fuel are kept from accumulating in reformer 20 and manifold 66 after the supply of fuel is completely stopped. Note that after time t301, the temperature of the air on the air electrode side inside fuel cell module 2, shown by the heavy solid line in FIG. 19, is reduced by lowering the fuel supply amount and increasing the air supply amount. However, a large heat quantity is still accumulated in thermal insulation 7, etc. surrounding fuel cell module 2. Also, while the current output to inverter 54 is stopped under pre-shutdown operation, the supply of fuel and water are continued, therefore even if the supply of generating air is continued, no reverse flow of air to the fuel electrode side occurs within the fuel cell units 16. Therefore the supply of air can be safely continued.

In the example shown in FIG. 19, from time t301 at which pre-shutdown operation is started until time t303 approximately 2 minutes later, the fuel supply amount and reforming water supply amount are brought to zero, and current extracted from fuel cell module 2 is also brought to zero and a shut down stop effected. Note that in the example shown in FIG. 19, at time t303 the water supply amount is increased slightly immediately before the current extracted from fuel cell module 2 is brought to zero. This increase in the water supply amount adjusts the water amount at the time of a shutdown stop so that an appropriate amount of water remains in vaporizing section 20a. This control of the water supply amount is discussed below.

In the example shown in FIG. 19, even after the shutdown stop at time t303, the supply of generating air is continued as a second temperature drop step in the temperature drop operation (although electrical generation is completely stopped). By so doing, the air in fuel cell module 2 (on the air electrode side of fuel cell stack 14), the remaining fuel combustion gas, and the fuel from the fuel electrode side of fuel cell stack 14 after a shutdown stop are discharged, so the second temperature drop step functions as an exhaust step. At time t303 in the embodiment, after the supply of fuel has been completely stopped, the supply of a large volume of generating air is continued for a predetermined time until time t304. The amount of generating air supplied is increased up to the maximum air supply amount during pre-shutdown operation, after which it is maintained at the maximum value.

As shown in FIG. 18, at time 304 the system is left alone, as in stop mode 1, after the supply of generating air is stopped. However, in stop mode 3 a first temperature drop step is executed before a shutdown stop, and a second temperature drop step is executed after a shutdown stop, therefore the temperature decrease in part A of FIG. 18 is greater than in stop modes 1 and 2, and the leaving alone of the system is started from a lower temperature and a lower pressure state.

FIG. 20 is a diagram explaining the operation of stop mode 3; the top portion shows a graph schematically depicting pressure changes on the fuel electrode side and air electrode side; the middle portion shows the control operations by control section 110 and the temperature inside fuel cell module 2 on a time line, and the bottom portion shows the state at the top end portion of the fuel cell units 16 at each point in time.

First, before the stop switch is operated in the middle portion of FIG. 20, a generating operation is being performed; after the stop switch is operated a pre-shutdown operation step is executed, being the first temperature drop step. In the pre-shutdown operation step, the amount of fuel gas supplied is decreased, as shown in the bottom portion (1)

of FIG. 20, causing the flame at the top end of the fuel cell units 16 to decline in size, as shown in the lower portion (2) of the figure. Since the amounts of fuel gas supplied and electricity generated are decreased in this way, the temperature inside fuel cell module 2 is decreased more than during the electrical generation operation. After an approximately 2 minute pre-shutdown operation step, a shutdown stop is performed. After the shutdown stop, generating air is supplied for 2 minutes by generating air flow regulator unit 45 as a second temperature drop step. After the second temperature drop step, generating air flow regulator unit 45 is stopped, following which the system is left alone, as in stop mode 1.

As described above, at the time of a shutdown stop the pressure on the fuel electrode side of the fuel cell units 16 is higher than the pressure on the air electrode side, therefore fuel gas on the fuel electrode side jets out from the top end of the fuel cell units 16 even after the fuel supply is stopped. In addition, flame resulting from the combustion of fuel gas is extinguished at the time of a shutdown stop. After a shutdown stop, the quantity of fuel gas jetted from the top end of each individual fuel cell unit 16 is greatest immediately after a shutdown stop, then declines gradually. This large amount of fuel gas jetted immediately after a shutdown stop is discharged to the outside of fuel cell module 2 by generating air supplied in the second temperature drop step (exhaust step). Even after the exhaust step ends, fuel gas is jetted from the top ends of the fuel cell units 16, but the quantity of that fuel gas is relatively small.

For this reason hydrogen, which is the fuel gas jetted after completion of the exhaust step, accumulates at the top portion inside fuel cell module 2 (above the fuel cell stack 14), but jetted fuel gas makes no substantial contact with the air electrodes in the fuel cell units 16. Therefore fuel gas is reduced subjected to a reduction reaction by contact with high temperature air electrodes, and there is no degradation of the air electrodes. In pre-shutdown operation prior to a shutdown stop, water is supplied so that an appropriate amount of water within a predetermined range of quantities is accumulated within vaporizing section 20a. Therefore in the exhaust step following a shutdown stop, the pressure on the fuel electrode side of the fuel cell units 16 is increased by the vaporization of water in vaporizing section 20a, and an appropriate amount of fuel gas is jetted from the top end of the fuel cell units 16. Fuel gas jetted during the exhaust step is quickly exhausted from fuel cell module 2. Since an appropriate amount of fuel gas is jetted out in the exhaust step, it does not occur after the exhaust step that an excessive amount of fuel gas is jetted out from the fuel cell units 16, degrading the air electrodes.

Here, in stop mode 3, after completion of the exhaust step, the temperature inside fuel cell module 2 at the starting point of leaving the system alone (time t304 in FIG. 18), as well as the pressures on the fuel electrode side and air electrode side, are decreased more than in stop modes 1 and 2. Also, in stop mode 3 the fuel gas supply amount and water supply amount prior to shutdown stop are fixed at a predetermined value by the pre-shutdown operation step. This leads to a decline in the degree of variability of pressure and temperature distribution, etc. when the system is initially left alone, which is dependent on the operating state during electrical generation, and the system is always left alone from an appropriate starting state. Therefore the risk of air invading the fuel electrode side before the fuel electrode temperature drops to the oxidation suppression temperature is extremely low.

Figure 21:
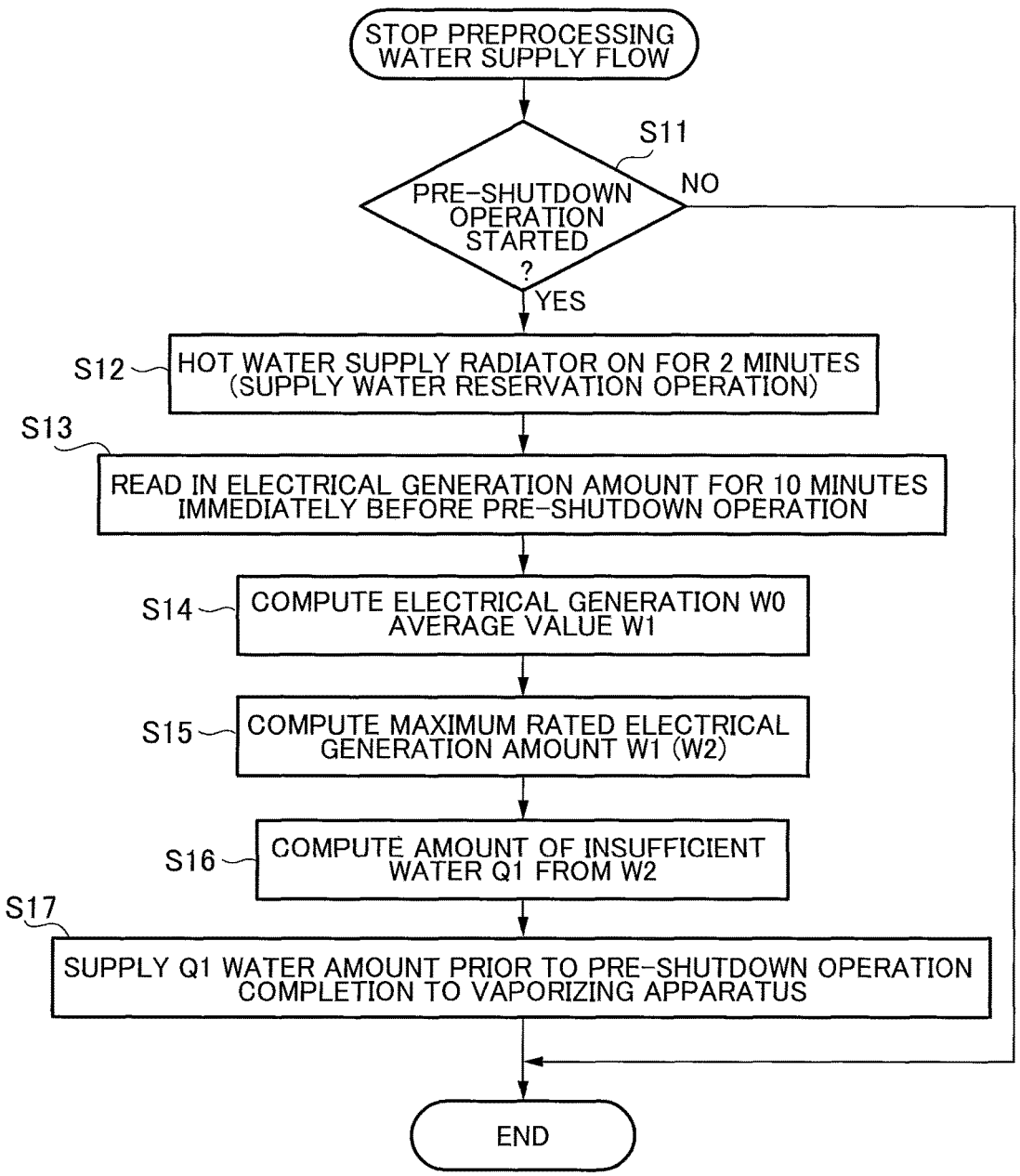
FIG. 21 is a flow chart of the supply of water in pre-shutdown operation.

Next, referring to FIG. 21, we explain the supply of water in pre-shutdown operation.

FIG. 21 is a flow chart of the supply of water in pre-shutdown operation; during the operation of solid oxide fuel cell system 1, this is repeatedly executed at a predetermined time interval by shutdown stop circuit 110a. First, at step S11 in FIG. 21, a determination is made as to whether pre-shutdown operation has started. If pre-shutdown operation has started, the system advances to step S12; if it has not started, one iteration of the FIG. 21 flow chart is completed.

Next, in step S12, as a water supply securing step, a hot water radiator (not shown) built into hot water production device 50 (FIG. 1) is activated for 2 minutes. This hot water radiator heats water by performing a heat exchange with high temperature exhaust gas from fuel cell module 2, recovering discharged heat in the exhaust gas. At the same time, the exhaust gas contains steam, and a heat exchange is carried out between this steam and the hot water radiator, whereby the steam turns into water due to cooling and condenses. By activating the hot water radiator, the amount of cooling of exhaust gas increases, and the amount of condensed water increases. The increased condensed water is recovered and stored in pure water tank 26 (FIG. 1). Water recovered in this pure water tank 26 is utilized as water for steam reforming after passing through filter processing, etc. (not shown). Water produced by this processing in step S12 is utilized to supply water during pre-shutdown operation, and for the pressure retention operation executed in stop mode 4, described below. Note that while the amount of water used during pre-shutdown operation and pressure retention operation is slight, high temperature exhaust gas containing large amounts of steam is suddenly cooled by the hot water radiator (not shown), therefore the needed water can be sufficiently acquired in 2 minutes during pre-shutdown operation.

Next, in step S13, time line data W0 for the quantity of electrical generation during the 10 minutes immediately prior to time t301 in FIG. 19, when pre-shutdown operation is begun, is read into control section 110. Also, an average value W1 for 10 minutes of read-in electrical generation amount time line data W0 is calculated in step S14. Next, at step S15, a difference W2 is calculated between the solid oxide fuel cell system 1 maximum rated generating amount and the average value W1. In addition, at step S16 an insufficient water quantity Q1 is also calculated based on the difference W2. Finally, in step S17, the quantity Q1 of water calculated to be lacking is supplied before the end of pre-shutdown operation (immediately before time t303 in FIG. 19), and one iteration of the flow chart in FIG. 21 is completed.

As a result of supplying this insufficient water quantity Q1, approximately the same quantity of reforming water is accumulated in vaporizing section 20a as when a shutdown stop is performed following continuous operation at the maximum rated generating amount. Vaporization of this water in the exhaust step following a shutdown stop (time t303-t304 in FIG. 19) causes the pressure on the fuel electrode side of the fuel cell units 16 to increase, and an appropriate amount of fuel gas is jetted from the top end of the fuel cell units 16.

Next, referring to FIG. 22, we explain a variant example of stop mode 3.

In the variant example shown in FIG. 22, the way in which generating air is supplied in the second temperature drop step differs from FIG. 19. As shown in FIG. 22, in this variant example, after a shutdown stop is performed at time t303, generating air is supplied in the maximum amount until time t304. At time t304, the amount of generating air supplied is decreased in stages, and supply is continued at the reduced supply amount until time t305. The interval between time t303 and t304 is preferably set at approximately 2 to 5 minutes, and the interval between time t304 and t305 is set at approximately 2 to 20 minutes.

In this variant example, high temperature air on the air electrode side is quickly discharged by supplying a large quantity of generating air under high pressure on the fuel electrode side immediately after a shutdown stop. At the same time, if a certain amount of time has elapsed since a shutdown stop and pressure on the fuel electrode has dropped, reducing the amount of generating air supplied causes high temperature air to be discharged while avoiding the risk of reverse flow.

Figure 23:
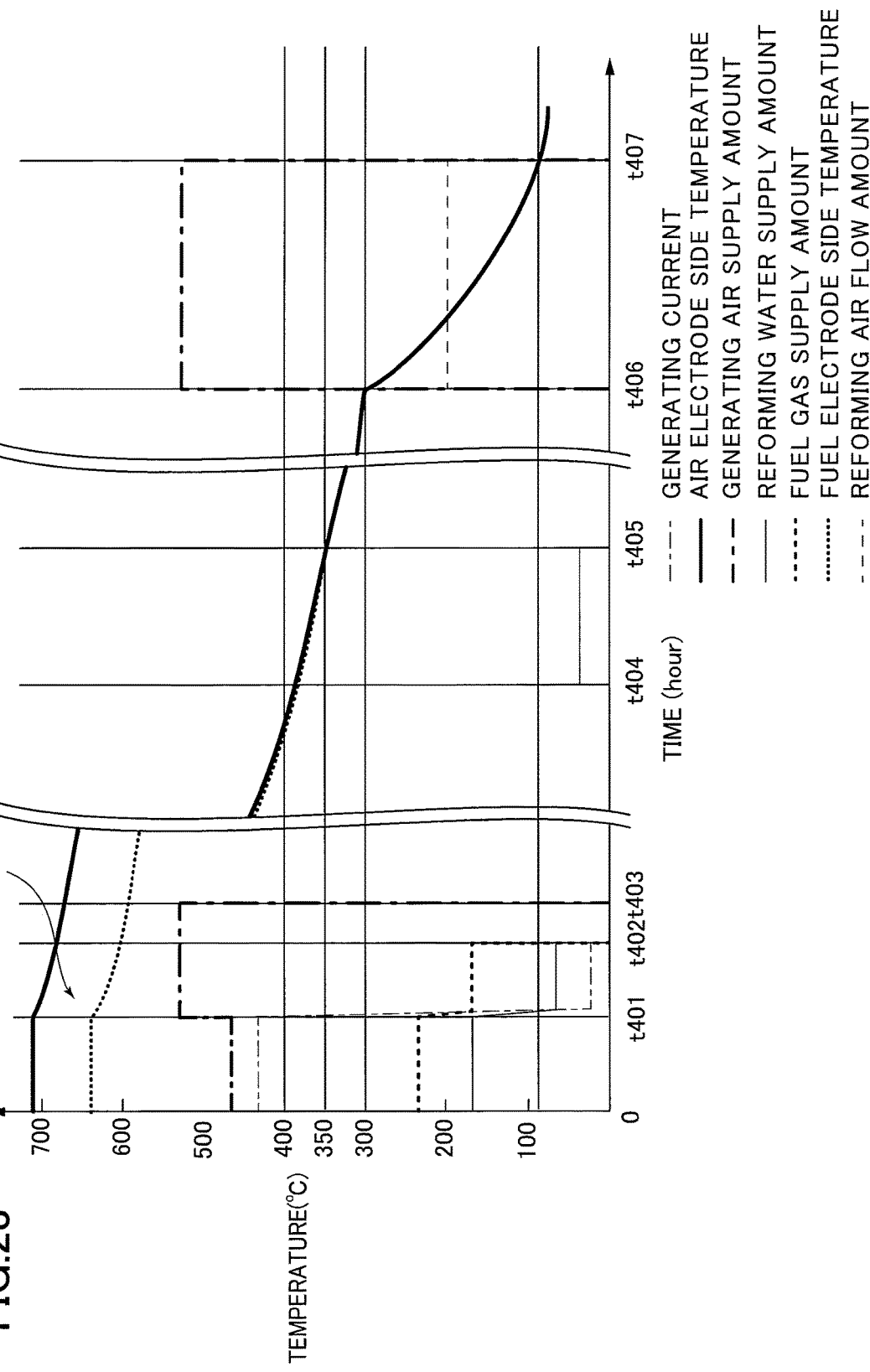
FIG. 23 is a timing chart schematically showing stopping behavior on a timeline when stop mode 4 is executed in a fuel cell apparatus according to a first embodiment of the present invention.
Figure 24:
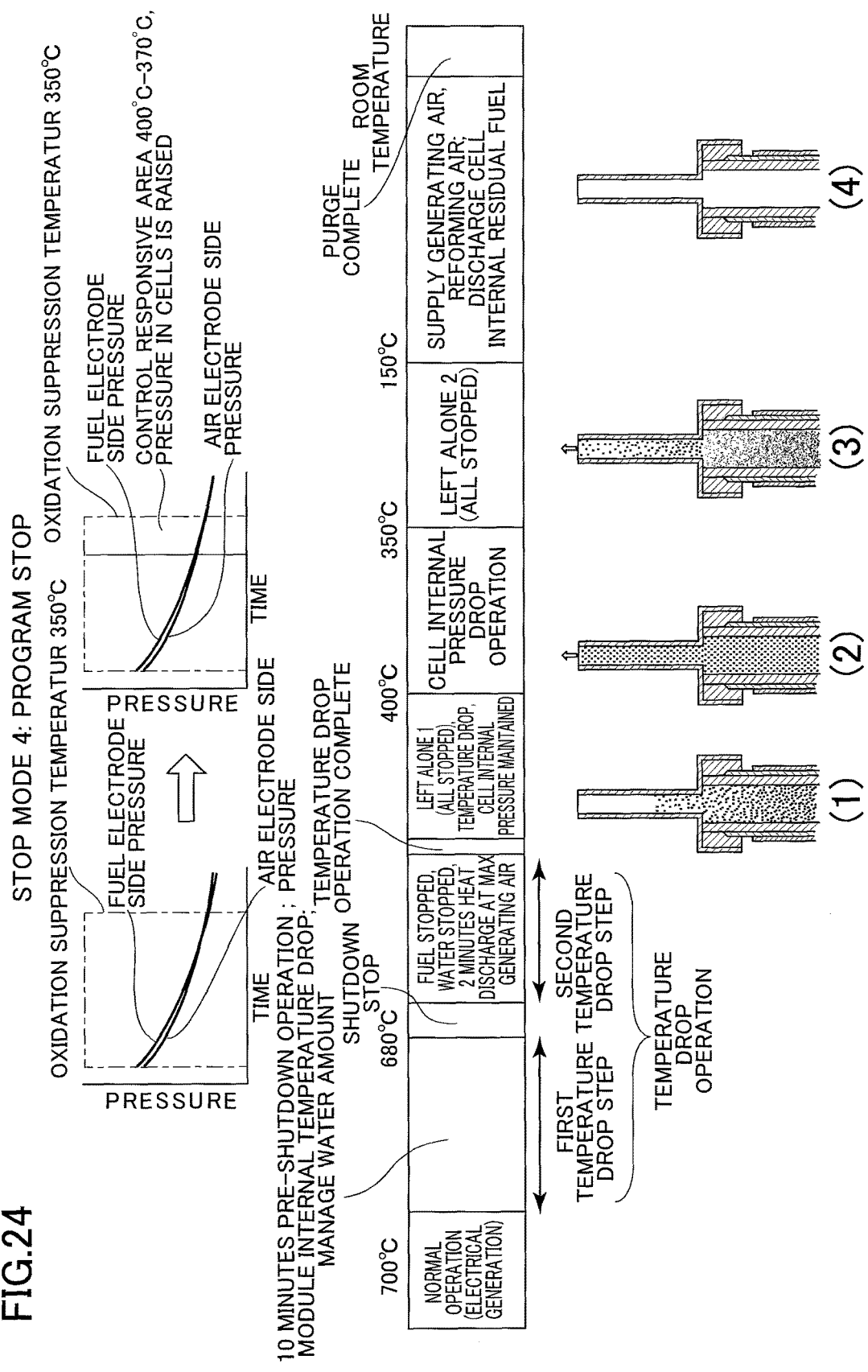
FIG. 24 is a diagram explaining the control, temperature and pressure inside the fuel cell module, and state of the tip portion of the fuel cell unit in a time line when stop mode 4 is executed in a fuel cell apparatus according to a first embodiment of the present invention.

Next, referring to FIGS. 23 and 24, we explain stop mode 4.

FIG. 23 is a timing chart schematically showing on a time line an example of the stopping behavior when stop mode 4 (step S8 in FIG. 13) is executed in a solid oxide fuel cell system 1 according to a first embodiment of the present invention. FIG. 24 is a diagram explaining on a time line the control, the temperature and pressure inside the fuel cell module, and the state of the tip portion of the fuel cell units when stop mode 4 is executed.

First, stop mode 4, as described above, is a stop executed approximately once per month to respond to a microprocessor meter (not shown); of the stop modes, it is executed most often. Therefore when executing stop mode 4, oxidation of fuel electrodes must be more reliably prevented, since even a slight negative effect from the oxidation of the fuel electrodes on fuel cell units 16, etc. imparts a large effect on the durability of fuel cell stack 14. Stopping by stop mode 4 is executed periodically based on a program built into shutdown stop circuit 110a.

First, at time t401 in FIG. 23, a predetermined time before the shutdown stop time planned by the program in shutdown stop circuit 110a, the shutdown stop circuit 110a executes a temperature drop operation. As in stop mode 3, in stop mode 4 the temperature drop operation is executed by a first temperature drop step and a second temperature drop step. I.e., in pre-shutdown operation, which is the first temperature drop step, the output of generated power to inverter 54 by fuel cell module 2 is first stopped, and only the extraction of a weak current (appropriate 1A) for operating the auxiliary unit 4 in solid oxide fuel cell system 1 is continued. In pre-shutdown operation, as noted above, the water supply flow for pre-shutdown operation shown in FIG. 21 is also executed.

Moreover, in pre-shutdown operation, after time t401 the fuel supply amounts shown by the heavy dotted line and the reforming water supply amounts shown by the light solid line in FIG. 23 are decreased. On the other hand, the amount of generating air supplied, as shown by the heavy dot and dash line, is increased. In stop mode 4, the first temperature drop step is continued for 10 minutes after time t401, a longer period than stop mode 3.

At time t402, when 10 minutes have elapsed after time t401, shutdown stop circuit 110a executes a shutdown stop. When a shutdown stop is performed, the supply of fuel by fuel flow regulator unit 38 and the supply of water by water flow volume regulator unit 28 are stopped in a short period of time. The extraction of power from fuel cell module 2 by inverter 54 is also stopped (output current=0).

Shutdown stop circuit 110a executes a second temperature drop step of the temperature drop operations after a shutdown stop at time t402, and generating air flow regulator unit 45 is operated at maximum output for approximately 2 minutes. In addition, at time t403 in FIG. 23, as in stop mode 1, after generating air flow regulator unit 45 is stopped, the system is left alone.

Furthermore, in stop mode 4, when approximately 5 hours have elapsed at time t40, and the temperature inside fuel cell module 2 has fallen to a predetermined temperature after a shutdown stop, shutdown stop circuit 110a activates pressure retention operation circuit 110b (FIG. 6). In this embodiment, when the temperature inside fuel cell module 2 drops to a predetermined temperature of 400° C., the pressure on the fuel electrode side of fuel cell units 16 also falls, and approaches the pressure on the air electrode side. Pressure retention control circuit 110b sends a signal to water flow volume regulator unit 28, thereby activating it. The activation of water flow volume regulator unit 28 results in water being supplied to vaporizing section 20a in reformer 20. The interior of fuel cell module 2 is still at a temperature of approximately 400° C. even at time t404 when approximately 5 hours have elapsed after a shutdown stop, so water supplied to vaporizing section 20a is vaporized there. Note that in this embodiment, water is supplied intermittently, and the water supply amount is set at approximately 1 mL per minute; this water supply amount value is below the minimum water supply amount in the electrical generation operation.

Vaporization and expansion of water in vaporizing section 20a raises the pressure inside the fuel gas passageway from reformer 20 through fuel gas supply pipe 64 and manifold 66 (FIG. 2) up to the fuel cell units 16. Thus pressure drops on the fuel electrode side of fuel cell units 16 are suppressed, and a reverse flow of air to the fuel electrode side is more reliably prevented. Note that the flow paths for vaporizing section 20a, reforming section 20b, and reforming section 20c in reformer 20 are all formed in a serpentine shape, making it difficult for the effects of a pressure rise to be transferred downstream even if water suddenly vaporizes inside vaporizing section 20a. Sudden rises in pressure on the inside of fuel cell units 16 (the fuel electrode side) caused by sudden vaporization, such that fuel gas accumulated therein is jetted out in large quantities over a short time period, can thus be prevented.

Pressure fluctuation-suppressing flow resistance section 64c (FIG. 2), which is installed midway on fuel gas supply pipe 64, and gas flow path fine tubing 98, which is an inflow-side flow resistance section installed at the bottom end of the fuel cell units 16, also suppress sudden pressure rises on the fuel electrode side, and cause fuel gas to remain for long time periods on the fuel electrode side.

Pressure retention control circuit 110b stops water flow volume regulator unit 28 at time t405 in FIG. 23 when the temperature inside fuel cell module 2 has dropped to the oxidation temperature; thereafter fuel cell module 2 is left alone.

Furthermore, at time t406 when the temperature inside fuel cell module 2 has further dropped, shutdown stop circuit 110a sends a signal to reforming air flow regulator unit 44 and generating air flow regulator unit 45, activating those units. By this means the fuel gas passageways such as reformer 20, fuel gas supply pipe 64, and manifold 66, and the internal fuel electrodes in the fuel cell units 16, are purged by air. The inside of exhaust gas passageways such as the air electrode side inside generating chamber 10, the exhaust pathway 21b, and in air-heat exchanger 22 are also purged by air. By purging fuel gas passageways and fuel electrodes, steam which had been held within these locations is condensed, and oxidation by condensate water on the fuel gas passageways and fuel electrodes is prevented. By purging the inside of exhaust gas passageways, condensation within exhaust gas passageways of steam discharged from the fuel electrodes is prevented. Also, by purging the air electrode side within generating chamber 10, a reduction reaction by discharged fuel gas from the fuel electrode side is prevented.

FIG. 24 is a diagram explaining the operation of stop mode 4; the top portion shows a graph schematically depicting pressure changes on the fuel electrode side and air electrode side; the middle portion shows the control operations by control section 110 and the temperature inside fuel cell module 2 on a time line, and the bottom portion shows the state at the top end portion of the fuel cell units 16 at each point in time.

Figure 25:
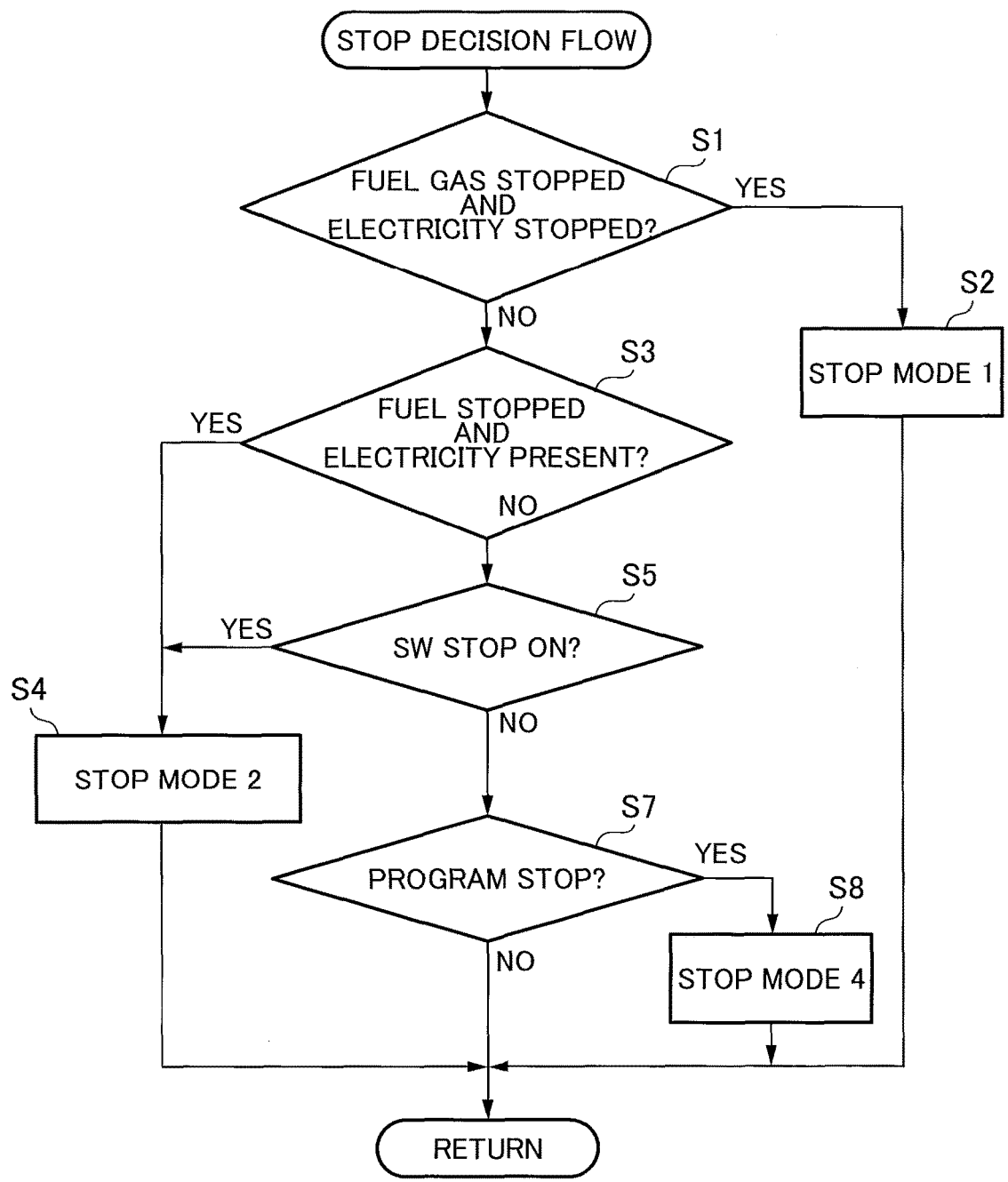
FIG. 25 is a flow chart of the stop decision which selects the stop mode in a variant example of a fuel cell apparatus according to a first embodiment of the present invention.

First, before shutdown stop in the middle portion of FIG. 25, electrical generation is occurring, and 10 minutes before the shutdown stop time planned in the program, a first temperature drop step under temperature drop operation is executed. In stop mode 4, because the first temperature drop step is executed for approximately 10 minutes, the temperature inside fuel cell module 2 at the time of shutdown stop, as well as the pressure on the fuel electrode side and the air electrode side, are decreased by a greater amount than in stop mode 3. After a shutdown stop, generating air is supplied for approximately 2 minutes as the second temperature drop step of the temperature drop operation, and generating air flow regulator unit 45 is stopped. After generating air flow regulator unit 45 is stopped, the system is left alone, as in stop mode 3. Here, in stop mode 4, when the system is initially left alone (time t403 in FIG. 23), the temperature inside fuel cell module 2 and the pressures on the fuel electrode side and the air electrode side are decreased even more than in stop mode 3. For this reason the risk of air penetrating to the fuel electrode side before the fuel electrode temperature drops to the oxidation suppression temperature is still further reduced.

In addition, in stop mode 4 at the point in time when the pressure on the fuel electrode side of the fuel cell units 16 has approached the pressure on the air electrode side by being left alone, pressure retention operation circuit 110b is activated, and the pressure on the fuel electrodes in the fuel cell units 16 is increased. Under pressure retention operation, reformed fuel gas which had been accumulating in manifold 66 and in fuel gas supply pipe 64 (FIG. 2), etc. is first fed a little at a time to the fuel electrodes in the fuel cell units 16, then the unreformed fuel gas which had remained inside reformer 20 is fed a little at a time to the fuel electrodes. In addition, after all the unreformed fuel gas is fed in, the steam vaporized in vaporizing section 20a is fed in a little at a time to fuel electrodes in fuel cell units 16. At the point when pressure retention operation circuit 110b is activated, the temperature at the fuel electrodes in the fuel cell units 16 has fallen to close to the oxidation suppression temperature, therefore even if a reverse flow of air to the fuel electrode side occurs, the effect thereof is minute. However, the program stop which executes stop mode 4 is the most often executed stop mode, therefore the risk of fuel electrode oxidation is even further reduced, and the effects of oxidation of each fuel cell units 16 are reduced to a minimum.

As indicated on the left side of the upper portion of FIG. 24, in stop modes 1 through 3 the pressure on the fuel electrode side of fuel cell units 16 drops after a shutdown stop and approaches the pressure on the air electrode side around the time the fuel electrode temperature drops down to the region of the oxidation suppression temperature. In response, in stop mode 4, as shown on the right side of the upper portion of FIG. 24, pressure retention operation by pressure retention operation circuit 110b is executed in the region where pressure on the fuel electrode side approaches the pressure on the air electrode side, and a drop in pressure on the fuel electrode side below that on the air electrode side is more reliably prevented.

As shown in the bottom portion of FIG. 24, when the system is left alone after completion of the second temperature drop step ("left alone 1" in the middle portion of FIG. 24), the fuel gas which had been accumulating at the fuel electrodes in the fuel cell units 16 flows out a little at a time, and at the end of that time the air on the air electrode side can in some cases begin to diffuse to the fuel electrode side (bottom portion (1) in FIG. 24). However, because pressure retention operation is started, the pressure of the steam produced inside vaporizing section 20a causes fuel gas accumulated inside the fuel gas passageways on the downstream side of reformer 20 to again move into the fuel cell units 16, so that the concentration of fuel gas inside the fuel electrodes again rises (lower portion (2) of FIG. 24). Later, as well, steam is produced within vaporizing section 20a under pressure retention operation, so the outflowing portion of fuel gas from the fuel electrodes in the fuel cell units 16 is compensated by the fuel gas which had been accumulating in the fuel gas passageway, and a reverse flow of air to the fuel electrode is prevented. Furthermore, in the pressure retention operation terminating phase, as shown in the bottom portion (3) of FIG. 24, even if accumulated fuel gas has almost completely flowed out, steam produced by the pressure retention operation fills in the fuel electrodes in fuel cell units 16, so a reverse flow of air to the fuel electrodes is reliably prevented.

In addition, after the completion of the pressure retention operation, the system is left alone ("left alone 2" in the middle portion of FIG. 24), following which reforming air and generating air are supplied (reforming and electrical generation are not performed), and a purge is executed. Thus the fuel gas and steam remaining on the fuel electrode side of fuel cell units 16 are discharged, and the fuel gas remaining on the air electrode side in generating chamber 10 is also discharged from fuel cell module 2. By this means, oxidation of the fuel electrodes in the fuel cell units 16 is reliably avoided in the most frequently executed stop mode 4.

Using solid oxide fuel cell system 1 of the embodiment, oxidation of fuel electrodes can be suppressed after executing a shutdown stop (t201 in FIG. 16) by executing a temperature drop operation (times t201-t202 in FIG. 16) to discharge high temperature air remaining on the air electrode side in fuel cell module 2. High temperature air accumulated in fuel cell module 2 can be discharged by supplying air to the air electrode after a shutdown stop (t201 in FIG. 16). Thus since the temperature of the fuel electrode side approaches that of the air electrode side in the fuel cell stack 14, the phenomenon whereby fuel gas which had accumulated on the fuel electrode side shrinks due to a temperature drop, causing air to be pulled in from the air electrode to the fuel electrode, can be prevented. Also, by supplying air after a shutdown stop (time t201 in FIG. 16), the pressure on the air electrode rises and approaches the pressure on the fuel electrode side, therefore the amount of fuel flowing out from the fuel electrode side to the air electrode side during the supply of air following a shutdown stop (time t201-t202 in FIG. 16) is decreased. Thus the period during which fuel remains in reformer 20 and on the fuel electrode side (time t201-t204 in FIG. 16) after a shutdown stop is extended, and oxidation of the fuel electrode can be constrained. Furthermore, during the time after a shutdown stop (time 201 in FIG. 16) when the pressure on the fuel electrode side is sufficiently higher than the pressure on the air electrode side (time t201-t202 in FIG. 16), a large amount of fuel flows out from the fuel electrode side to the air electrode side. In this embodiment, because air is supplied during this period, fuel flowing out to the air electrodes is discharged to outside of fuel cell module 2, together with supplied air. Outflowing fuel can thus be prevented from contacting the air electrode and partially reducing and damaging the air electrodes.

In the solid oxide fuel cell system 1 of the present embodiment, the supply of water during temperature drop operation (time t201-t202 in FIG. 16) is stopped, therefore fuel which had accumulated on the fuel electrode side can be prevented from being pushed onto the air electrode as a result of the vaporization and expansion of water supplied during temperature drop operation. Fuel accumulated on the fuel electrode side can thus be maintained on the fuel electrode side for a long time period, and oxidation of the fuel electrode can be more reliably suppressed.

In addition, using the solid oxide fuel cell system 1 of the present embodiment the temperature drop operation is executed immediately after a shutdown stop (time t201 in FIG. 16), so air can be supplied when the pressure on the fuel electrode side is highest (the top portion of FIG. 17) and the risk of a reverse flow is lowest, and the temperature inside fuel cell module 2 can be decreased.

Also, using the solid oxide fuel cell system 1 of the present embodiment, fuel gas flow path fine tubing 98 (FIG. 4) is installed as an acceleration section on the end portion of the fuel cell units 16, so that fuel jetted from the end portion of the fuel electrodes on the inside of the fuel cell units 16 is accelerated so as to be distanced from the air electrodes. Contact with an air electrode by fuel jetted from a fuel electrode resulting in partial reduction of and damage to an air electrode can thus be reliably prevented.

Furthermore, using the solid oxide fuel cell system 1 of the present embodiment, fuel gas flow path fine tubing 98 is constituted as a constricted flow path installed on the end portion of the fuel cell units 16, therefore damage to air electrodes caused by reduction can be prevented by a simple structure. In addition, by providing a constricted flow path, fuel flowing out from the fuel electrode side after a shutdown stop (FIG. 16, time t201) can be decreased, allowing the fuel accumulated on the fuel electrode side to be kept on the fuel electrode for a long time period (FIG. 16, time t201-t204). The risk of a reverse flow of air from the air electrode side to the fuel electrode side leading to oxidation of the fuel electrode can thus be further reduced.

Also, using the solid oxide fuel cell system 1 of the present embodiment, fuel gas flow path fine tubing 98 is constituted so that a high pressure state on the fuel electrode side is maintained for a predetermined time period (time t201-t204 in FIG. 16) after a shutdown stop (time t201 in FIG. 16), so that reverse flows of air to the fuel electrode side are prevented, and the risk of fuel electrode oxidation is well diminished, even after the completion of a temperature drop operation (time t202 in FIG. 16).

In addition, using the solid oxide fuel cell system 1 of the present embodiment, fuel gas flow path fine tubing 98 is constituted so that pressure on the fuel electrode side is high (upper portion of FIG. 17) even when air is supplied under temperature drop operation, so that the temperature drop operation (time t201-t202 in FIG. 16) can be executed without risk of a reverse flow of air.

Also, using the solid oxide fuel cell system 1 of the present embodiment, fuel gas flow path fine tubing 98 is constituted so that the pressure drop on the fuel electrode side is more gradual than on the air electrode side (upper portion of FIG. 17) after a shutdown stop (time t201 in FIG. 16), therefore even after fuel cell module 2 has been left alone, the pressure on the fuel electrode side can be maintained in a high state over a long time period (time t201-t204 in FIG. 16), and a reverse flow of air can be prevented.

Also, using the solid oxide fuel cell system 1 of the present embodiment, stop mode 3 was executed when a stop switch was operated by a user (FIG. 13, step S5), but as a variant example, stop mode 2 could also be executed, as shown in FIG. 25. FIG. 25 is a flow chart for the stop decision which selects the stop mode in a variant example of a fuel cell apparatus according to variant example of the present invention. I.e., in this variant example, stop mode 2 is executed when fuel gas is stopped and only electricity is being supplied (FIG. 25, step S3→S4), and when a stop switch has been operated by a user (FIG. 25, step S5→S4). According to this variant example, if a stop switch is operated, a shutdown stop is executed without executing pre-shutdown operation (the first temperature drop step), therefore controls for a shutdown stop can be quickly completed after a user operates the stop switch.

Note that in the above-described first embodiment, a pressure-maintaining control was executed by pressure retention operation circuit 110*b* when stop mode 4 was selected, but pressure retention operation may be omitted when the risk of fuel electrode oxidation is sufficiently decreased by a mechanical pressure retention means constituted by the fuel/exhaust gas passageway.

Also, when stop mode 3 or 4 is selected in the above-described embodiment, the supply of air is started by temperature drop operation (time t303-t304 in FIG. 19), which continues after air has been supplied under pre-shutdown operation (time t301-t303 in FIG. 19), but these supplies of air do not need to be continuous. I.e., solid oxide fuel cell system 1 can also be constituted so that after pre-shutdown operation, generating air flow regulator unit 45 is temporarily stopped, and thereafter the supplying of air is restarted as temperature drop operation.

Next, referring to the FIGS. 26 through 29, we discuss the control of a solid oxide fuel cell system according to a second embodiment of the present invention.

The conditions for executing pre-shutdown operation and temperature drop operation are different in the solid oxide fuel cell system of the present embodiment from the first embodiment described above. Therefore here we will explain only the parts which differ between the first embodiment and second embodiment of the present invention; the description in the first embodiment shall be modified and used for those parts which are the same, and an explanation thereof omitted.

Figure 26:
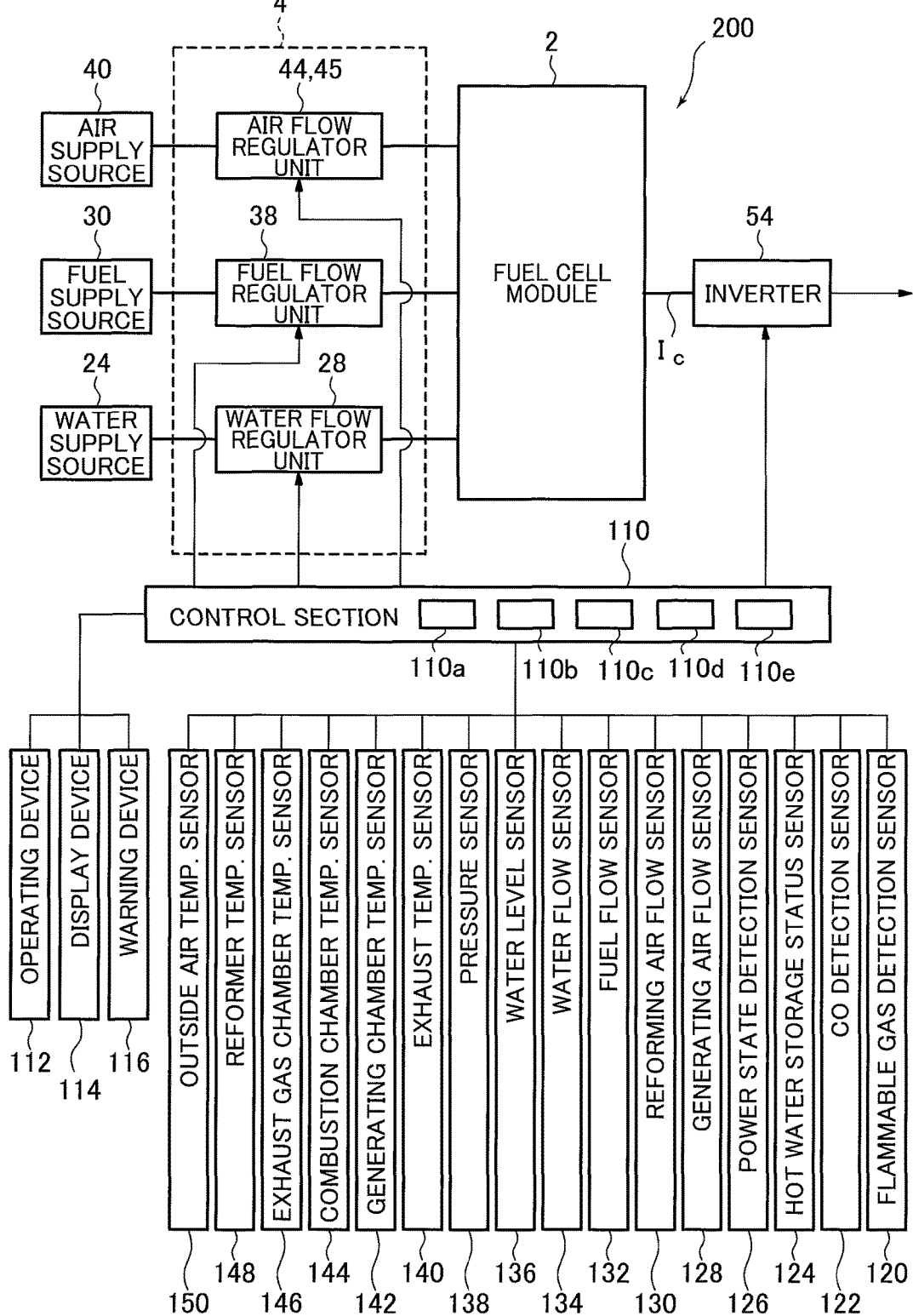
FIG. 26 is a block diagram showing a solid oxide fuel cell system according to a second embodiment of the present invention.

FIG. 26 is a block diagram showing a solid oxide fuel cell system according to a second embodiment of the present invention. As shown in FIG. 26, the constitution of solid oxide fuel cell system 200 according to the present embodiment is the same as the first embodiment except that pre-shutdown operation circuit 110*c* and temperature drop operation halt circuit 110*d* are built into control section 110. The same reference numerals are used for the same constituent parts, and an explanation thereof is omitted. Below, the same reference numerals are assigned as in the first embodiment, even for constituent parts not shown in FIG. 26.

The solid oxide fuel cell system 200 according to a second embodiment of the present invention is also the same as the first embodiment, in that a selection is made of a stop mode 1-4 by the flow chart shown in FIG. 13. In this embodiment, the pre-shutdown operation executed in stop modes 1-4 and the form in which the temperature drop operation is executed differ from the above-described embodiment. Note that in the present embodiment stop mode 4 is selected in order to safely stop the solid oxide fuel cell system 200 even in cases where only power is being supplied.

Figure 27:
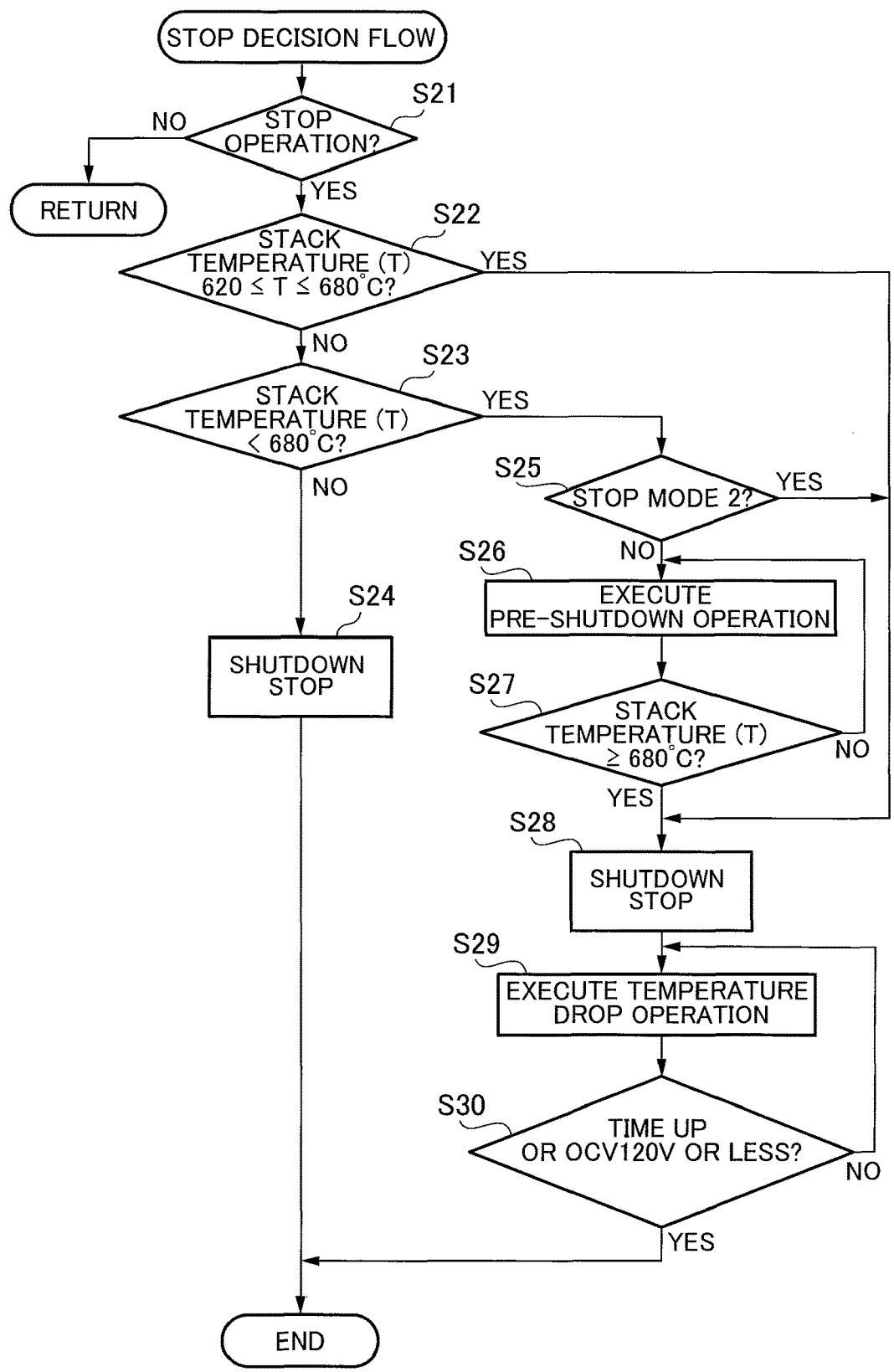
FIG. 27 is a flow chart for controlling the execution of a temperature drop operation after pre-shutdown operation and shutdown stop.
Figure 28:
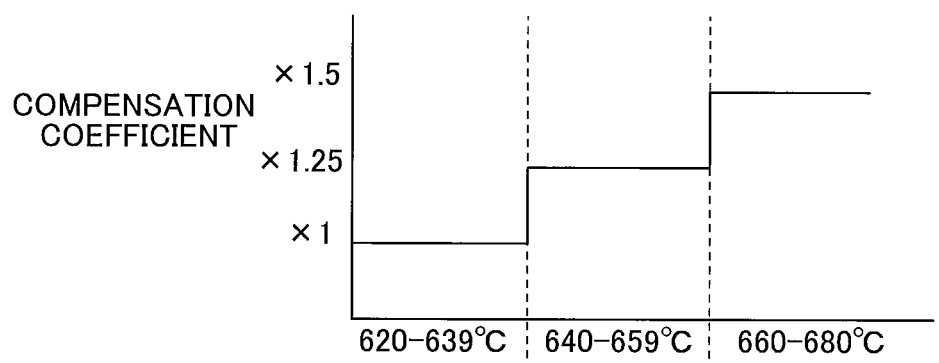
FIG. 28 is a diagram showing a compensation coefficient for the generating air supply amount under temperature drop operation.

Next, referring to FIGS. 27-29, we explain the pre-shutdown operation and temperature drop operation executed in stop modes 2-4 of the present embodiment (in stop mode 2, only a temperature drop operation after a shutdown stop is executed).

FIG. 27 is a flow chart for controlling the execution of a temperature drop operation after pre-shutdown operation and a shutdown stop; this flow chart is executed at a predetermined time interval during operation of the solid oxide fuel cell system. FIG. 28 is a diagram showing a compensation coefficient for the generating air supply amount under temperature drop operation. FIG. 29 is an execution condition table for pre-shutdown operation and temperature drop operation in each stop mode and temperature band.

In the solid oxide fuel cell system 200 of the present embodiment, the form of execution of pre-shutdown operation and temperature drop operation is changed based on the temperature of fuel cell stack 14 detected by a generating chamber temperature sensor 142, which is a temperature detection sensor. Also, in the present embodiment temperature drop operation is halted during execution, based on a voltage detected by power state detection sensor 126, which is a voltage detection sensor.

First, during electrical generation by the solid oxide fuel cell system 200 control section 110 controls fuel cell module 2 so that the required electrical power is produced, and the temperature of fuel cell stack 14 falls within an appropriate temperature band, being a predetermined generating temperature range. The fuel cell stack 14 appropriate temperature band is 620° C. to 680° C., and the temperature of fuel cell stack 14 is controlled with this temperature band as a target.

The flow chart in FIG. 27 is executed during electrical generation, and at step S21 a determination is made as to whether there is a stop operation instruction to control section 110. When stop mode 2 is executed, stopping the supply of gas corresponds to a stop operation instruction. When stop mode 3 is executed, operating the stop switch (not shown) corresponds to a stop operation instruction. When stop mode 4 is executed, the arrival of the timing for a predetermined program stop execution corresponds to a stop operation instruction. If stop mode 4 is executed by a stoppage in the supply of power to solid oxide fuel cell system 200, the stoppage of the supply of power corresponds to a stop operation instruction. In this case, control section 110 and generating air flow regulator unit 45 are operated by the power produced by the fuel cell module 2 itself.

When there is no stop operation instruction, one iteration of the FIG. 27 flow chart is completed; if there is a stop operation instruction, the system advances to step S22.

At step S22, a determination is made of whether the temperature of fuel cell stack 14 detected by generating chamber temperature sensor 142 is in the appropriate temperature band. If inside the appropriate temperature band, the system advances to step S28; if outside the appropriate temperature band, the system advances to step S23.

In step S23, a determination is made of whether the fuel cell stack 14 is higher than the appropriate temperature band. If higher than the appropriate temperature band, the system advances to step S25; if lower than the appropriate temperature band, the system advances to step S24.

In step S24 a shutdown stop is performed by a shutdown stop circuit 110a built into control section 110 (FIG. 26), by which the fuel supply, water supply, generating air supply, and extraction of power are stopped in a short period. After the shutdown stop, fuel cell module 2 is left alone. I.e., when the fuel cell stack 14 temperature is lower than the lower limit temperature of the appropriate temperature band, the pre-shutdown operation by pre-shutdown operation circuit 110c (FIG. 26) and temperature drop operation by shutdown stop circuit 110a (FIG. 26) are not executed, even if any of stop modes 2-4 have been selected (see FIG. 29, "Low Temperature Band"). Note that when stop mode 4 is selected, pressure retention operation by pressure retention operation circuit 110b is executed after the processing in the FIG. 28 flow chart is completed (corresponding to time t404-t405 in FIG. 23 of the first embodiment).

It is thus unnecessary to perform a temperature drop on fuel cell stack 14 using pre-shutdown operation when below the lower limit temperature of the appropriate temperature band, and the risk of fuel electrode oxidation can be fully avoided even when the apparatus has been left alone. When below the appropriate temperature band lower limit temperature, there is little power generated immediately before the shutdown stop, so the amount of fuel supplied immediately before shutdown stop is also small, as is the amount of fuel remaining on the fuel electrode side of fuel cell stack 14, or inside reformer 20. Therefore after a shutdown stop, the amount of fuel flowing out from the fuel electrode side to the air electrode side in fuel cell stack 14 is relative small, and no partial reduction of the air electrodes due to outflowing fuel will occur even if no temperature drop operation is executed after a shutdown stop. In a state where there is little fuel remaining on the fuel electrode side or in reformer 20, supplying air into fuel cell module 2 under temperature drop operation raises the risk of a reverse flow of air from the air electrode side to the fuel electrode side, thereby oxidizing the fuel electrodes. In the present embodiment, this risk is avoided by not executing a temperature drop operation after a shutdown stop.

On the other hand, in FIG. 27, step S22, when a determination is made that the temperature of fuel cell stack 14 is within the appropriate temperature band, the system advances to step S28, and a shutdown stop is executed by shutdown stop circuit 110a. This shutdown stop is the same as step S24.

Next, at step S29, a temperature drop operation is executed by shutdown stop circuit 110a. I.e., when the temperature of fuel cell stack 14 is within an appropriate temperature band, pre-shutdown operation is not executed by control section 110 even if stop mode 3 or 4 has been selected; only a temperature drop operation by shutdown stop circuit 110a is executed (see FIG. 29, "Appropriate Temperature Band"). Thus there is no need for a temperature decrease of fuel cell stack 14 by pre-shutdown operation when within the appropriate temperature band, and the risk of fuel electrode oxidation can be well avoided by temperature drop operation alone over a predetermined time.

The longest execution time under temperature drop operation is determined by multiplication by a compensating coefficient based on the temperature of fuel cell stack 14 at the time the temperature drop operation is started. As shown in FIG. 28, the compensating coefficient is set so that after a shutdown stop the temperature drop operation execution period is longer when the temperature of fuel cell stack 14 is high at the start of the temperature drop operation than when it is low. I.e., a temperature drop operation is executed according to the temperature detected by generating chamber temperature sensor 142. In this embodiment, the base temperature drop operation execution period is 2 minutes, and the amount of air supplied is 15 L/min. For a fuel cell stack 14 temperature of 660-680° C., 1.5 is multiplied times the base temperature drop operation execution period for a temperature drop operation execution period of 3 minutes; for a fuel cell stack 14 temperature of 640-659° C., 1.25 is multiplied for a temperature drop operation execution period of 2 minutes 30 seconds; and for a fuel cell stack 14 temperature of 620-639° C., 2 minutes is set as the temperature drop operation execution period. In this manner, exhaust is suppressed under temperature drop operation more when the temperature detected by generating chamber temperature sensor 142 is low than when it is high, and the total amount of air supplied during temperature drop operation is less when the detected temperature is low than when it is high. As a variant example, the amount of air supplied under temperature drop operation can be compensated using a compensation coefficient, and the amount of air can also be increased more when the detected temperature is high than when it is low. It is also acceptable to compensate both the temperature drop operation execution period and the air supply amount using a compensation coefficient.

Moreover, when temperature drop operation is started in step S29, the temperature drop operation halt circuit 110d (FIG. 26) built into control section 110 begins to monitor fuel cell module 2 during the temperature drop operation execution period. I.e., temperature drop operation halt circuit 110d monitors the decline in output voltage from fuel cell module 2 detected by power state detection sensor 126. After a shutdown stop when temperature drop operation is started, extraction of power from fuel cell module 2 is stopped, so the voltage detected by power state detection sensor 126 is the output voltage in the zero output current state.

Next, in step S30, after the start of temperature drop operation (after a shutdown stop), a determination is made as to whether the temperature drop operation execution period has elapsed, or whether the output voltage being monitored by temperature drop operation halt circuit 110d satisfies predetermined stopping conditions. If neither condition is met, the temperature drop operation is continued. If the stopping condition is met during the temperature drop operation execution period, temperature drop operation is executed up to that point; if the stopping condition is not met during the temperature drop operation execution period, temperature drop operation is executed until the temperature drop operation execution period has elapsed. After temperature drop operation, fuel cell module 2 is left alone. Note that when stop mode 4 is selected, pressure retention operation by pressure retention operation circuit 110b is executed after the processing in the FIG. 27 flow chart is completed (corresponding to time t404-t405 in FIG. 23 of the first embodiment).

In the present embodiment, 160 serially connected fuel cell units 16 are housed in a fuel cell module. If sufficient fuel gas (hydrogen) and air (oxygen) are being respectively supplied to the fuel electrode side and air electrode side of the fuel cell units 16, the fuel cell module 2 output voltage will be approximately 160V when no power is being extracted. If a reverse flow of air from the air electrode side to the fuel electrode side occurs after a shutdown stop, the hydrogen gas partial pressure on the fuel electrode side falls, therefore the fuel cell module 2 output voltage suddenly falls. Temperature drop control halt circuit 110d monitors the drop in the output voltage (OCV) from fuel cell module 2 when no power is being extracted; when a drop in the output voltage occurs, the temperature drop operation is immediately stopped by shutdown stop circuit 110a. The supply of air into fuel cell module 2 is thus stopped, and a reverse flow of air is suppressed by decreasing the voltage on the air electrode.

In the present embodiment if the voltage (OCV) detected by power state detection sensor 126 drops 40V relative to the reference voltage of 160V to reach 120V or below, temperature drop operation halt circuit 110d halts temperature drop operation, as the stop condition is met. Note that the reference voltage is a predetermined voltage set in advance based on the configuration of the fuel cell module. As a variant example, a temperature drop operation can also be halted when the detected voltage declines by a predetermined percentage from the reference voltage. E.g., the present invention may be constituted so that temperature drop operation is halted at 120V, when the voltage has dropped 25% relative to the reference voltage of 160V. Alternatively, the present invention may be constituted so that temperature drop operation is halted when there is a decline by a predetermined amount (for example, 40V) from the voltage detected at the time of a shutdown stop, or when there is a decline by a predetermined percentage (for example, 25%) from the voltage detected at the time of a shutdown stop. A temperature drop operation may also be halted when the detected voltage declines by a predetermined amount or greater per unit time. For example, the present invention may be constituted so that temperature drop operation is halted when the detected voltage declines at a rate of 5V/sec or greater.

At the same time, if a determination is made in step S23 of FIG. 27 that the temperature of fuel cell stack 14 is higher than the appropriate temperature band upper limit temperature, which is the shutdown stop temperature, the system advances to step S25. In step S25, a determination is made as to whether the selected stop mode is stop mode 2. If it is stop mode 2, the system advances to step S28; if it is stop mode 3 or 4, the system advances to step S26. At step S26, pre-shutdown operation is executed by pre-shutdown operation circuit 110c. Thus if stop mode 3 or 4 is selected, and the temperature of fuel cell stack 14 is higher than the appropriate temperature band upper limit temperature (the shutdown stop temperature), pre-shutdown operation is executed, then a shutdown stop (step S28) is executed, after which a temperature drop operation (steps S29, S30) is executed (see FIG. 29, "High Temperature Band"). On the other hand, if the temperature of fuel cell stack 14 is less than the shutdown stop temperature, no pre-shutdown operation is executed (step S22→S28 and step S23→S24).

In stop mode 2 the supply of fuel gas is stopped, so pre-shutdown operation is impossible, and temperature drop operation (steps S29, S30) is executed without performing pre-shutdown operation. After temperature drop operation, fuel cell module 2 is left alone. Note that when stop mode 4 is selected, pressure retention operation by pressure retention operation circuit 110b is executed after the processing in the FIG. 27 flow chart is completed (corresponding to time t404-t405 in FIG. 23 of the first embodiment).

In pre-shutdown operation, the amounts of fuel and water supplied to fuel cell module 2, and the amount of power extracted from fuel cell module 2, are reduced to less than generating operation levels. On the other hand the amount of air supplied is increased more than the amount responsive to power extracted from fuel cell module 2, up to the maximum value of the generating air flow regulator unit 45 supply capacity. This pre-shutdown operation results in a lowering of the fuel cell stack 14 temperature.

Next, in step S27, a determination is made as to whether the temperature of fuel cell stack 14 has declined to the appropriate temperature band upper limit temperature or below. If it has not declined to the appropriate temperature band upper limit temperature or below, pre-shutdown operation is continued; if it has declined to the upper limit temperature (the shutdown stop temperature) or below, the system advances to step S28, and a shutdown stop is executed. Thus pre-shutdown operation is continued until the temperature of fuel cell stack 14 falls to the shutdown stop temperature. Therefore in the present embodiment a different pre-shutdown operation is executed according to the temperature of the fuel cell stack 14 at the time a stop operation instruction is given, and when the fuel cell stack 14 temperature is low, the amount of the temperature decrease in pre-shutdown operation is less than when it is high. A shutdown stop is executed after completion of pre-shutdown operation, and the temperature drop operation in steps S29 and S30 thereafter is as described above. Note that because a small amount of fuel is supplied during pre-shutdown operation, there is no risk of a reverse flow of air to the fuel electrode side even when pre-shutdown operation has been executed for a long time period. At the time of a shutdown stop when the fuel cell stack 14 temperature has been decreased to the appropriate temperature band by execution of pre-shutdown operation, an appropriate amount of fuel remains on the fuel electrode side of fuel cell stack 14, and the risk of fuel electrode oxidation and air electrode reduction can be avoided.

In solid oxide fuel cell system 200 of a second embodiment of the present invention, reverse flow of air to the fuel electrode side in fuel cell module 2 is detected based on new knowledge of an extremely high sensitivity detection method based on the output voltage from fuel cell module 2 when no power is being extracted. The solid oxide fuel cell system 200 of the present embodiment comprises a temperature drop operation halt circuit 110d which halts the temperature drop operation when the voltage detected by power state detection sensor 126 satisfies predetermined stopping conditions (FIG. 27, step S30), therefore reverse flow of air can be appropriately sensed, and the supply of air immediately halted.

In cases where the temperature drop operation halt circuit immediately stops the supply of air even after the occurrence of a reverse flow of air is sensed, the stopping of supply causes pressure on the air electrode side to drop and pressure on the fuel electrode side to become relatively high. For this reason, fuel which had remained on the fuel electrode side is again filled into the part of the fuel electrode side where air had penetrated. Thus even if a part of the fuel electrode had been oxidized due to penetration of air, the filling in with fuel on the fuel electrode side when the fuel electrode is at a high temperature results in the oxidized parts of the fuel electrode being once again reduced, so that degradation and damage can be well constrained.

Furthermore, in the solid oxide fuel cell system 200 of the present embodiment, a temperature drop operation is halted when the voltage detected by power state detection sensor 126 satisfies the stop condition (FIG. 27, step S30), therefore the temperature drop operation can be halted immediately when a reverse flow of air to the fuel electrode side has started. By this means the risk of fuel electrode oxidation can be reliably avoided even when the temperature drop operation execution period has been set to a quite long time.

Using the solid oxide fuel cell system 200 of the present embodiment, no temperature drop operation is executed when the temperature of fuel cell stack 14 is below a predetermined temperature (FIG. 29, "Low Temperature Band"), therefore temperature drop operation is not performed in a state in which the temperature is low and the amount of fuel jetted from fuel cell stack 14 is small. For this reason air is supplied in a state in which there is little need for a temperature drop operation, and the risk of oxidizing fuel electrodes can be avoided.

In addition, in the solid oxide fuel cell system 200 of the present embodiment, temperature drop operation (corresponding to FIG. 27, step S29; first embodiment FIG. 16, time t20-t202; FIG. 18, time t303-t304; FIG. 23, time t402-t403) is performed during the period when fuel is jetted from the fuel electrode side to the air electrode side after a shutdown stop (corresponding to FIG. 27, step S28, first embodiment FIG. 16, time t201; FIG. 18, time t303; FIG. 23, time t402), therefore fuel which has flowed out to the air electrode side can be discharged to the outside of fuel cell module 2 together with supplied air, and reduction of air electrodes can be suppressed.

However the time period during which air can be supplied without a reverse flow to the fuel electrode side with the supply of fuel stopped after a shutdown stop depends on the operating status before the shutdown stop and is therefore not fixed, making it difficult to set an appropriate air supply time period. If the flow volume of air supplied is too great, or the supply time is too long after a shutdown stop, supplying air will promote oxidation of fuel electrodes, resulting in damage to the fuel electrodes.

Using the solid oxide fuel cell system 200 of the present embodiment, a temperature drop operation in which air is supplied is executed after a shutdown stop in response to the temperature detected by temperature sensor 142 (FIG. 28), thus enabling appropriate exhausting in response to the operating status before the shutdown stop, so that oxidation of fuel electrodes and reduction of air electrodes can be well suppressed.

Also, using the solid oxide fuel cell system 200 of the present embodiment, the total amount of air supplied during exhaust control is reduced (FIG. 28) more when the temperature detected by temperature sensor 142 is low than when it is high, or the temperature drop operation is not executed when the temperature detected by temperature sensor 142 is at or below a predetermined temperature (FIG. 27, step S22→S23→step S24), therefore the risk of an air reverse flow can be reliably avoided.

Furthermore, using the solid oxide fuel cell system 200 of the present embodiment, pre-shutdown operation to reduce the temperature is executed (FIG. 27, step S23→S25→step S26) when the temperature is higher than the shutdown stop temperature, therefore at the time of a shutdown stop, performing of a shutdown stop can be avoided when the fuel cell stack 14 is at an excessively high temperature, or an excessive amount of fuel remains on the fuel electrode side, thereby reducing the risk of fuel electrode oxidation or reduction of air electrodes after temperature drop operation.

Also, using the solid oxide fuel cell system 200 of the present embodiment, pre-shutdown operation is continued until the temperature declines to the shutdown stop temperature (FIG. 27, step S26→S27), so the upper limit of the temperature when a shutdown stop is carried out can be defined, and oxidation of fuel electrodes and reduction of air electrodes can be well suppressed in subsequent temperature drop operation.

What is claimed is:

1. A solid oxide fuel cell system for generating electrical power by reacting fuel with oxidant gas, comprising:
a fuel cell module that includes a stack of fuel cells each comprising a pair of fuel electrode and air electrode formed, respectively, on inner and outer sides of the cell;
a fuel supply apparatus configured to supply fuel to the fuel cell module;
a water supply apparatus configured to supply water to the fuel cell module for steam reforming of the fuel;
an oxidant gas supply apparatus configured to supply oxidant gas to the outer side of each fuel cell;
a power extraction apparatus configured to extract the electrical power from the fuel cell module at a desired level;
a reformer disposed inside the fuel cell module and configured to perform steam reforming on fuel supplied from the fuel supply apparatus using the water supplied from the water supply apparatus and to supply the reformed fuel to the inner side of each fuel cell; and
a controller programmed to control the fuel supply apparatus, the water supply apparatus, the oxidant gas supply apparatus, and the power extraction apparatus, wherein the controller includes a shutdown circuit,
wherein the shutdown circuit is programmed to execute a shutoff operation in which the fuel supply apparatus, the water supply apparatus and the power extraction apparatus are all shut off to stop supply of the fuel from the fuel supply apparatus and the water from the water supply apparatus and stop extraction of the electrical power from the fuel cell module, and
wherein the shutdown circuit is further programmed to continue operating the oxidant gas supply apparatus, after executing the shutoff operation to shut off the fuel supply apparatus, the water supply apparatus and the power extraction apparatus, to execute a temperature drop operation in which the oxidant gas supply apparatus, after execution of the shutoff operation, continues supplying the oxidant gas that purges oxidant gas remaining on the outer side of each fuel cell from before execution of the shutoff operation to outside the fuel cell module.

2. The solid oxide fuel cell system of claim 1, wherein the shutdown circuit is programmed to keep the water supply apparatus inoperative during the temperature drop operation.

3. The solid oxide fuel cell system of claim 2, wherein the shutdown circuit is programmed to initiate execution of the temperature drop operation without any interruption after executing the shutoff operation.

4. The solid oxide fuel cell system of claim 3, wherein each fuel cell is in a tubular shape having one end thereof at which the inner side of the fuel cell formed with the fuel electrode is open and from which the reformed fuel is discharged outside of the fuel cell after flowing through the inner side of the fuel cell, and each fuel cell comprises an acceleration section attached to said one end and shaped to increase a flow rate of the reformed fuel flowing out of said one end the fuel cell.

5. The solid oxide fuel cell system of claim 4, wherein the acceleration section comprises a flow path formed therethrough, through which the reformed fuel flows, the flow path having a cross section narrower than a cross section of the inner side of the fuel cell.

6. The solid oxide fuel cell system of claim 5, wherein the flow path has the cross section shaped narrower than the cross section of the inner side of the fuel cell so that subsequent to the shutoff operation, the pressure on the inner side of each fuel cell drops at a rate lower than a rate at which the pressure on the outer side of each fuel cell drops.

7. The solid oxide fuel cell system of claim 3, further comprising a voltage detection sensor that detects the output voltage of the fuel cell module, and the controller comprising a temperature drop operation halt circuit, wherein the temperature drop operation halt circuit halts the temperature drop operation in cases where the voltage detected by the voltage detection sensor satisfies predetermined stopping conditions during the temperature drop operation in which power is not being extracted from the fuel cell module after the shutdown stop.

8. The solid oxide fuel cell system of claim 7, wherein the shutdown stopping circuit is constituted so that the temperature drop operation is executed over a predetermined temperature drop operation execution period after the shutdown stop, and the temperature drop operation halt circuit stops the temperature drop operation when a detected voltage satisfies stopping conditions during the temperature drop operation execution period.

9. The solid oxide fuel cell system of claim 8, wherein the shutdown stop circuit does not execute the temperature drop operation when the fuel cell stack temperature at the time of the shutdown stop is below a predetermined temperature.

10. The solid oxide fuel cell system of claim 3, further comprising a temperature detection sensor that detects the temperature of the fuel cell stack, wherein after the shutdown stop, the shutdown stop circuit executes a temperature drop operation in response to the temperature detected by the temperature detection sensor.

11. The solid oxide fuel cell system of claim 10, wherein after a shutdown stop, the shutdown stop circuit reduces the total amount of oxidant gas supplied during the temperature drop operation more when the temperature detected by the temperature detection sensor is low than when it is high, or the shutdown stop circuit does not execute the temperature drop operation when the temperature detected by the temperature detection sensor is below a predetermined temperature.

12. The solid oxide fuel cell system of claim 11, wherein the controller comprises a pre-shutdown operation circuit, and in cases where the fuel cell stack temperature is higher than a predetermined shutdown stop temperature, the pre-shutdown operation circuit executes a pre-shutdown operation to increase the amount of oxidant gas supplied by the oxidant gas supply apparatus before the shutdown stop so that the temperature of the fuel cell stack is reduced, and then a temperature drop operation is executed after a shutdown stop.

13. The solid oxide fuel cell system of claim 12, wherein the pre-shutdown operation circuit continues the pre-shutdown operation until temperature of the fuel cell stack drops to the shutdown stop temperature, after which the shutdown stop is executed.

* * * * *